United States Patent
Gazda et al.

(10) Patent No.: US 11,127,942 B2
(45) Date of Patent: Sep. 21, 2021

(54) SYSTEMS AND METHODS OF MANUFACTURE OF CARBON BASED STRUCTURES INCORPORATED INTO LITHIUM ION AND LITHIUM SULFUR (LI S) BATTERY ELECTRODES

(71) Applicant: Lyten, Inc., Sunnyvale, CA (US)

(72) Inventors: Jerzy Gazda, Austin, TX (US); Bruce Lanning, Littleton, CO (US); Jeffrey Bell, Santa Clara, CA (US); David Cao, Fremont, CA (US); Prashanth Jampani Hanumantha, Fullerton, CA (US); James McKinney, Redwood City, CA (US); George Clayton Gibbs, Santa Clara, CA (US); Michael W. Stowell, Sunnyvale, CA (US)

(73) Assignee: LytEn, Inc., San Jose, CA (US)

( * ) Notice: Subject to any disclaimer, the term of this patent is extended or adjusted under 35 U.S.C. 154(b) by 0 days.

(21) Appl. No.: 16/942,305

(22) Filed: Jul. 29, 2020

(65) Prior Publication Data
US 2021/0126246 A1  Apr. 29, 2021

Related U.S. Application Data

(63) Continuation-in-part of application No. 16/785,076, filed on Feb. 7, 2020, and a continuation-in-part of application No. 16/785,020, filed on Feb. 7, 2020.
(Continued)

(51) Int. Cl.
H01M 4/04  (2006.01)
H01M 4/133 (2010.01)
(Continued)

(52) U.S. Cl.
CPC ....... *H01M 4/1393* (2013.01); *H01M 4/0423* (2013.01); *H01M 4/0435* (2013.01);
(Continued)

(58) Field of Classification Search
None
See application file for complete search history.

(56) References Cited

U.S. PATENT DOCUMENTS 5,143,709 A   9/1992  Labes
5,324,553 A   6/1994  Ovshinsky et al.
(Continued)

FOREIGN PATENT DOCUMENTS

CA   2032137 C   11/1990
CN   100541870   9/2009
(Continued)

OTHER PUBLICATIONS

K.S. Novoselov et al."Electiric Field Effect in Atomically Thin Carbon Films" Science; 306(5696), pp. 666-669; Oct. 22, 2004.
(Continued)

*Primary Examiner* — Yoshitoshi Takeuchi
(74) *Attorney, Agent, or Firm* — Paradice & Li LLP

(57) ABSTRACT

This disclosure provides systems and methods of manufacturing an anode, which can include nucleating a plurality of carbon particles at a first concentration level, forming a first film on a sacrificial substrate based on the first concentration level, each of the carbon particles defined by a plurality of aggregates formed of few layer graphene sheets fused together, defining a porous structure based on the few layer graphene sheets; and infusing a molten lithium (Li) metal into the porous structure. A plurality of interconnected porous channels can be defined based on the plurality of carbon particles. A second film can be formed by nucleating the carbon particles at a second concentration level on the
(Continued)

first film. The first film can be configured to provide a first electrical conductivity and the second film can be configured to provide a second electrical conductivity different than the first electrical conductivity.

17 Claims, 39 Drawing Sheets

Related U.S. Application Data

(60) Provisional application No. 62/942,103, filed on Nov. 30, 2019, provisional application No. 62/926,225, filed on Oct. 25, 2019.

(51) Int. Cl.
*H01M 4/1393* (2010.01)
*H01M 4/583* (2010.01)
*H01M 4/1395* (2010.01)
*H01M 4/587* (2010.01)
*H01M 10/0525* (2010.01)
*H01M 4/62* (2006.01)
*H01M 4/02* (2006.01)

(52) U.S. Cl.
CPC ......... *H01M 4/0471* (2013.01); *H01M 4/133* (2013.01); *H01M 4/587* (2013.01); *H01M 4/621* (2013.01); *H01M 10/0525* (2013.01); *H01M 2004/021* (2013.01); *H01M 2004/028* (2013.01)

(56) References Cited

U.S. PATENT DOCUMENTS

| | | |
|---|---|---|
| 5,436,093 A | 7/1995 | Huang et al. |
| 6,031,711 A | 2/2000 | Tennent et al. |
| 6,099,960 A | 8/2000 | Tennent et al. |
| 6,156,114 A | 12/2000 | Bell et al. |
| 6,757,154 B2 | 6/2004 | Reynolds, III et al. |
| 6,830,595 B2 | 12/2004 | Reynolds, III |
| 7,071,258 B1 | 7/2006 | Jang et al. |
| 7,206,189 B2 | 4/2007 | Reynolds, III |
| 7,465,519 B2 | 12/2008 | Tang et al. |
| 7,623,340 B1 | 11/2009 | Song et al. |
| 7,745,047 B2 | 6/2010 | Zhamu et al. |
| 7,824,651 B2 | 11/2010 | Zhamu et al. |
| 7,842,421 B2 | 11/2010 | Mikhaylik |
| 7,875,219 B2 | 1/2011 | Zhamu et al. |
| 8,114,375 B2 | 2/2012 | Jang et al. |
| 8,119,288 B2 | 2/2012 | Zhamu et al. |
| 8,132,746 B2 | 3/2012 | Zhamu et al. |
| 8,241,793 B2 | 8/2012 | Zhamu et al. |
| 8,415,054 B2 | 4/2013 | Skotheim et al. |
| 8,497,225 B2 | 7/2013 | Zhamu et al. |
| 8,524,067 B2 | 9/2013 | Zhamu et al. |
| 8,617,748 B2 | 12/2013 | Mikhaylik et al. |
| 8,624,222 B2 | 1/2014 | Liu et al. |
| 8,748,043 B2 | 1/2014 | Mikhaylik |
| 8,936,870 B2 | 1/2015 | Affinito et al. |
| 8,940,145 B1 | 1/2015 | Chen et al. |
| 9,005,809 B2 | 4/2015 | Wilkening et al. |
| 9,034,421 B2 | 5/2015 | Mikhaylik et al. |
| 9,040,201 B2 | 5/2015 | Affinito et al. |
| 9,099,744 B2 | 8/2015 | Janssen et al. |
| 9,190,667 B2 | 11/2015 | Zhamu et al. |
| 9,190,694 B2 | 11/2015 | Lopez et al. |
| 9,246,185 B2 | 1/2016 | Kretschmar et al. |
| 9,419,274 B2 | 8/2016 | Wilkening et al. |
| 9,437,344 B2 | 9/2016 | Zhamu et al. |
| 9,577,243 B2 | 2/2017 | Schmidt et al. |
| 9,666,899 B2 | 5/2017 | He et al. |
| 10,020,494 B2 | 7/2018 | Wang et al. |
| 10,083,801 B2 | 9/2018 | Zhamu et al. |
| 10,734,653 B2 | 8/2020 | Lanning et al. |
| 2005/0123467 A1 | 6/2005 | Harutyunyan |
| 2009/0022649 A1 | 1/2009 | Zhamu et al. |
| 2009/0028777 A1 | 1/2009 | Zhamu et al. |
| 2009/0117467 A1 | 5/2009 | Zhamu et al. |
| 2012/0058397 A1 | 3/2012 | Zhamu et al. |
| 2012/0088154 A1 | 4/2012 | Liu et al. |
| 2013/0065034 A1* | 3/2013 | Muramatsu ........... C01B 32/194 428/213 |
| 2014/0170483 A1 | 6/2014 | Zhang et al. |
| 2014/0255785 A1 | 9/2014 | Do |
| 2014/0313636 A1 | 10/2014 | Tour et al. |
| 2015/0044565 A1 | 2/2015 | Wang et al. |
| 2015/0210558 A1 | 7/2015 | Dickinson et al. |
| 2015/0291431 A1 | 10/2015 | Tang et al. |
| 2016/0027934 A1 | 1/2016 | Noyes |
| 2016/0043384 A1 | 2/2016 | Zhamu et al. |
| 2016/0207291 A1 | 7/2016 | Dimitrakopoulos et al. |
| 2017/0062821 A1 | 3/2017 | Tour et al. |
| 2017/0174520 A1 | 6/2017 | Walters et al. |
| 2018/0327611 A1 | 11/2018 | Scheffer |
| 2020/0123008 A1* | 4/2020 | Guo ........................ H01M 4/36 |
| 2020/0235392 A1 | 7/2020 | Jang |

FOREIGN PATENT DOCUMENTS

| | | | |
|---|---|---|---|
| CN | 102674321 B | 2/2015 | |
| JP | 2010095390 A | 4/2010 | |
| KR | 101785064 B1 | 10/2017 | |
| WO | 2012/039533 A1 | 3/2012 | |
| WO | 2014/048390 A1 | 4/2014 | |
| WO | 2017/127674 A1 | 7/2017 | |
| WO | 2018122368 A1 | 7/2018 | |
| WO | WO-2019019412 A1 * | 1/2019 | .......... H01M 4/1395 |

OTHER PUBLICATIONS

P. Maguire et al. "Continuous In-flight Synthesis for On-Demand Delivery of Ligand-Free Colloidal Gold Nanoparticles", Nano Letters; 17(3); pp. 1336-1343; Mar. 8, 2017.
S. Dabrowska et al. "Current Trends in the Development of Microwave Reactors for the Synthesis of Nanomaterials in Laboratories and Industries: A Review" Crystals; 8(10); Oct. 2018; p. 379.
Y. Qiu et al."Explosive thermal reduction of graphene oxide-based materials: mechanism and safety implications" NIH Public Access Author Manuscript School of Engineering, Brown University, 182 Hope St., Providence, RI, USA, 02912. Carbon NY. Jun. 2014; 72: 215-223. doi:10.1016/j.carbon.2014.02.005.
Z. Lu et al."Improving Li anode performance by a porous 3D carbon paper host with plasma assisted sponge carbon coating" Energy Storage Materials 11 (2018) 47-56.
E. Lee et al. "Li Absorption and Intercalation in Single Layer Graphene and Few Layer Graphene by First Principles" NANO Letters; 12(9), pp. 4624-4628; Sep. 12, 2012.
Y. Shi et al. "Material and Structural Design of Novel Binder Systems for High-Energy, High-Power Lithium-Ion Batteries" Published as part of the Accounts of Chemical Research special issue "Energy Storage: Complexities AmongMaterials and Interfaces at Multiple Length Scales". DOI: 10.1021/acsaccounts.7b00402 Acc. Chem. Res. 2017, 50, 2642-2652.
K. Ji et al. "Lithium intercalation into bilayer graphene" Nature Communications; 19(1); pp. 1-10; Jan. 17, 2019.
K. Ji et al. "Lithium intercalation into bilayer graphene" Nature Communications (2019) 10:275 | https://doi.org/10.1038/s41467-018-07942-z | www.nature.com/naturecommunications.
A. Mistry et al. ""Shuttle" in Polysulfide Shuttle: Friend or Foe?" Journal of Physical Chemistry C; 122(42); pp. 23845-23851; Oct. 5, 2018.
I. Son et al., "Graphene balls for lithium rechargeable batteries with fast charging and high volumetric energy densities", Nature Communications; 8(1); pp. 1-11; Nov. 16, 2017.
Y. Lee et al., "High-Energy Long-Cycling All-Solid-State Lithium Metal Batteries Enabled by Silver-Carbon Composite Anodes", Nature Energy; 5(4); pp. 299-308; Apr. 2020.

(56) References Cited

OTHER PUBLICATIONS

Zhou, I. et al., "Recent developments on and prospects for electrode materials with hierarchical structures for lithium-ion batteries", Advanced Energy Materials; 8(6); p. 1701415; Feb. 2018.

Rodrigues, M. et al., "A materials perspective on Li-ion batteries at extreme temperatures", Nature Energy; 2(8); pp. 1-4; Jul. 24, 2017.

Zhang, H. et al., "Three-dimensional bicontinuous ultrafast-charge and -discharge bulk battery electrodes", Nature Nanotechnology; 6(5); pp. 277-281; May 2011.

Agostini, M. et al., "A high-power and fast charging Li-ion battery with outstanding cycle-life", Scientific Reports; 7(1); pp. 1-7; Apr. 24, 2017.

Ji et al.; "A highly ordered nanostructured carbon-sulphur cathode for lithium-sulphur batteries", Nature Materials, vol. 8, May 2009, pp. 500-506.

Schuster et al., Spherical Ordered Mesoporous Carbon Nanoparticles with High Porosity for Lithium-Sulfur Batteries, Angew. Chem. Int. Ed., 51, Mar. 2012, pp. 3591-3595.

Shaibani, M., et al., "Expansion-tolerant architectures for stable cycling of ultrahigh-loading sulfur cathodes in lithium-sulfur batteries", Science Advances; 6(eaay2757); 11 pages; Jan. 3, 2020.

Wang, J., et al., Sulfur-mesoporous carbon composites in conjunction with a novel ionic liquid electrolyte for lithium rechargeable batteries, Carbon, vol. 46, Issue 2, Feb. 2008, pp. 229-235.

Yang, Y., et al., New Nanostructured Li2S/Silicon Rechargeable Battery with High Specific Energy, Nano Letters, 10 (4), Feb. 2010, pp. 1486-1491.

\* cited by examiner

SYSTEMS AND METHODS OF MANUFACTURE OF CARBON BASED STRUCTURES INCORPORATED INTO LITHIUM ION AND LITHIUM SULFUR (LI S) BATTERY ELECTRODES

RELATED APPLICATIONS

This application is a continuation-in-part application and claims priority to U.S. patent application Ser. No. 16/785,020, filed on Feb. 7, 2020 and entitled "3D Self-Assembled Multi-Modal Carbon Based Particle" and to U.S. patent application Ser. No. 16/785,076, filed on Feb. 7, 2020 and entitled "3D Self-Assembled Multi-Modal Carbon Based Particles integrated into a continuous film layer," both of which claim priority to U.S. Provisional Patent Application No. 62/942,103, filed on Nov. 30, 2019 and entitled "3D Hierarchical Mesoporous Carbon-Based Particles Integrated into a Continuous Electrode Film Layer," and U.S. Provisional Patent Application No. 62/926,225, filed on Oct. 25, 2019 and entitled "3D Hierarchical Mesoporous Carbon-Based Particles Integrated into a Continuous Electrode Film Layer," all of which are assigned to the assignee hereof. The disclosures of all prior Applications are considered part of and are incorporated by reference in this Patent Application.

TECHNICAL FIELD

This disclosure relates generally to producing carbon-based particles, and, more particularly, to incorporating the produced carbon-based particles into battery electrodes.

DESCRIPTION OF RELATED ART

Technological advances have enabled consumers to use electronic devices in many new applications previously not possible. Such devices have already become common, many of which rely on battery-supplied power and continue to increase in popularity. Filling the associated electric power consumption demands, batteries—especially secondary batteries, such as rechargeable batteries, have emerged as a universal solution by allowing for portability and convenient continued device usage.

Challenges related to rechargeable battery performance persist, especially concerning both lifespan and cyclability have therefore attracted ongoing innovation in lithium-ion, referred to in short form as Li-ion, technology. Conventionally, an intercalated Li compound can be used as a formative material at the cathode paired with graphite at the anode. Li-ion batteries, in contrast to other battery types, have been sought for usage in portable electronic devices due to their relatively high energy density and limited to no memory effect, such as that encountered by traditional nickel-cadmium and nickel-metal hydride rechargeable batteries that lose their ability to store electrical charge over multiple charge-discharge cycles involving partial discharge and relatively low self-discharge. As a result, Li-ion batteries offer many of the benefits found in primary, such as non-rechargeable, Li batteries, including high charge density that results in longer useful lifespans, without the concerns of rapid discharge resulting in overheating, rupture or explosion that may be encountered in Li batteries due to the highly reactive nature of Li metal.

To assist ongoing developments in Li ion battery specific capacity, cycle-ability, and power delivery, amorphous carbon has also been considered with Li as a formative material to form Li ion battery electrodes. However, such electrodes continue to suffer from a relatively a low electrical conductivity and high charge transfer resistance, which, in turn, results in a high polarization or internal power loss. Conventional amorphous carbon-based anode materials also may tend to give rise to a high irreversible capacity, among creating other potential issues.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a method of manufacturing an anode. The method can include nucleating a plurality of carbon particles at a first concentration level, forming a first film on a sacrificial substrate based on the first concentration level, each of the carbon particles defined by a plurality of aggregates formed of few layer graphene sheets fused together, defining a porous structure based on the few layer graphene sheets, and infusing a molten lithium (Li) metal into the porous structure.

In some implementations, a plurality of interconnected porous channels can be defined based on the plurality of carbon particles. A second film can be formed by nucleating the carbon particles at a second concentration level on the first film. The first film can be configured to provide a first electrical conductivity and the second film can be configured to provide a second electrical conductivity different than the first electrical conductivity. The second electrical conductivity can be lower than the first electrical conductivity.

In some implementations, the first film can have an average thickness in a range between approximately 10 µm and approximately 200 µm. The carbon particles can be grown on a roll-to-roll processing apparatus. The method can include any one or more of evaporating the molten Li metal onto a metal foil and rolling the molten Li metal from the metal foil into the porous structure. The method can include any one or more preparing the anode to participate in a reversible migration of Li ions with a cathode prepared by any one or more of chemical functionalization or sulfidation and densifying a plurality of graphene platelets on the porous structure.

Another aspect of the subject matter described in this disclosure can be implemented as a process for producing a lithium (Li) ion battery anode. The process can include depositing a first plurality of carbon particles on a substrate and forming a first film configured to provide a first electrical conductivity based on the first plurality of carbon particles. Each carbon particle of the first plurality of carbon particles can include a plurality of 3D aggregates formed of few layer graphene sheets orthogonally fused together and configured to define a porous structure. A porous arrangement is formed in the porous structure. A molten Li metal is infused into the porous structure. The process can include any one or more of depositing a second plurality of carbon particles on the first film and forming a second film configured to provide a first electrical conductivity based on the second plurality of carbon particles.

In some implementations, an infusion rate of the molten Li metal can be selected based on a viscous resistance of the molten Li metal. The molten Li metal can be configured to react with any one or more of the first plurality of carbon particles to produce carbide. The process can include any one or more of infiltrating the molten Li metal in a vapor phase into the porous structure, initiating a chemical reaction between any one or more Li ions provided by the molten Li metal and one or more exposed surfaces of the porous structure, and forming one or more lithiophilic surfaces from the one or more exposed surfaces.

In some implementations, the process can include coating any one or more of the lithiophilic surfaces with active elements including any one or more of halogens or metal oxides. The process can include coating any one or more of the lithiophilic surfaces with any one or more elements having a lower surface energy than Li and facilitating a Li wetting enhancement of any one or more of the lithiophilic surfaces with any one or more elements having a lower surface energy than Li.

In some implementations, the process can include creating a binder by incorporating any one or more of a metal powder or a metal-containing compound including silicon carbide (SiC) into a carbon pre-form. The Li wetting can include engineering an interfacial surface tension. In some aspects, the Li wetting comprises one or more chemical reactions at an interface of Li and an exposed surface of the porous structure. The Li wetting enhancement can include any one or more of adding of a quantity of dopants at the interface and affecting an extent of the Li wetting corresponding to the quantity of dopants. Adsorption of hydroxy (OH) or hydroxyl (OH) groups can be controlled at any of the one or more exposed surfaces of the porous structure.

BRIEF DESCRIPTION OF THE DRAWINGS

The details of the subject matter described in this disclosure are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1B:
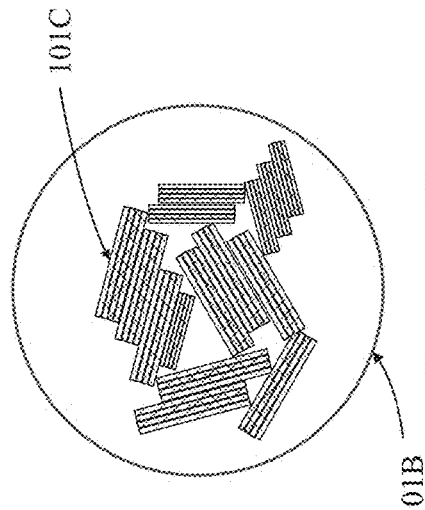
FIGS. 1A through 1E show diagrams of a carbon-based particle with various defined regions for electrical conduction and ion transport.

Various aspects of the novel systems, apparatuses, and methods are described more fully herein with reference to the accompanying drawings. The teachings disclosed can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented, or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. Any aspect disclosed herein can be embodied by one or more elements of a claim.

Although some examples and aspects are described herein, many variations and permutations of these examples fall within the scope of the disclosure. Although some benefits and advantages of the preferred aspects are mentioned, the scope of the disclosure is not intended to be limited to benefits, uses, or objectives. Rather, aspects of the disclosure are intended to be broadly applicable to a carbon-based particle self-nucleated in an atmospheric-pressure vapor flow stream of a carbon-containing gas such as methane, the carbon-based particle including multiple electrically conductive three-dimensional (3D) aggregates of graphene sheets defining void spaces and ion conduits therein, some of which are illustrated in the figures and in the following description of the preferred aspects. The detailed description and drawings are merely illustrative of the disclosure rather than limiting, the scope of the disclosure being defined by the appended claims and equivalents thereof.

Definitions

Li-Ion Batteries

A Li-ion battery is a type of secondary, alternatively referred to as a rechargeable, battery. Such battery technology has shown great promise in recent years as power sources that can lead to an electric vehicle (EV) revolution by facilitating the widespread implementation of EVs across numerous applications. Accordingly, the development of new materials for various components of Li-ion batteries is the focus of research in the field of materials science. Li-ion batteries power most modern portable devices and seem to have overcome psychological barriers of the consuming public against the use of such high energy density devices on a larger scale for more demanding applications, such as EVs.

Regarding operation, in Li-ion batteries, Li ions (Li+) migrate from the negative electrode, also referred to as the anode, through an electrolyte, which can be in any one or more of a liquid phase or a gel phase, to the positive electrode during discharge cycles and return during charging cycles. Conventional Li-ion batteries can use an intercalated Li compound as a formative material at the positive electrode and graphite at the negative electrode. Such batteries can be characterized by their relatively high energy density measured as a specific capacity having the units of milliamp hours per gram (mAh/g), no "memory-effect"—describing the situation in which nickel-cadmium batteries gradually lose their maximum energy capacity if they are repeatedly recharged after being only partially discharged—and low self-discharge. Unfortunately, unlike many non-Li conventional battery chemistries, Li ion batteries can, due to the highly reactive nature of elemental and ionic Li, present a safety hazard. Li batteries can deteriorate unexpectedly, including through explosions and fires, upon puncture, abrasive contact, or even excessively charged. In spite of such drawbacks, the high energy density of Li ion batteries remains attractive as it permits for longer usable lifespans of several hours between charging cycles as well as longer cycle life, referring to the electric current delivery or output performance of a given Li-ion battery over multiple repeat charge-discharge, such as partial or total charge depletion, cycles.

Overall, Li metal, due to its high theoretical specific capacity of 3,860 mAh/g, low density (0.59 g cm-3) and low negative electrochemical potential, such as −3.040 V compared to a standard hydrogen electrode, still appears as an ideal material for the negative electrode of secondary Li-ion batteries. But, problems continue to persist, such as dendrite growth, referring the growth of a branching tree-like structure within the battery itself, which can be caused by Li precipitates. Dendrites, upon growing from one electrode to contact the other, can cause serious safety concerns related to short-circuits, and limited Coulombic efficiency, discussing to the charge efficiency by which electrons are transferred in batteries during deposition and stripping operations inherent in Li-ion batteries. Such challenges have previously impeded Li ion battery applications.

Concerns related to safety of earlier-developed Li secondary batteries have led to the development and refinement of current generation Li-ion secondary batteries. Such Li-ion batteries typically feature carbonaceous materials used as an anode, such carbonaceous anode materials including:
graphite;
amorphous carbon; and,
graphitized carbon.

The first type of the three carbonaceous materials presented above includes naturally occurring graphite and synthetic graphite or artificial graphite, such as Highly Oriented Pyrolytic Graphite, HOPG. Either form of graphite can be intercalated with Li, such as that obtained from a molten Li metal source. The resulting Graphite Intercalation Compound (GIC) may be expressed as $Li_xC_6$, where X is typically less than 1. To limit or otherwise minimize loss in energy density due to the replacement of Li metal with the GIC, X in $Li_xC_6$ must be maximized and the irreversible capacity loss ($Q_{ir}$), in the first charge of the battery must be minimized.

As a result, the maximum amount of Li that can be reversibly intercalated into the interstices between graphene planes of a perfect graphite crystal is generally believed to occur in a graphite intercalation compound represented by $Li_xC_6$ (x=1), corresponding to a theoretical 372 mAh/g. However, such a limited specific capacity cannot adequately satisfy the demanding requirements of higher energy-density power needs of modern electronics and EVs. Accordingly, carbon-based anodes, such as graphite intercalated with Li, can demonstrate extended cycle lifespans due to the presence of a surface-electrolyte interface layer (SEI), which results from the reaction between Li and surrounding electrolyte, or between Li and the anode surface/edge atoms or functional groups, during the initial several charge-discharge cycles. Li ions consumed in this reaction, referring to the formation of the SEI, may be derived from some of the Li ions originally intended for charge transfer, referring to a process of the dissociation of elemental Li when intercalated with carbon in a carbon-based structure, such as within the anode.

Charge transfer can occur during Li ion movement in electrolyte across a porous separator to the cathode as related to electron release and transport to facilitate electric current conduction to power a load during typical Li ion battery discharge cycles. During repeated Li ion battery charge-discharge cycles, the SEI is formed and some of the Li ions migrating through the electrolyte become part of the inert SEI layer and are described as becoming "irreversible", in that they can no longer be an active element or ion used for charge transfer. As a result, it is desirable to minimize the amount of Li used for the formation of an effective SEI layer. In addition to SEI formation, $Q_{ir}$, has been attributed to graphite exfoliation caused by electrolyte/solvent co-intercalation and other side reactions.

Next, amorphous carbon contains no, or very little, micro- or nano-crystallites and can include both "soft carbon" and "hard carbon". Soft carbon refers to a carbon material that can be graphitized at a temperature of about 2,500° C. or higher. In contrast, hard carbon refers to a carbon material that cannot be graphitized at a temperature higher than 2,500° C.

In practice and industry, the so-called "amorphous carbons" commonly used as anode active materials may not be purely amorphous, but rather contain some minute amount of micro- or nano-crystallites, each crystallite being defined as a small number of graphene sheets oriented as basal planes that are stacked and bonded together by weak van der Waals forces. The number of graphene sheets can vary between one and several hundreds, giving rise to a c-directional dimension, such as thickness $L_e$, of typically 0.34 nm to 100 nm. The length or width ($L_a$) of these crystallites is typically between tens of nanometers to microns. Among this class of carbon materials, soft and hard carbons can be produced by low-temperature pyrolysis (550-1,000° C.) and exhibit a reversible specific capacity of 400-800 mAh/g in the 0-2.5 V range. A so-called "house-of-cards" carbonaceous material has been produced with enhanced specific capacities approaching 700 mAh/g.

Research groups have obtained enhanced specific capacities of up to 700 mAh/g by milling graphite, coke, or carbon fibers and have explained the origin of the additional specific capacity with the assumption that in disordered carbon containing some dispersed graphene sheets, referred to as "house-of-cards" materials, Li ions are adsorbed on two sides of a single graphene sheet. It has been also proposed that Li readily bonds to a proton-passivated carbon, resulting in a series of edge-oriented Li to C—H bonds. This can provide an additional source of Li+ in some disordered carbons. Other research suggested the formation of Li metal monolayers on the outer graphene sheets of graphite nanocrystallites. The discussed amorphous carbons were prepared by pyrolyzing epoxy resins and may be referred to as polymeric carbons. Polymeric carbon-based anode materials have also been studied.

Chemistry, performance, cost, and safety characteristics may vary across Li ion battery variants. Handheld electronics may use Li polymer batteries using a polymer gel as electrolyte with Li cobalt oxide ($LiCoO_2$) as cathode material. Such a configuration can offer relatively high energy density but may present safety risks, especially when damaged. Li iron phosphate ($LiFePO_4$), Li ion manganese oxide battery ($LiMn_2O_4$, $Li_2MnO_3$, or LMO), and Li nickel manganese cobalt oxide ($LiNiMnCoO_2$ or NMC) all offer lower energy density yet provide longer useful lives and less likelihood of fire or explosion. Thus, such batteries are widely used for electric tools, medical equipment, and other roles. NMC in particular is often considered for automotive applications.

Lithium (Li)-Sulfur (S) Batteries

The lithium-sulfur battery, referred to herein as a Li—S battery, is a type of rechargeable battery, notable for its high specific energy. The relatively low atomic weight of Li and moderate atomic weight of S results in Li—S batteries being relatively light, at about the density of water).

Li—S batteries may succeed lithium-ion cells because of their higher energy density and reduced cost due to the use of sulfur. Li—S batteries can offer specific energies at approximately 500 Wh/kg, which is significantly better than many conventional Li-ion batteries, which are typically in the range of 150-250 Wh/kg. Li—S batteries with up to 1,500 charge and discharge cycles have been demonstrated. Although presenting many advantages, a key faced by the Li—S battery is the polysulfide "shuttle" effect that results in progressive leakage of active material from the cathode resulting in an overall low life cycle of the battery. And, the extremely low electrical conductivity of a sulfur cathode requires an extra mass for a conducting agent to exploit the whole contribution of active mass to the capacity. Large volumetric expansion of S cathode from elemental S to $Li_2S$ and a large amount of electrolyte needed are also problem areas demanding attention.

Chemical processes in the Li—S cell include Li dissolution from the anode surface and incorporation into alkali metal polysulfide salts during discharge, and reverse lithium plating to the anode while charging. At the anodic surface, dissolution of the metallic lithium occurs, with the production of electrons and lithium ions during the discharge and electrodeposition during the charge. The half-reaction is expressed as:

$$Li \rightleftharpoons Li^+ + e^- \quad (Eq. 1)$$

Similar to that observed in Li ion batteries, dissolution and/or electrodeposition reactions can cause, over time, problems of unstable growth of the solid-electrolyte interface (SEI), generating active sites for the nucleation and dendritic growth of Li. Dendritic growth is responsible for the internal short circuit in Li batteries and leads to the death of the battery itself.

In Li—S batteries, energy is stored in the sulfur electrode ($S_8$), which is the cathode. During cell discharge cycles, Li ions in the electrolyte migrate from the anode to the cathode where the S is reduced to lithium sulphide ($Li_2S$). The sulfur is reoxidized to $S_8$ during the refilling phase. The semi-reaction is expressed at a high level of abstraction, for explanatory purposes, as:

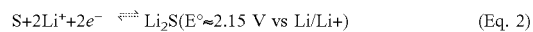
$$S + 2Li^+ + 2e^- \rightleftharpoons Li_2S (E° \approx 2.15 \text{ V vs Li/Li+}) \quad (Eq. 2)$$

In reality, the S reduction reaction to $Li_2S$ is significantly more complex and involves the formation of several Li polysulphides ($Li_2S_x$, $8 < x < 1$) at decreasing chain length according to the order:

$$Li_2S_8 \rightarrow Li_2S_6 \rightarrow Li_2S_4 \rightarrow Li_2S_2 \rightarrow Li_2S \quad (Eq. 3)$$

The final product is a mixture of $Li_2S_2$ and $Li_2S$ rather than just pure $Li_2S$, due to the slow reduction kinetics at $Li_2S$. This is in contrast with conventional Li ion cells, where the Li ions are intercalated in both of the anode and the cathode. For example, in Li S battery systems, each S atom can host two Li ions. Typically, Li ion batteries can accommodate only 0.5-0.7 lithium ions per host atom. As a result, Li—S allows for a much higher Li storage density. Polysulfides (PS) are reduced on the cathode surface in sequence while the cell is discharging:

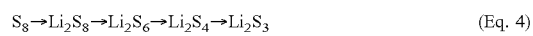
$$S_8 \rightarrow Li_2S_8 \rightarrow Li_2S_6 \rightarrow Li_2S_4 \rightarrow Li_2S_3 \quad (Eq. 4)$$

Across a porous diffusion separator, S polymers form at the cathode as the cell charges:

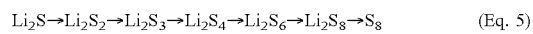
$$Li_2S \rightarrow Li_2S_2 \rightarrow Li_2S_3 \rightarrow Li_2S_4 \rightarrow Li_2S_6 \rightarrow Li_2S_8 \rightarrow S_8 \quad (Eq. 5)$$

These reactions can analogous to those in the sodium (Na)—S battery.

Primary challenges concerning Li—S battery systems include the low relatively low conductivity of S, its massive volume change upon discharging, and finding a suitable cathode, such as that constructed from any of the presently disclosed carbon-based structures, is the first step for commercialization of Li—S batteries. Currently, conventional Li S batteries use a carbon/sulfur cathode and a Li anode. Sulfur is naturally abundant and relatively low cost, but has practically no electroconductivity, $5 \times 10^{-30}$ S·cm-1 at 25° C. A carbon coating provides the missing electroconductivity.

Carbon nanofibers provide an effective electron conduction path and structural integrity, at the disadvantage of higher cost.

One problem with the Li—S design is that when the S in the cathode absorbs Li, volume expansion of the $Li_xS$ compositions takes place, and predicted volume expansion of $Li_2S$ is nearly 80% of the volume of the original S. This causes large mechanical stresses on the cathode, which is a major cause of rapid degradation. Such process reduces the contact between the carbon (C), the S and prevents the flow of Li ions to the carbon surface.

Mechanical properties of the lithiated S compounds are strongly contingent on the Li content, and with increasing Li content, the strength of lithiated S compounds improves, although this increment is not linear with Li. One of the primary shortfalls of most Li—S cells concerns unwanted reactions with the electrolyte. While S and $Li_2S$ are relatively insoluble in most electrolytes, many intermediate polysulfides (PS) are not such that dissolving $Li_2S_n$ into the electrolyte can cause irreversible loss of active S. Use of highly reactive Li as a negative electrode causes dissociation of most of the commonly used other type electrolytes. Use of a protective layer in the anode surface has been studied to improve cell safety, such as using Teflon coating showed improvement in the electrolyte stability, LIPON, $Li_3N$ also exhibited promising performance.

The "shuttle" effect has been observed to be the primary cause of degradation in a Li—S battery. The Li PS $Li_2S_x$ ($6 \leq x \leq 8$) is highly soluble in the common electrolytes used for Li—S batteries. They are formed and leaked from the cathode and they diffuse to the anode, where they are reduced to short-chain PS and diffuse back to the cathode where long-chain PS is formed again. This process results in the continuous leakage of active material from the cathode, lithium corrosion, low coulombic efficiency, and low battery life due to battery self-discharge. Moreover, the "shuttle" effect is responsible for the characteristic self-discharge of Li—S batteries, because of slow dissolution of PS, which occurs also in rest state. The "shuttle" effect in Li—S battery can be quantified by a factor $f_c$ ($0 < f_c < 1$), evaluated by the extension of the charge voltage plateau. The factor fc is given by the expression:

$$fc = \frac{k_s q_{up}[S_{tot}]}{I_c} \quad \text{(Eq. 6)}$$

where $k_s$, $q_{up}$, $[S_{tot}]$ and $I_c$ are respectively the kinetic constant, specific capacity contributing to the anodic plateau, the total sulfur concentration and charge current.

Electrical Conductance of Carbon-Based Materials

Advances in high conductance carbon materials such as carbon nanotubes (CNT), graphene, amorphous carbon, and/or crystalline graphite in electronics allows for the printing of these materials onto many types of surfaces without requiring usage of printed circuit boards, and without the use of materials or compounds that have been identified as being toxic to humans. Usage of high conductance carbon as a feedstock material or other material during any one or more of the additive manufacturing processes described above may facilitate the fabrication of batteries with micro-lattice structures suitable for enhanced functionality, electric power storage and delivery, and optimal efficiency. Although many of the devices described may serve as power sources such as batteries or capacitors, those of skill in the art will appreciate that printing technologies, such as 3D printing, may be configured using high conductance carbon materials such as carbon nanotubes (CNT), graphene, amorphous carbon, or crystalline graphite to form other electronic devices.

Printing technologies using high conductance carbon materials such as carbon nanotubes (CNT), graphene, amorphous carbon, or crystalline graphite may be implemented and/or otherwise incorporated in the fabrication of the following devices: antennas, tuned antennas, sensors, biosensors, energy harvesters, photocells, and other electronic devices.

Graphene

Graphene is an allotrope of carbon in the form of a single layer of atoms in a two-dimensional hexagonal lattice in which one atom forms each vertex. It is the basic structural element of other allotropes, including graphite, charcoal, carbon nanotubes and fullerenes. It can also be considered as an indefinitely large aromatic molecule, the ultimate case of the family of flat polycyclic aromatic hydrocarbons.

Graphene has a special set of properties which set it apart from other elements. In proportion to its thickness, it is about 100 times stronger than the strongest steel. Yet its density is dramatically lower than any other steel, with a surfacic, such as surface-related, mass of 0.763 mg per square meter. It conducts heat and electricity very efficiently and is nearly transparent. Graphene also shows a large and nonlinear diamagnetism, even greater than graphite and can be levitated by Nd—Fe—B magnets. Researchers have identified the bipolar transistor effect, ballistic transport of charges and large quantum oscillations in the material. Its end-use application areas are widespread, finding unique implementations in advanced materials and composites, as well as being used as a formative material to construct ornate scaffolds usable in Li ion battery electrodes to enhance ion transport and electric current conduction to yield specific capacity and power delivery figures not otherwise attainable by conventional battery technologies.

Chemical Functionalization of Graphene

Functionalization implies the process of adding new functions, features, capabilities, or properties to a material or substance by altering the surface chemistry of the material. Functionalization is used throughout chemistry, materials science, biological engineering, textile engineering, and nanotechnology and may be performed by attaching molecules or nanoparticles to the surface of a material, with a chemical bond or through adsorption, the adhesion of atoms, ions or molecules from a gas, liquid or dissolved solid to a surface to create a film of the adsorbate on the surface of the adsorbent without forming a covalent or ionic bond thereto.

Functionalization and dispersion of graphene sheets may be of critical importance to their respective end-use applications. Chemical functionalization of graphene enables the material to be processed by solvent-assisted techniques, such as layer-by-layer assembly, spin-coating, and filtration and also prevents the agglomeration of single layer graphene (SLG) during reduction and maintains the inherent properties of graphene.

Currently, the functionalization of graphene may be performed by covalent and noncovalent modification techniques. In both instances, surface modification of graphene oxide followed by reduction has been carried out to obtain functionalized graphene. It has been found that both the covalent and noncovalent modification techniques are very effective in the preparation of processable graphene.

However, electrical conductivity of functionalized graphene has been observed to decrease significantly compared to pure graphene. Moreover, the surface area of the functionalized graphene prepared by covalent and non-covalent techniques decreases significantly due to the destructive chemical oxidation of flake graphite followed by sonication, functionalization, and chemical reduction. To overcome these problems, studies have been reported on the preparation of functionalized graphene directly from graphite in a one-step process. In all these cases, surface modification of graphene can prevent agglomeration and facilitates the formation of stable dispersions. Surface modified graphene can be used for the fabrication of polymer nanocomposites, Li ion battery electrodes, super-capacitor devices, drug delivery system, solar cells, memory devices, transistor device, biosensor, etc.

Graphite

Graphite, as commonly understood and as referred to herein, implies a crystalline form of elemental carbon with atoms arranged in a hexagonal structure. Graphite occurs naturally in this form and is the most stable form of carbon under standard, such as atmospheric, conditions. Otherwise, under high pressures and temperatures, graphite converts to diamond. Graphite is used in pencils and lubricants. Its high conductivity makes it useful in electronic products such as electrodes, batteries, and solar panels.

Roll-to-Roll (R2R) Processing

R2R processing refers to the process of creating electronic devices on a roll of flexible plastic or metal foil. R2R processing may also refer to any process of applying coatings, printing, or performing other processes starting with a roll of a flexible material and re-reeling after the process to create an output roll. These processes, and others such as sheeting, may be grouped together under the general term "converting". When the rolls of material have been coated, laminated, or printed they can be subsequently cut and/or slit to their finished size on a slitter rewinder.

R2R processing of large-area electronic devices may reduce manufacturing cost. Other applications could arise which take advantage of the flexible nature of the substrates, such as electronics embedded into clothing, 3D-printed Li ion batteries, large-area flexible displays, and roll-up portable displays.

Oxidation-Reduction (Redox) Reactions

Redox are a type of chemical reaction in which the oxidation states of atoms are changed. Redox reactions are characterized by the transfer of electrons between chemical species, most often with one species, the reducing agent, undergoing oxidation by losing electrons while another species, such as the oxidizing agent, undergoes reduction by gains electrons. The chemical species from which the electron is stripped is said to have been oxidized, while the chemical species to which the electron is added is said to have been reduced.

Intercalation

Intercalation implies the reversible inclusion or insertion of a molecule, or ion, into materials with layered structures. Examples are found in graphite, graphene, and transition metal dichalcogenides.

Li Intercalation into Bi- or Multi-Layer Graphene

Electrical storage capacity of graphene and the Li-storage process in graphite currently present challenges requiring further development in the field of Li ion batteries. Efforts have therefore been undertaken to further develop three-dimensional bi-layer graphene foam with few defects and a predominant Bernal stacking configuration, a type of bilayer graphene where half of the atoms lie directly over the center of a hexagon in the lower graphene sheet, and half of the atoms lie over an atom, and to investigate its Li-storage capacity, process, kinetics, and resistances. Li atoms may be stored only in the graphene interlayer. Further, various physiochemical characterizations of the staged Li bilayer graphene products further reveal the regular Li-intercalation phenomena and illustrate this Li storage pattern of two-dimensions.

Electrochemical Capacitors (ECs)

Electrochemical capacitors (ECs), also referred to as ultracapacitors or supercapacitors, are being considered for uses in hybrid or full EVs. ECs can supplement, or in certain uses replace, traditional batteries, including high-performance Li ion batteries, used in an EVs to provide short bursts of power, such as that needed for forward propulsion, often needed for rapid acceleration. Traditional batteries may still be used provide uniform power for cruising at normal highway speeds, but supercapacitors, with their ability to release energy much more quickly than batteries, may activate and supplement battery-provided power at specific times, such as when a so-equipped car needs to accelerate, such as for merging, passing, emergency maneuvers, and hill climbing.

ECs must also store sufficient energy to provide an acceptable driving range, such as from 220-325 miles or more. And, to be cost- and weight-effective relative to additional battery capacity, ECs must combine adequate specific energy and specific power with long cycle life and meet cost targets as well. Specifically, ECs for application in EVs must store about 400 Wh of energy, be able to deliver about 40 kW of power for about 10 seconds and provide high cycle-life, such as >100,000 cycles.

The high volumetric capacitance density of an EC, such as 10 to 100 times greater than conventional capacitors, derives from using porous electrodes, which may incorporate, feature, and/or be constructed from scaffolded graphene-based materials, to create a large effective "plate area" and from storing energy in the diffuse double layer. This double layer, created naturally at a solid-electrolyte interface when voltage is imposed, has a thickness of only about 1-2 nm, therefore forming an extremely small effective "plate separation." In some ECs, stored energy is further augmented by pseudo-capacitance effects, occurring again at the solid-electrolyte interface due to electrochemical phenomena such as the redox charge transfer. The double layer capacitor is based on a high surface area electrode material, such as activated carbon, immersed in an electrolyte. A polarized double layer is formed at electrode-electrolyte interfaces providing high capacitance.

Overview

Introduction

Technological advances concerning modern carbon-based materials such as graphene have, in turn, enhanced applications of such materials in many end-use areas, such as in advanced secondary batteries. Such batteries can employ electrochemical Li intercalation or de-intercalation to take advantage of favorable properties of carbon and carbon-based materials, which can depend significantly on their respective morphology, crystallinity, orientation of crystallites, and defects as well. For instance, the electric storage capacity of a Li-ion battery can be enhanced by the selection and integration of desirable nano-structured carbon materials such as carbon in certain allotropes such as graphite and graphene, or nano-sized graphite, nanofibers, isolated single walled carbon nanotubes, nano-balls, and nano-sized amorphous carbon, each having small carbon nanostructures in which no dimension is greater than about 2 μm.

Known methods for fabricating carbon and Li-ion electrodes for rechargeable Li cells include steps for forming a carbon electrode. Such a carbon electrode can be composed of graphitic carbon particles adhered to each other by an ethylene propylene diene monomer binder used to achieve a carbon electrode capable of subsequent intercalation by Li-ions. The carbon electrode is then reacted with infiltrated lithium (Li) metal to incorporate Li-ions obtained therefrom into graphitic carbon particles of the electrode. A voltage can be repeatedly applied to the carbon electrode to initially cause a surface reaction between the Li-ions and to the carbon and subsequently cause intercalation of the Li-ions into crystalline layers of the graphitic carbon particles. With repeated application of the voltage, intercalation can be achieved to near a theoretical maximum and assist in the conduction of electrical current as may be desirable.

Other exfoliated graphite-based hybrid material compositions relate to:
- micron- or nanometer-scaled particles or coating which are capable of absorbing and desorbing alkali or alkaline metal ions, particularly, Li ions; and,
- exfoliated graphite flakes that are substantially interconnected to form a porous, conductive graphite network including pores defined therein.

The particles or coating resides in a pore of the network or is attached to a flake of the network. The exfoliated graphite amount is in the range of 5% to 90% by weight and the number of particles or amount of coating is in the range of 95% to 10% by weight.

Also, high capacity silicon-based anode active materials have been shown to be effective in combination with high capacity Li rich cathode active materials. Supplemental Li is shown to improve the cycling performance and reduce irreversible capacity loss for some silicon based active materials. Silicon based active materials can be formed in composites with electrically conductive coatings, such as pyrolytic carbon coatings or metal coatings, and composites can also be formed with other electrically conductive carbon components, such as carbon nano fibers and carbon nanoparticles.

And, known rechargeable batteries of an alkali metal having an organic electrolyte experiences little capacity loss upon intercalation of the carbonaceous electrode with the alkali metal. The carbonaceous electrode may include a multi-phase composition including both highly graphitized and less graphitized phases or may include a single phase, highly graphitized composition subjected to intercalation of Li at above about 50° C. Incorporation of an electrically conductive filamentary material such as carbon black intimately interspersed with the carbonaceous composition minimizes capacity loss upon repeated cycling.

Otherwise, a known Li based anode material can be characterized by including 1 $m^2/g$ or more of carbonaceous anode active material specific surface area, a styrene-butadiene rubber binder, and a fiber diameter formed to 1,000 nanometers of carbon fiber. Such anode materials are used for Li batteries, which have desirable characteristics, such as a low electrode resistance, high strength of the electrode, an electrolytic solution having excellent permeability, high energy density and a high rate charge/discharge. The negative electrode material contains 0.05 to 20 mass % of carbon fibers and a styrene at 0.1 to 6.0% by mass. Butadiene rubber forms the binder and may further contain 0.3 to 3% by mass thickener, such as carboxymethyl methylcellulose.

Existing technologies have been shown that relate to a battery that has an anode active material that has been:
- pre-lithiated; and,
- pre-pulverized.

Such an anode may be prepared with a method that comprises:
- providing an anode active material;
- intercalating or absorbing a desired amount of Li into the anode active material to produce a pre-lithiated anode active material;
- comminuting, referring to the reduction of solid materials from one average particle size to a smaller average particle size, by crushing, grinding, cutting, vibrating, or other processes, the pre-lithiated anode active material into fine particles with an average size less than 10 µm, preferably <1 µm and most preferably <200 nm; and,
- combining multiple fine particles of the pre-lithiated anode active material with a conductive additive and/or a binder material to form the anode.

The pre-lithiated particles are protected by a Li ion-conducting matrix or coating material. The matrix material is reinforced with nano graphene platelets.

Graphitic nanofibers have also been disclosed and include tubular fullerenes, commonly called "buckytubes", nano tubes and fibrils, which are functionalized by chemical substitution, are used as electrodes in electrochemical capacitors. The graphitic nanofiber-based electrode increases the performance of the electrochemical capacitors. Preferred nanofibers have a surface area greater than about 200 $m^2/gm$ and are substantially free of micropores.

And, known high surface area carbon nanofibers have an outer surface on which a porous high surface area layer is formed. Methods of making the high surface area carbon nanofiber include pyrolyzing a polymeric coating substance provided on the outer surface of the carbon nanofiber at a temperature below the temperature at which the polymeric coating substance melts. The polymeric coating substance used as the high surface area around the carbon nanofiber may include phenolics such as formaldehyde, polyacrylonitrile, styrene, divinyl benzene, cellulosic polymers and cyclotrimerized diethynyl benzene. The high surface area polymer which covers the carbon nanofiber may be functionalized with one or more functional groups.

Synthesis of the Presently Disclosed Carbons

As presented above, conventional Li-intercalated carbon-based compositions or compounds may include traditional battery electrode materials such as:
- graphene or multi-layer 3D graphene particles;
- electrically conductive carbon particles; and,
- binder, such as that provided as a fluid, such as a liquid, form and/or in particulate form, configured to retain carbon-based particle in their respective desired positions and to provide overall structural integrity to carbon-based systems.

In conventional techniques, particles are all typically deposited, such as being dropped into, existing slurry cast electrodes including current collectors made from metal foil such as copper. Slurry typically is prepared to contain an organic binder or binder material referred to as NMP, an organic compound consisting of a 5-membered lactam, used in the petrochemical and plastics industries as a solvent, exploiting its nonvolatility and ability to dissolve diverse materials. The ratio of active materials to conductive carbon or carbon-based particles is usually at 5 parts of conductive carbon to a predominant balance of active material with a nominal quantity of binder or binding material, such as NMP, included as well. The relative amounts of binder and conductive phases of carbon may be dictated by creating an electrically conductive path or paths between larger particles of those mentioned.

Regarding difficulties related to binder implementation and usage in secondary batteries, studies have shown that developing high-performance battery systems requires the optimization of every battery component, from electrodes and electrolyte to binder systems. However, the conventional strategy to fabricate battery electrodes by casting a mixture of active materials, a nonconductive polymer binder, and a conductive additive onto a metal foil current collector usually leads to electronic or ionic bottlenecks and poor contacts due to the randomly distributed conductive phases, which can be an issue that can be observed in either the anode or the cathode. And, when high-capacity electrode materials are employed, the high stress generated during electrochemical reactions can disrupt the mechanical integrity of traditional binder systems, resulting in decreased cycle life of batteries. Thus, there is a critical need to design novel and robust binder systems, or scaffolded carbon-based electrode structures that demonstrate structural integrity absent of usage of a binder, that can provide reliable, low-resistance, and continuous internal voids, micropores, and pathways to retain active material when and where desirable during battery charge-discharge cycles, and to connect all regions of the electrode.

In contrast to that traditionally done, and to address shortcomings of binder performance related to decreased cycle life of batteries, the presently disclosed inventive compositions of matter and methods or processes for the production thereof can eliminate:

any and all forms of a binder phase; and,
potentially certain regions, features and/or aspects of a conductive phase defined by larger carbon-based particles, such as those including graphite, and/or forms of graphene extracted or otherwise created from the exfoliation of graphite.

This is done by fabricating a particle where interconnected 3D agglomerations of multiple layers of graphene sheets fuse or sinter together, such as randomly, or with controlled directionality such as orthogonally, or otherwise adjoin together to serve as a type of intrinsic, self-supporting, "binder" or joining material that serves as a binder replacement, effectively allowing for the elimination of a separate traditional binder material to achieve substantial weight reduction. Such a format also permits for the elimination of a separate and dedicated current collector, which is typically a required component of many batteries. Elimination of the binder phase and/or the current collector, provide for beneficial and desirable features, such as:

having low per-unit production cost allowing for mass-producibility,
high reversible specific capacity,
low irreversible capacity,
small particle sizes, such as permitting for high throughput/rate capacity,
compatibility with commonly used electrolytes for convenient integration and usage in commercial battery applications, and
long charge-discharge cycle life for consumer benefit, across any number of demanding end-use applications, including automobiles, airplanes, and spacecraft.

Notably, techniques disclosed herein yield unexpected favorable results. They do not require traditional processes to create graphene sheets such as from the exfoliation of graphite, and instead synthesize one or more a multi-modal carbon-based s from an atmospheric plasma-based vapor flow stream. Synthesis of carbon-based particles can occur either in-flight to nucleate from an initially formed carbon-based homogenous nucleation or during deposition directly onto a supporting or sacrificial substrate. Therefore, any one or more of the presently disclosed techniques permit for the growth of ornate carbon-based structures independent of a traditionally required seed particle upon which nucleation occurs.

In conventional techniques, the production of functional graphene relies upon usage of graphite as a starting material. Graphite, being a conductive material, has been used as an electrode in batteries and other electrochemical devices. In addition to its function as an inert electrode, electrochemical methods have been employed to form graphite intercalation compounds (GICs) and, more recently, to exfoliate graphite into few-layered graphene. Exfoliation, as generally understood and as referred to herein, implies—in an intercalation chemistry related context—the complete separation of layers of material, and typically requires aggressive conditions involving highly polar solvents and aggressive reagents. Electrochemical methods are attractive as they eliminate the use of chemical oxidants as the driving force for intercalation or exfoliation, and an electromotive force is controllable for tunable GICs. More importantly, the extensive capabilities of electrochemical functionalization and modification enable the facile synthesis of functional graphene and its value-added nanohybrids.

Unlike exfoliation, inclusive of the thermal exfoliation of graphite to produce graphene, the presently disclosed methods relate to one or more carbon-inclusive gaseous species, such as those including methane ($CH_4$), being flowed into a reaction chamber of a microwave-based or thermal reactor. Upon receipt of energy, such as that provided by electromagnetic radiation and/or thermal energy, incoming gaseous species spontaneously crack to form allotropes with other cracked carbons from additional gaseous species supplied into the reactor to create an initial carbon-based site such as a formed particle, which either has or otherwise facilitates:

additional particles that grow or nucleate off of defects from that initial formed particle; or,
orthogonally fuse or sinter additional carbon-based particles, where there is sufficient local energy at the collision spot for the colliding particles to combine.

System Structure

Carbon-Based Particles—In Detail

Figure 1C:
Figure 1A:
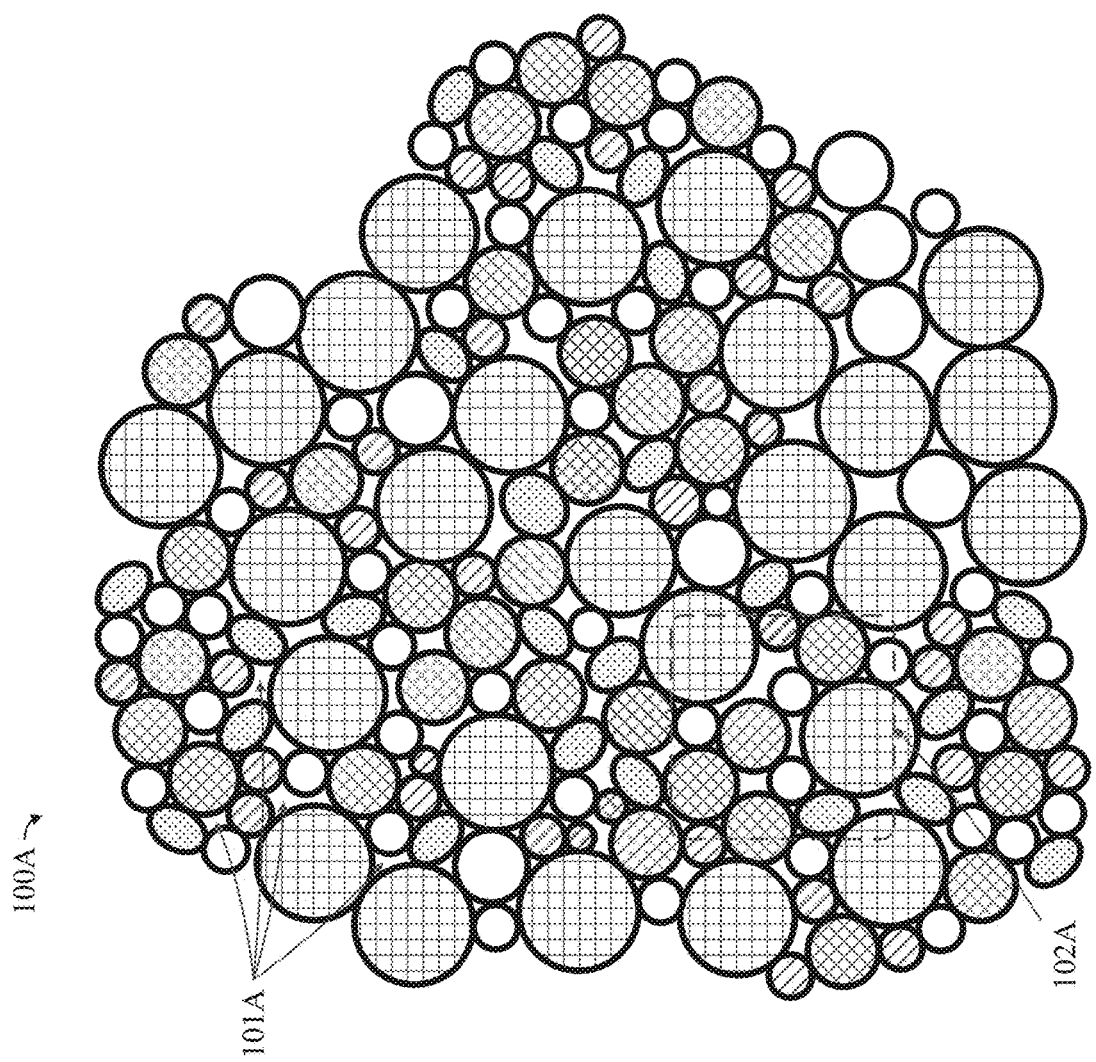

FIG. 1A shows a carbon-based particle 100A having controllable electrical and ionic conducting gradients therein, within which various aspects of the subject matter disclosed herein may be implemented. The carbon-based particle 100A can be synthesized through self-assembly independent of a binder to feature multi-modal dimensions, including various orifices, conduits, voids, pathways, conduits or the like, any one or more defined to have a specific dimension, such as being mesoporous. A mesoporous material implies a material containing pores with diameters between 2 and 50 nm, according to IUPAC nomenclature. For the purposes of comparison, IUPAC defines microporous material as a material having pores smaller than 2 nm in diameter and macroporous material as a material having pores larger than 50 nm in diameter.

Mesoporous materials may include various types of silica and alumina that have similarly sized mesopores. Mesoporous oxides of niobium, tantalum, titanium, zirconium, cerium and tin have been researched and reported. Of all the variants of mesoporous materials, mesoporous carbon, such as carbons and carbon-based materials have voids, orifices, pathways, conduits or the like having at least one mesoporous dimension, has achieved particular prominence, having direct applications in energy storage devices. Mesoporous carbon can be defined as having porosity within the mesopore range, and this significantly increases the specific surface area. Another common mesoporous material is activated carbon, referring to a form of carbon processed to have small, low-volume pores that increase the surface area. Activated carbon, in a mesoporous context, is typically composed of a carbon framework with both mesoporosity and microporosity, such as depending on the conditions under which it was synthesized. According to IUPAC, a mesoporous material can be disordered or ordered in a mesostructure. In crystalline inorganic materials, mesoporous structure noticeably limits the number of lattice units, and this significantly changes the solid-state chemistry. For example, the battery performance of mesoporous electroactive materials is significantly different from that of their bulk structure.

The carbon-based particle 100A is nucleated and grown in an atmospheric plasma-based vapor flow stream of reagent gaseous species such as methane ($CH_4$) to form an initial carbon-containing and/or carbon-based particle without specifically or explicitly requiring a separate stand-alone initial seed particle around which carbon structures are subsequently grown, as seen in conventional techniques. An initial carbon-based synthesized particle independent of a separate seed particle pursuant to the presently disclosed embodiments can then be expanded:

in-flight, describing the systematic coalescence pursuant to nucleation and/or growth from an initial carbon-based homogenous nucleation independent of a seed particle of additional carbon-based material derived from incoming carbon-containing gas mid-air within a microwave-plasma reaction chamber; or, by being grown and/or deposited directly onto a supporting or sacrificial substrate, such as a current collector, within a thermal reactor.

Coalescence implies a process in which two phase domains of the same composition come together and form a larger phase domain. Alternatively put, the process by which two or more separate masses of miscible substances seem to pull each other together should they make the slightest contact. The carbon-based particle 100A, may be alternatively referred to as just particle, and/or by any other similar term. The term mesoporous, as both generally understood and as used herein, may be defined as a material containing pores with diameters between 2 and 50 nm, according to International Union of Pure and Applied Chemistry (IUPAC) nomenclature.

Synthesis and/or growth of carbon-based particle 100A within a reaction chamber in and/or otherwise associated with a microwave-based reactor, such as a reactor is disclosed by Stowell, et al., "Microwave Chemical Processing Reactor", U.S. Pat. No. 9,767,992, filed on Sep. 19, 2017, incorporated by reference herein in its entirety. Synthesis can occur in systems other than microwave reactors such as taking place in a thermal reactor, referring generally to a chemical reactor defined by an enclosed volume in which a temperature-dependent chemical reactor occurs.

Figure 1E:
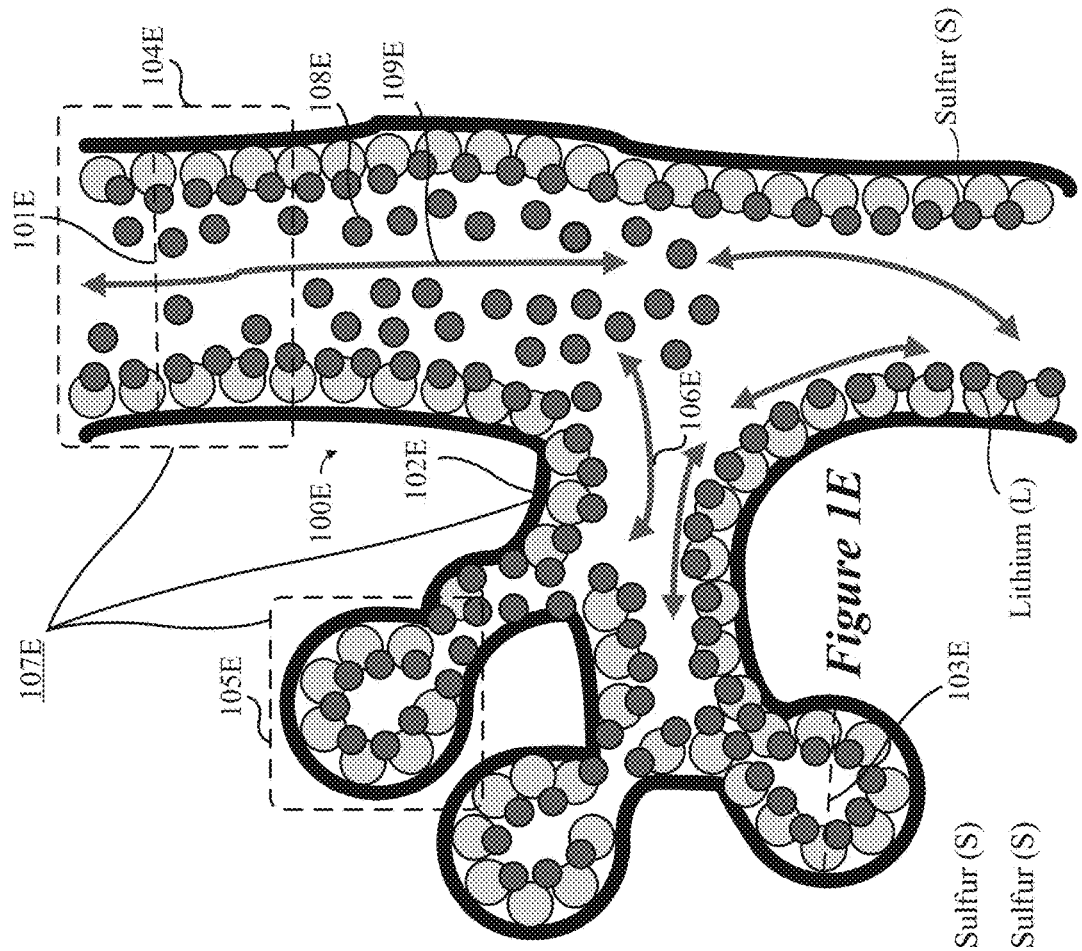
Figure 1D:
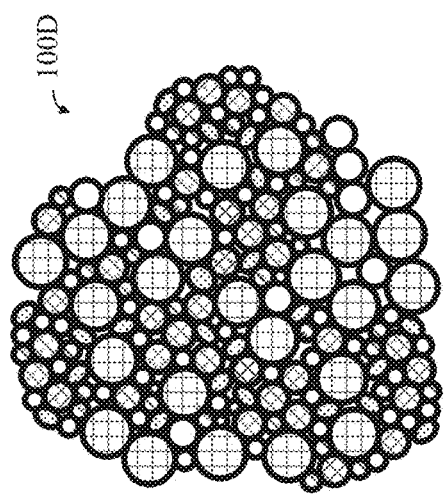

The carbon-based particle 100A, also shown as a carbon-based particle 100D in FIG. 1D, is synthesized as so described herein with a three-dimensional (3D) hierarchical structure comprising short range, local nano-structuring in combination with long range approximate fractal feature structuring, which in this context refers to the formation of successive layers positioned orthogonally to each other. Orthogonally here is defined as involving the 90-degree rotation of each successive layer relative to the one beneath it, and so on and so forth, allowing for the creation of vertical, or substantially vertical, layers and/or intermediate layers.

Contiguous microstructures 107E suitable for incorporation within an electrochemical cell cathode for lithium-sulfur (Li S) secondary systems are shown in FIG. 1E, which itself shows an enlarged and more detailed view of the hierarchical pores 101A shown in FIGS. 1A and 1D. In some implementations, contours and shapes of the contiguous microstructures 107E can structurally define the open porous scaffold 102A, as shown in FIG. 1A, with diffusion pathways 109E, which are suitable for Li ion transport from the anode to the cathode during discharge-charge cycles. The contiguous microstructures 107E can include:

microporous frameworks, such as the diffusion pathways 109E, defined by a dimension 101E of >50 nm that provide tunable Li ion conduits;

mesoporous channels defined by a dimension 102E of about 20 nm to about 50 nm (generally defined under IUPAC nomenclature and referred to as mesopores or mesoporous) that act as Li ion-highways for rapid Li ion transport therein; and microporous textures, such as pores 105E, defined by a dimension 103E of <4 nm for charge accommodation and/or active material, such as sulfur (S) in Li S systems, confinement.

A hierarchical porous network 100E including the diffusion pathways 109E, in addition to providing pores 105E for confining active material and defining pathways for ion transport, can be configured to define the contiguous microstructures 107E for providing active Li intercalating structures. Accordingly, the hierarchical porous network 100E of the carbon-based particle 100D can be implemented in either an anode or a cathode or, for example, a Li ion or a Li S battery system with a specific capacity rated at between about 744 mAh/g to about 1,116 mAh/g. For either Li ion or Li S configurations, Li can infiltrate open porous scaffold, such as when provided by molten Li metal via capillary infusion, to at least partially chemically react with exposed carbon therein in reactive systems.

One or more physical, electrical, chemical and/or material properties of the carbon-based particle 100A may be defined during its synthesis. Also, dopants, referring to traces of impurity element that is introduced into a chemical material to alter its original electrical or optical properties, such as Si, SiO, $SiO_2$, Ti, TiO, Sn, Zn, and/or the like. may be dynamically incorporated during synthesis of the carbon-based particle 100A to at least in part affect material properties including electrical conductivity, wettability, and/or ion conduction or transport through the hierarchical porous network 100E. Microporous textures having dimension 103E and/or hierarchical porous network 100E more generally may be synthesized, prepared, or created to include smaller pores for chemical, such as sulfur (S), micro-confinement, the smaller pores being defined as ranging from 1 to 3 nm. Also, each graphene sheet, such as shown in FIG. 1C, may range from 50 to 200 nm in diameter ($L_a$).

The open porous scaffold 102A may be synthesized independent of a binder, such as a traditional, nonconductive polymer binder typically used in conjunction with and a conductive additive onto a metal foil current collector in battery end-use applications. Traditional configurations involving usage of a binder can lead to electronic/current conduction-related or ionic constrictions and poor contacts due to randomly distributed conductive phases. Moreover, when high-capacity electrode materials are employed, relatively high physical stress generated during electrochemical reactions can disrupt mechanical integrity of traditional binder systems, therefore, in turn, reducing cycle life of batteries.

A vapor flow stream used to synthesize the carbon-based particle 100A, or the carbon-based particle 100D, which is or can be identical to the carbon-based particle 100A, may be at least flowed in part into a vicinity of a plasma, such as that generated and/or flowed into a reactor and/or chemical reaction vessel. Such a plasma reactor may be configured to propagate microwave energy toward the vapor flow stream to at least in part assist with synthesis of carbon-based particle 100A, may involve carbon-particle based and/or derived nucleation and growth from constituent carbon-based gaseous species, such as methane ($CH_4$), where such nucleation and growth may substantially occur from an initially formed carbon-based homogenous nucleation independent of a seed particle within a reactor. Such a reactor accommodates control of gas-solid reactions under non-equilibrium conditions, where the gas-solid reactions may be controlled at least in part by any one or more of:
- ionization potentials and/or thermal energy associated with constituent carbon-based gaseous species introduced to the reactor for synthesis of the carbon-based particle; and/or
- kinetic momentum associated with the gas-solid reactions.

The vapor flow stream may be flowed into a reactor and/or reaction chamber for the synthesis of carbon-based particle 100A at substantially atmospheric pressure. And, change in wettability of carbon-based particle 100A and/or any constituent members such as open porous scaffold 102A at least in part may involve adjustment of polarity of a carbon matrix associated with carbon-based particle 100A.

Procedures for Synthesis

Microwave Reactor

A vapor flow stream including carbon-containing constituent species, such as methane ($CH_4$), may be flowed into one of two general reactor types to produce the carbon-based particle 100A:
- a thermal reactor; or,
- a microwave-based reactor. Suitable types of microwave reactors are disclosed by Stowell, et al., "Microwave Chemical Processing Reactor", U.S. Pat. No. 9,767,992 files on Sep. 19, 2017, incorporated herein by reference in its entirety.

The term in-flight implies a novel method of chemical synthesis based on contacting particulate material derived from inflowing carbon-containing gaseous species, such as those containing methane ($CH_4$), to crack such gaseous species. Cracking, as generally understood and as referred to herein, implies the technical process of methane pyrolysis to yield elemental carbon, such as high-quality carbon black, and hydrogen gas, without the problematic contamination by carbon monoxide, and with virtually no carbon dioxide emissions. A basic endothermic reaction that may occur within a microwave reactor to create the carbon-based particle 100A is shown as equation (7) below:

$$CH_4 + 74.85 \text{ kJ/mol} \rightarrow C + 2H_2 \quad (7)$$

Carbon derived from the above-described cracking process and/or a similar or a dissimilar process may fuse together while being dispersed in a gaseous phase, referred to as in-flight, to create carbon-based particles, structures, substantially 2D graphene sheets, 3D agglomerations, and/or pathways defined therein, including:
- interconnected 3D agglomerations 101B of multiple layers of graphene sheets 101C and/or single layer graphene as schematically depicted in FIG. 1C, that are fused together to form the open porous scaffold 102A that facilitates electrical conduction along and across contact points of the graphene sheets 101C, which, as shown in FIG. 1B, may include and/or refer to 5 to 15 layers of few-layer graphene that are oriented in a stacked configuration to have a vertical height referred to as a stack height ($L_c$); and,
- any one or more of the contiguous microstructures 107E interspersed with or otherwise defined in shape by the interconnected 3D agglomerations 101B; in some configurations, the interconnected 3D agglomerations can be prepared to comprise one or more of single layer graphene (SLG), few layer graphene (FLG) defined as ranging from 5 to 15 layers of graphene, or many layer graphene (MLG).

As introduced earlier, interconnected 3D agglomerations of multiple layers of graphene sheets 101B orthogonally fused together to serve as a type of intrinsic, self-supporting, binder or joining material allowing for the elimination of a separate traditional binder material. Such procedures are substantially different from conventional sintering, or frittage, as commonly understood and as referred to herein, which implies the process of compacting and forming a solid mass of material by heat or pressure without melting it to the point of liquefaction where materials are bonded at specific acute angles to one-another.

Few layer graphene (FLG), defined herein as ranging from 5 to 15 layers or sheets of graphene, are fused at an angle that is not flat relative to other FLG sheets to nucleate and/or grow at an angle and therefore self-assemble over time. Moreover, process conditions may be tuned to achieve synthesis, nucleation, and/or growth of the carbon-based particle 100A, also referring to a plurality of carbon-based particles, on a component and/or a wall surface within a reaction chamber, or entirely in-flight upon contact with other carbon-based materials.

Electrical conductivity of deposited carbon and/or carbon-based materials may be tuned by adding metal additions into the carbon phase in the first part of the deposition phase or to vary the ratios of the various particles discussed. Other parameters and/or additions may be adjusted, as a part of an energetic deposition process, such that the degree of energy of deposited carbon and/or carbon-based particles will either:
- bind together; or,
- not bind together.

By nucleating and/or growing the carbon-based particle 100A in an atmospheric plasma-based vapor flow stream either in-flight or directly onto a supporting or sacrificial substrate, a number of the steps and components found in both traditional batteries and traditional battery-making processes can be eliminated. Also, a considerable amount of tailoring and tunability can be enabled or otherwise added into the discussed carbons and/or carbon-based materials.

For instance, a traditional battery may use a starting stock of active materials, graphite, etc., which may be obtained as off-the-shelf materials to be mixed into a slurry. In contrast, the carbon-based particle 100A disclosed herein may enable, as a part of the carbon or carbon-based material synthesis and/or deposition process, tailoring and/or tuning the properties of materials, in real-time, as they are being synthesized in-flight and/or deposited onto a substrate. This capability presents a surprising, unexpected, and substantial favorable departure from that currently available regarding creation of carbon-based scaffolded electrode materials in the secondary battery field.

Reactor and/or reactor design of that disclosed by Stowell, et al., "Microwave Chemical Processing Reactor", U.S. Pat. No. 9,767,992 filed on Sep. 19, 2017 may be adjusted, configured and/or tailored to control wanted or unwanted nucleation sites on internal surfaces of reaction chambers exposed to carbon-based gaseous feedstock species, such as methane ($CH_4$). In-flight particles qualities may be influenced by their solubility in the gaseous species in which they are flowed in such that once a certain energy level is achieved, it is not inconceivable for carbon to crack off, as described by thermal cracking, and form its own solid in a microwave reactor.

Adjusting for Unwanted Carbon Accumulation on Reaction Chamber Walls

Moreover, tuning of disclosed reactors and related systems may be performed to both proactively, such as prior to the observation of undesirable process conditions, and reactively, such as after such conditions are observed, address issues associated with carbon-based microwave reactor clogging. For instance, open surfaces, feed holes, hoses, piping, and/or the like may accumulate unwanted carbon-based particulate matter as a by-product of synthetic procedures performed to create carbon-based particle 100A. A central issue observed in a microwave reactor may include this tendency to experience clogging in and/or along orifices, the reason being related to walls and other surfaces exposed to in-flowing gaseous carbon-containing species having carbon solubility as well. Therefore, is it possible to unwantedly grow on the walls of a reaction chamber and/or on the exit tube. Over time, those growths will extend out and ultimately impinge flow and can shut down chemical reactions occurring within the reactor and/or reaction chamber. Such a phenomena may be akin to tube, such as an exhaust, wall build-up of burnt oil in a high-performance or racing internal combustion engine, where, instead of burning, such as combusting, fossil-fuel based gasoline, methane is used to result in the unwanted deposit of carbon on reaction chamber wells since metal inside the reaction chamber itself has a carbon solubility level.

Although methane is primarily used to create carbon-based particle 100A, any carbon-containing and/or hydrocarbon gas, like $C_2$ or acetylene or any one or more of: $C_2H_2$, $CH_4$, butane, natural gas, biogas, such as that derived from decomposition of biological matter, will likewise function to provide a carbon-containing source.

The described uncontrolled and unwanted carbon growth within exposed surfaces of a microwave reactor may be compared to that occurring within an internal combustion engine exhaust manifold, as opposed to the cylinder bore, of the engine, especially where the plume of plasma, such as hot and excited gas about to enter into the plasma phase, is at the onset of the manifold, and burnt gas and carbon-based fragments are traveling down and plugging-up flow through the manifold, cross-pipes, and catalytic converter, and exit-pipes. Process conditions may therefore be proactively tuned to adjust and therefore accommodate for potential carbon-build-up in the microwave reactor, which relies on the presence of a plasma for hydrocarbon gas cracking. To maintain this plasma, a certain set of conditions must be maintained, otherwise back-pressure accumulation can destroy the plasma prior to its creation and subsequent ignition, etc.

Thermal Reactor

In the alternative or addition to synthesis of carbon-based particle 100A in a microwave reactor, structured carbons can be created by thermally cracking hydrocarbons by heat application in a reactor, such as a thermal reactor. Example configurations may include exposure of incoming carbon-based gaseous species, such as any one or more of the aforementioned hydrocarbons, to a heating element, similar to a wire in a lightbulb.

The heating element heats up the inside of a reaction chamber where incoming carbon-containing gas is ionized. The carbon-containing gas is not burnt, due to the absence of sufficient oxygen to sustain combustion, but is rather ionized from contact with incoming thermal radiation, such as in the form of heat, to cause nucleation of constituent members of carbon-based particle 100A, and ultimately synthesize, via nucleation, carbon-based particle 100A, and/or carbon-based particles similar to it, in its entirety. In thermal reactors, at least some of the observed nucleation of carbon-based particles can occur on walls or on the heating element itself. Nevertheless, particles can still nucleate which are small enough to be cracked by the speed of flowing gas, where such particles are captured to assist in the creation of carbon-based particle 100A.

Cracked carbons can be used to create a multi-shell fullerene carbon nano-onion (CNO), and/or other fullerenes, and smaller fractions of carbons with fullerene internal crystallography. In comparing synthesis of carbon-based particle 100A via microwave and thermal reactors, the following distinctions have been observed:

microwave reactors can provide tuning capabilities suitable to provide a broader range of allotropes of carbon; whereas, thermal reactors tend to allow for the fine-tuning of process parameters, such as heat flow, temperature, and/or the like, to achieve the needs of specific end-use application targets of carbon-based particle 100A.

For instance, thermal reactors are currently being used to build Li S electrochemical cell electrodes, such as anodes and cathodes. Typical treatment process temperatures range in the thousands of Kelvin, to produce the carbon-based particle 100A and/or carbon-based aggregates associated therewith, when compressed, have an electrical conductivity greater than 500 S/m, or greater than 5,000 S/m, or from 500 S/m to 20,000 S/m. Optimal performance has been observed at between 2,000-4,000 K.

Carbon-Based Particle—Physical Properties & Implementation in Li Ion and Li S Batteries Any of the carbon-based structures shown in FIG. 1A-1F may be incorporated into a secondary battery electrode, such as that of a lithium (Li) ion battery, as substantially set forth by Lanning, et al., "Lithium Ion Battery and Battery Materials", U.S. Pat. Pub. No. 2019/0173125, published on Jun. 6, 2019, incorporated by reference herein in its entirety. Disclosed implementations typically relate to Li incorporation or infusion within the anode, although carbon-based systems can be revised for compatibility and integration with the cathode, especially in Li S systems where microconfinement of S is desirable to mitigated unwanted polysulfide (PS) shuttle and cell self-discharge.

Particulate carbon contained in and/or otherwise associated with carbon-based particle 100A may be implemented in a Li ion battery anode or cathode as a structural and/or electrically conductive material and be characterized by hierarchical porous network 100E with a wide distribution of pore sizes, also referred to as a multi-modal pore size distribution. For example, particulate carbon can contain multi-modal distribution of pores in addition or in the alternative to the contiguous microstructures 107E, as shown in FIG. 1E, that at least in part further define open porous scaffold 102A with one or more the diffusion pathways 109E. Such pores may have sizes from 0.1 nm to 10 nm, from 10 nm to 100 nm, from 100 nm to 1 micron, and/or larger than 1 micron. Pore structures can contain pores with a multi-modal distribution of sizes, including smaller pores, with sizes from 1 nm to 4 nm, and larger pores, with sizes from 30 to 50 nm. Such a multi-modal distribution of pore sizes in carbon-based particle 100A can be beneficial in Li S battery system configurations, where S-containing cathodes in Li S batteries can be confined in the pores 105E having the dimension 103E of approximately less than 1.5 nm or in the range 1 to 4 nm in size. Control of saturation and crystallinity of S and/or of generated S compounds in a carbon-based cathode including the contiguous microstructures 107E in larger pores or pathways ranging from 30 to 50 nm in size, or pores greater than twice the size of solvated lithium ions (such as lithium, Li, ions 108E), can enable and/or facilitate rapid diffusion, or, mass transfer, of solvated Li ions in the cathode.

As introduced earlier, the lithium-sulfur battery, abbreviated as a Li—S battery, is a type of rechargeable battery, notable for its high specific energy. A Li—S battery, can include sulfur (S) infiltrated or infused for confinement within the pores 105E and along exposed surfaces of the contiguous microstructures 107E of mesoporous particle 100D. Accordingly, S can infiltrate the open porous scaffold 102A, when incorporated into a cathode of a Li S battery, to deposit on internal surfaces of the carbon-based particle 100A, 100D and/or within the contiguous microstructures 107E, as shown in FIG. 1E and by schematic 100F shown in FIG. 1F, which shows intermediate steps associated with the reduction of sulfur to the sulfide ion ($S^{2-}$).

Carbon-Based Particle—Formed to Address Polysulfide (PS)-Related Challenges

Figure 1F:
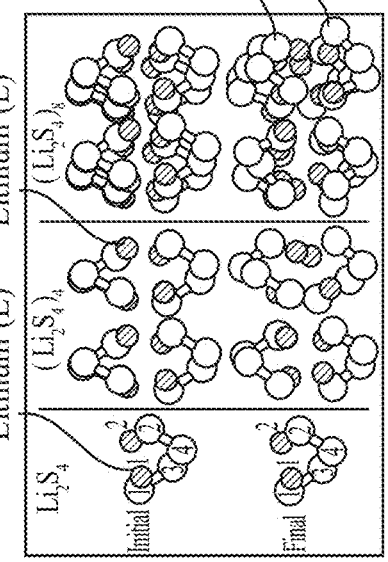
FIG. 1F shows schematic diagrams representative of intermediate steps for the reduction of sulfur and/or the formation of polysulfides (PS).

Seeking to address at least some of the challenges associated with such polysulfide (PS) systems, carbon-based particle 100A and cathodic active material form a meta-particle framework, where cathodic electroactive materials, such as elemental sulfur that may form PS compounds 100F as shown in FIG. 1F, are arranged within carbon pores/channels, such as within any one or more of the contiguous microstructures 107E, as shown in FIG. 1E, including pores 104E, 105E, and/or pathways 106E and/or the diffusion pathways 109E. S can be, for example, substantially incorporated within the contiguous microstructures 107E at a loading level that represents 35-100% of the total weight/volume of active material in carbon-based particle 100A and/or 100E overall.

This type of organized particle framework can provide a low resistance electrical contact between the insulating cathodic electroactive materials, such as elemental S, and the current collector while providing relatively high exposed surface area structures that are beneficial to overall specific capacity and that may assist Li ion micro-confinement as enhanced by the formation of Li S compounds temporarily retained in the contiguous microstructures 107E, such as in the pores 105E, to in turn control and direct migration of Li ions as may be related to electric current conduction in a battery electrode and/or system. Implementations of carbon-based particle 100A can also benefit cathode, as well as anode, stability by trapping at least some portion of any created polysulfides by using tailored structures, such as that shown by the contiguous microstructures 107E, to actively prevent them from unwantedly migrating through electrolyte to the anode resulting in unwanted parasitic chemical reactions associated with battery self-discharge.

Migration of Polysulfides (PS) During Li S Battery System Usage

As introduced earlier, with reference to PS shuttle mechanisms observed in Li S battery electrodes and/or systems, PS dissolve very well in electrolytes. This causes another Li—S cell characteristic, the shuttle mechanism. The PS $S_{n2}$—that form and dissolve at the cathode, diffuse to the Li anode and are reduced to $Li_2S_2$ and $Li_2S$. The PS species $S_n^{2-}$ that form at the cathode during discharging dissolve in the electrolyte there. A concentration gradient versus the anode develops, which causes the PS to diffuse toward the anode. Step by step, the PS are distributed in the electrolyte. Subsequent high-order PS species react with these compounds and form low-order polysulfides $S_{(n-x)}$. This means that the desired chemical reaction of sulfur at the cathode partly also takes place at the anode in an uncontrolled fashion, where both chemical and electrochemical reactions are conceivable, which negatively influences overall cell characteristics.

If low-order PS species form near the anode, they diffuse to the cathode. When the cell is discharged, these diffused species are further reduced to $Li_2S_2$ or $Li_2S$. As a result, the cathode reaction partly takes place at the anode during the discharging process or, rather, the cell self-discharges. Both are undesirable effects decreasing specific capacity. In contrast, the diffusion to the cathode during the charging process is followed by a re-oxidation of the PS species from low order to high order. These PS then diffuse to the anode again. This cycle is generally known as the shuttle mechanism, which can be very pronounced, it is possible that a cell can accept an unlimited charge to be chemically short-circuited. In general, the shuttle mechanism causes a parasitic sulfur active matter loss. This is due to the uncontrolled separation of $Li_2S_2$ and $Li_2S$ outside of the cathode area and it eventually causes a considerable decrease in cell cycling capability and service life. Further aging mechanisms can be an inhomogeneous separation of $Li_2S_2$ and $Li_2S$ on the cathode or a mechanical cathode structure breakup due to volume changes during cell reaction.

Pores of Carbon-Based Particle Confine Sulfur and Prevent PS Shuttle to the Anode To address the phenomenon of PS shuttling, any one or more of the contiguous microstructures 107E of carbon-based particle 100A in a cathode can provide a region formed with an appropriate dimension, such as the pores 105E having the dimension 103E of less than 1.5 nm, to drive the creation of lower order polysulfides, such as S and $Li_2S$, and therefore prevent the formation of the higher order soluble polysulfides, $Li_xS_y$, with y greater than 3, that facilitate Li shuttle, such as loss to the anode. As described herein, the structure of the particulate carbon and the cathode mixture of materials can be tuned during particulate carbon formation within a microwave plasma or thermal reactor. In addition, cathodic electroactive materials, such as elemental sulfur, solubility and crystallinity in relation to Li phase formation, can be confined/trapped within the micro- and/or meso-porous framework of the contiguous microstructures 107E of carbon-based particle 100A.

A multi-modal distribution of pore sizes can be indicative of structures with high surface areas and a large quantity of small pores that are efficiently connected to the substrate and/or current collector via material in the structure with larger feature sizes to provide more conductive pathways through the structure. Some non-limiting examples of such structures are fractal structures, dendritic structures, branching structures, and aggregate structures with different sized interconnected channels composed of pores and/or particles that are roughly cylindrical and/or spherical.

Example particulate carbon materials used in the Li ion or Li S batteries described herein are described in U.S. Pat. No. 9,997,334, entitled "Seedless Particles with Carbon Allotropes," which is assigned to the same assignee as the present application, and is incorporated herein by reference. The particulate carbon materials can contain graphene-based carbon materials that include a plurality of carbon aggregates, each carbon aggregate having a plurality of carbon nanoparticles, each carbon nanoparticle including graphene, optionally including multi-walled spherical fullerenes, and optionally with no seed particles such as with no nucleation particle. In some cases, the particulate carbon materials are also produced without using a catalyst. The graphene in the graphene-based carbon material has up to 15 layers. A ratio of carbon to other elements, except hydrogen, in the carbon aggregates is greater than 99%. A median size of the carbon aggregates is from 1 micron to 50 microns, or from 0.1 microns to 50 microns. A surface area of the carbon aggregates is at least 10 $m^2/g$, or is at least 50 $m^2/g$, or is from 10 $m^2/g$ to 300 $m^2/g$ or is from 50 $m^2/g$ to 300 $m^2/g$, when measured using a Brunauer-Emmett-Teller (BET) method with nitrogen as the adsorbate. The carbon aggregates, when compressed, have an electrical conductivity greater than 500 S/m, or greater than 5,000 S/m, or from 500 S/m to 20,000 S/m.

Distinctions Between the Carbon-Based Particles and Conventional Technology

Conventional composite-type Li-ion or Li S battery electrodes may be fabricated from a slurry cast mixture of active materials, including conductive additives such as fine carbon black and graphite for usage in a battery cathode at a specific aspect ratio, and polymer-based binders that are optimized to create a unique self-assembled morphology defined by an interconnected percolated conductive network. While, in conventional preparations or applications, additives and binders can be optimized to improve electrical conductivity there-through by, for example, offering lower interfacial impedance and therefore correspondingly yield improvements in power performance and delivery, they represent a parasitic mass that also necessarily reduces specific, also referred to as gravimetric, energy and density, an unwanted end result for current demanding high-performance battery applications.

To minimize losses due to parasite mass, such as that caused by increased active and/or inactive ratio, and concurrently enable faster access of electrolyte to the complete surface of an electrode, the diffusion pathways 109E may be re-oriented to effectively shorten Li ion diffusion path lengths for charge transfer. The hierarchical pores 101A and/or the open porous scaffold 102A may be created from reduced-size carbon particles and/or active materials down to nanometer scales. The external specific surface area (SSA), defined as the total surface area of a material per unit of mass, with units of $m^2/kg$ or $m^2/g$, or solid or bulk volume (units of $m^2/m^3$ or $m^{-1}$) is a physical value of any one or more of the presently disclosed carbon particles that can be used to determine the type and properties of a material. For instance, the SSA of a sphere increases with decreasing diameter. However, as the particle size is decreased down into the nanometer size range there are associated attractive van der Waal forces that can impede dispersion, facilitate agglomeration, and thereby increase cell impedance and reduce power performance.

Another approach to shortening ion diffusional pathways, referring to the diffusion pathways 109E shown in FIG. 1E, is to uniquely engineer the internal porosity of the constitutive carbon-based particles, such as those created by the agglomerations 101B to create the contiguous microstructures 107E. A surface curvature can be referred to as a pore if its cavity is deeper than it is wide. As a result, this definition necessarily excludes many nanostructured carbon materials where just the external surface area is modified, or in close packed particles where voids, such as intra-particular spaces or regions, are created between adjacent particles, as in the case of a conventional slurry cast electrode.

With respect to the engineering, referring to the synthesis, creation, formation, and/or growth of carbon-based particle 100A either in-flight in a microwave-based reactor or via layer-by-layer deposition in a thermal reactor as substantially described earlier, reactor process parameters may be adjusted to tune the size, geometry, and distribution of hierarchical pores 101A and/or the contiguous microstructures 107E within carbon-based particle 100A. Hierarchical pores 101A and/or the contiguous microstructures 107E within carbon-based particle 100A may be tailored to achieve performance figures particularly well-suited for implementation in high-performance fast-current delivery devices, such as supercapacitors.

As generally described earlier, a supercapacitor (SC), also called an ultracapacitor, is a high-capacity capacitor with a capacitance value much higher than other capacitors, but with lower voltage limits, that bridges the gap between electrolytic capacitors and rechargeable batteries. It typically stores 10 to 100 times more energy per unit volume or mass than electrolytic capacitors, can accept and deliver charge much, much faster than batteries, and tolerates many more charge and discharge cycles than rechargeable batteries.

In many of the available off-the-shelf commercial carbons used in early supercapacitor development efforts, there were worm-like narrow pores which became a bottleneck or liability when operating at high current densities and fast charge- and discharge rates, as electrons may encounter difficulty in flow through, in or around such structures or pathways. Even though pore dimensions were fairly uniform but still adjustable to accommodate a wide range of length scales, real-life achievable performance was still self-limited, as based on the structural challenges inherent to the worm-like narrow pores.

Compared to conventional porous materials with uniform pore dimensions that are tuned to a wide range of length scales, the presently disclosed 3D hierarchical porous materials, such as that shown by hierarchical pores 101A and/or the contiguous microstructures 107E within carbon-based particle 100A, may be synthesized to have well-defined pore dimensions, such as the contiguous microstructures 107E including pores 104E, 105E, and/or pathways 106E and/or the diffusion pathways 109E and topologies to overcome the shortcomings of conventional mono-sized porous carbon particles by creating multi-modal pores and/or channels having the following dimensions and/or widths:

meso (2 nm<$d_{pore}$<50 nm) pores;
macro ($d_{pore}$>50 nm) pores 201A to minimize diffusive resistance to mass transport; and,
micro ($d_{pore}$<2 nm) pores 202 to increase surface area for active site dispersion and/or ion storage, capacitance relating to density and number of ions that can be stored within a given pore size, such as that shown by the pore 105E having the dimension 103E in FIG. 1E.

Although no simple linear correlation has been experimentally established between surface area and capacitance, the carbon-based particle 100A provides optimal micropore size distributions and/or configurations that are different for each intended end-use application and corresponding voltage window. To optimize capacitance performance, the carbon-based particle 100A may be synthesized with very narrow pore size distributions (PSD); and, as desired or required voltages are increased, larger pores are preferred. Regardless, current state-of-the-art supercapacitors have provided a pathway to engineering the presently disclosed 3D hierarchical structured materials for particular end-use applications.

In supercapacitors, capacitance and power performance is primarily governed by, for example:
surface area of the pore wall;
size of pore; and
interconnectivity of the pore channels, which affects electric double layer performance.

In contrast, Li ion and/or Li—S storage batteries undergo faradaic reduction/oxidation reactions within the active material and thereby may need many of the Li ion transport features of a supercapacitor, such as efficiently oriented and/or shortened Li ionic diffusion pathways. Regardless, in any application, including a supercapacitor as well as a traditional Li ion or Li S secondary battery, a 3D nanocarbon-based framework/architecture, such as that defined open porous scaffold 102A, can provide continuous electrical conducting pathways, such as across and along electrically conductive interconnected agglomerations of graphene sheets 101B, alongside, for example, highly-loaded active material having high areal and volumetric specific capacity.

Carbon-Based Particle Used as a Formative Material for a Cathode

To address prevailing issues with relatively low electrical and ionic conductivities, volume expansion and polysulfide (PS) dissolution in current Li S cathode electrode designs, the carbon-based particle 100A has the hierarchical pores 101A and/or the contiguous microstructures 107E formed therein to define the open porous scaffold 102A, which includes the pores 105E with microporous textures having the dimension 103E, such as approximately less than 1.5 nm or 1-4 nm cavities suitable to confine elemental sulfur and/or Li S related compounds. The open porous scaffold 102A, while confining sulfur, also provides a host scaffold-type structure to manage S expansion to ensure electron conduction across the sulfur-carbon (S—C) interface, such as at contact and/or interfacial regions of S and C within the pores 105E by, for example, tailored in-situ nitrogen (N) doping of the carbon (C) within the reactor. Confining S within a nanometer (nm) scale cavity, such as pores 105E with microporous textures 103E, favorably alters both:
the equilibrium saturation, such as the solubility product; and,
crystalline behavior of S, such that S remains confined as may be necessary for desirable electrical conduction upon dissociation of Li S compounds, etc. within microporous textures or the pores 105E having the dimension 103E, with no external driving force required to control unwanted PS migration to the anode electrode.

As a result, the dimension 103E of the pores 105E results in no need for separators that attempt to impede polysulfide (PS) diffusion while, at the same time, negatively impacting cell impedance, such as the effective resistance of an electric circuit or component to alternating current, arising from the combined effects of ohmic resistance and reactance, and polarization. By using carbon with optimum, relative to elemental S, Li and/or Li S micro-confinement, and non-optimum multi-modal, referring to the contiguous microstructures 107E including pores 104E, 102E, and/or 103E, or (alternatively) bi-modal pore distributions, the carbon-based particle 100A demonstrates operation of the principle of micro-confinement in properly optimized structures.

Figure 1G:
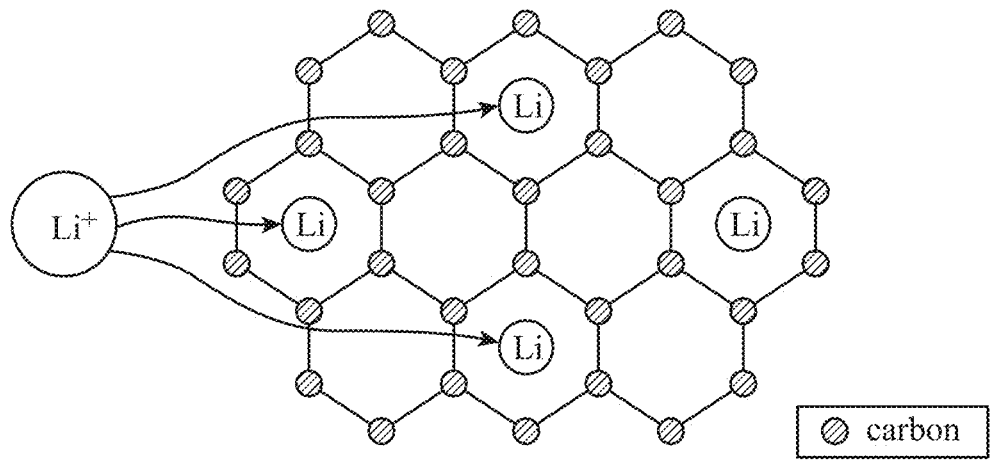
FIGS. 1G and 1H show schematics for placement and/or intercalation of Li ions in carbon lattices and structures.
Figure 1H:
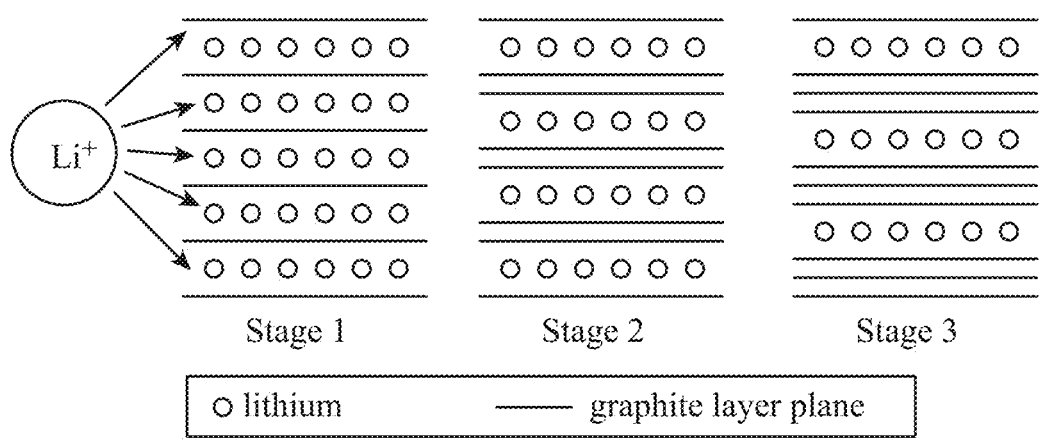

Such optimized structures include incorporation with the agglomerations 101B, which can themselves be prepared to include parallel stacked graphene layers, such as that produced from graphite having strong (002) dimensionality to random few-layer (FL) graphene with nanoscopic pores having low (002) dimensionality. FIGS. 1G and 1H show systematic intercalation of Li ions in carbon lattices and structures, being positioned within individual graphene layer cells in FIG. 1G, and in-between adjacent and parallel graphene layers in FIG. 1H. The configurations shown in FIG. 1H can include multiple stages, including Stages 1 through 3, each state representing various dimensions and spacing levels of graphite layer planes to yield a theoretic specific capacity of approximately 372 mAh/g at the cathode, or more.

Figure 2:
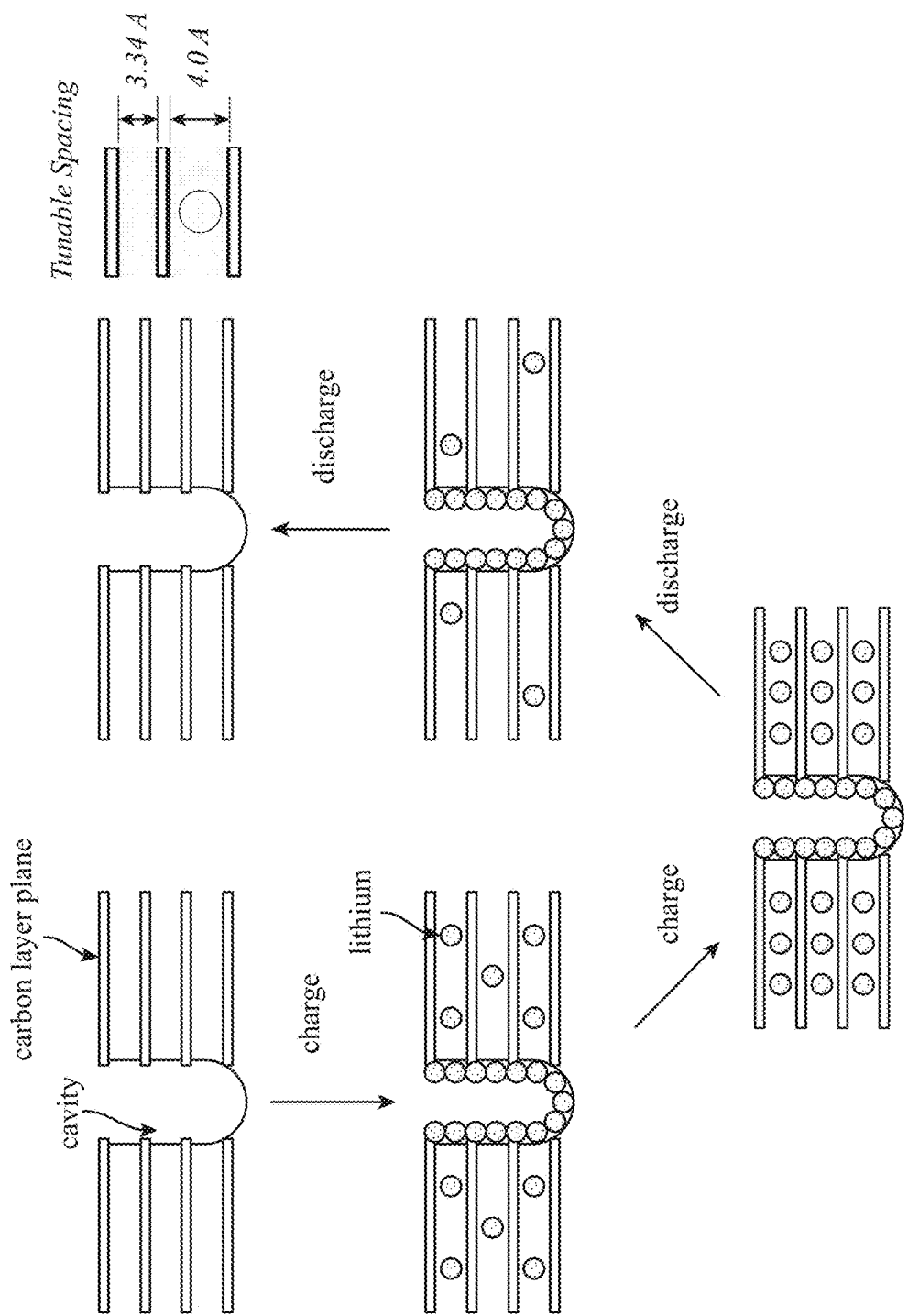
FIG. 2 show schematics for cavities that are formed extending depth-wise into several of the adjacent stacked FL graphene layers.

FIG. 2 shows an evolution beyond conventional adjacent stacked FL graphene layers shown in Stages 1 to 3 in FIG. 1H, where cavities are formed extending depth-wise into several of the adjacent stacked FL graphene layers, each layer having tunable D-spacing ranging from approximately 3.34 Å to 4.0 Å, or 3 Å to 20 Å. Accordingly, Li ions can be intercalated between adjacent graphene layers as well as forming a layer on exposed surfaces of the cavity, also referred to as a nanoscopic pore, to yield a specific capacity range in excess of 750 mAh/g. When viewed collectively, an example enlarged section of the 3D self-assembled binderless carbon-based particle can coalesce to form a carbon-based network, lattice, scaffold, or particle, which may include any one or more of the presently-disclosed carbon-based structures shown in FIG. 1A through FIG. 1E, according to some implementations. The carbon-based network can include any one or more of a plurality of macropores or micropores 202.

Figure 3:
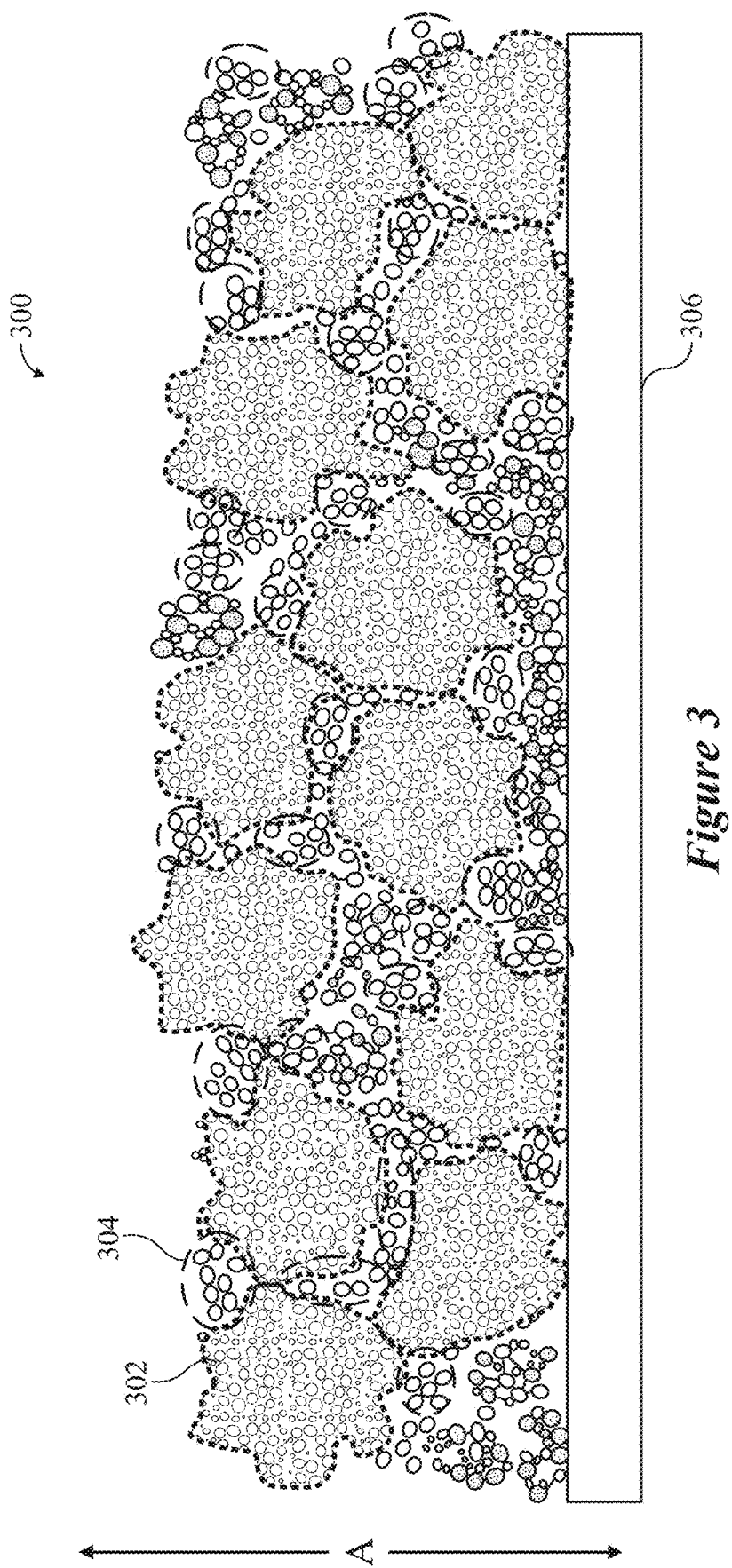
FIG. 3 shows a schematic of a multi-layered carbon-based scaffolded structure.

The carbon-based particle 100A also provides the ability to effectively load or infuse carbon scaffold 300 shown in FIG. 3 with elemental Li, such as that provided from molten Li metal or a vapor derivative thereof. The carbon scaffold 300 can be created in-reactor by either:
layer-by-layer deposition of multiple carbon-based particles 100A by a slurry-case method; or,
by a continuous sequence of a group of plasma spray-torches, as shown by plasma spray-torch system 400B in FIG. 4B, with sulfur, such as elemental sulfur.

For Li S battery performance to reliably exceed conventional Li ion batteries, industry-scalable techniques must achieve high S loading, such as >70% sulfur per unit volume, relative to all additives and components of a given cathode template, while maintaining the native specific capacity of the S active material. Attempts to incorporate S into a cathode host, such as by any one or more of, performed independently or in any combination: electrolysis, wet chemical, simple mixing, ball milling, spray coating, and catholytes, have either not fully incorporated the S as desirable, or are otherwise not economically scalable or manufacturable.

Unlike melt infiltration where small pores are thermodynamically inaccessible, presently disclosed synthetic approaches can use an isothermal vapor technique, introduced and reacted at substantially atmospheric pressure, where the high surface free energy of nanoscale pores or surfaces drives the spontaneous nucleation of sulfur containing liquids until a conformal coating of sulfur and/or lithium-containing condensate is reached on inner-facing surfaces of hierarchical pores 101A and/or the contiguous microstructures 107E. In essence, unique vapor infusion process infuses sulfur into fine pores, such as any one or more of hierarchical pores 101A and/or the contiguous microstructures 107E and/or pores 104E, 105E and/or pathways 106E and/or the diffusion pathways 109E at the core of carbon-based particle 100A, and therefore not just at its surface.

Carbon-Based Particles Used to Create an Electrically Conductive Scaffold

Figure 4A:
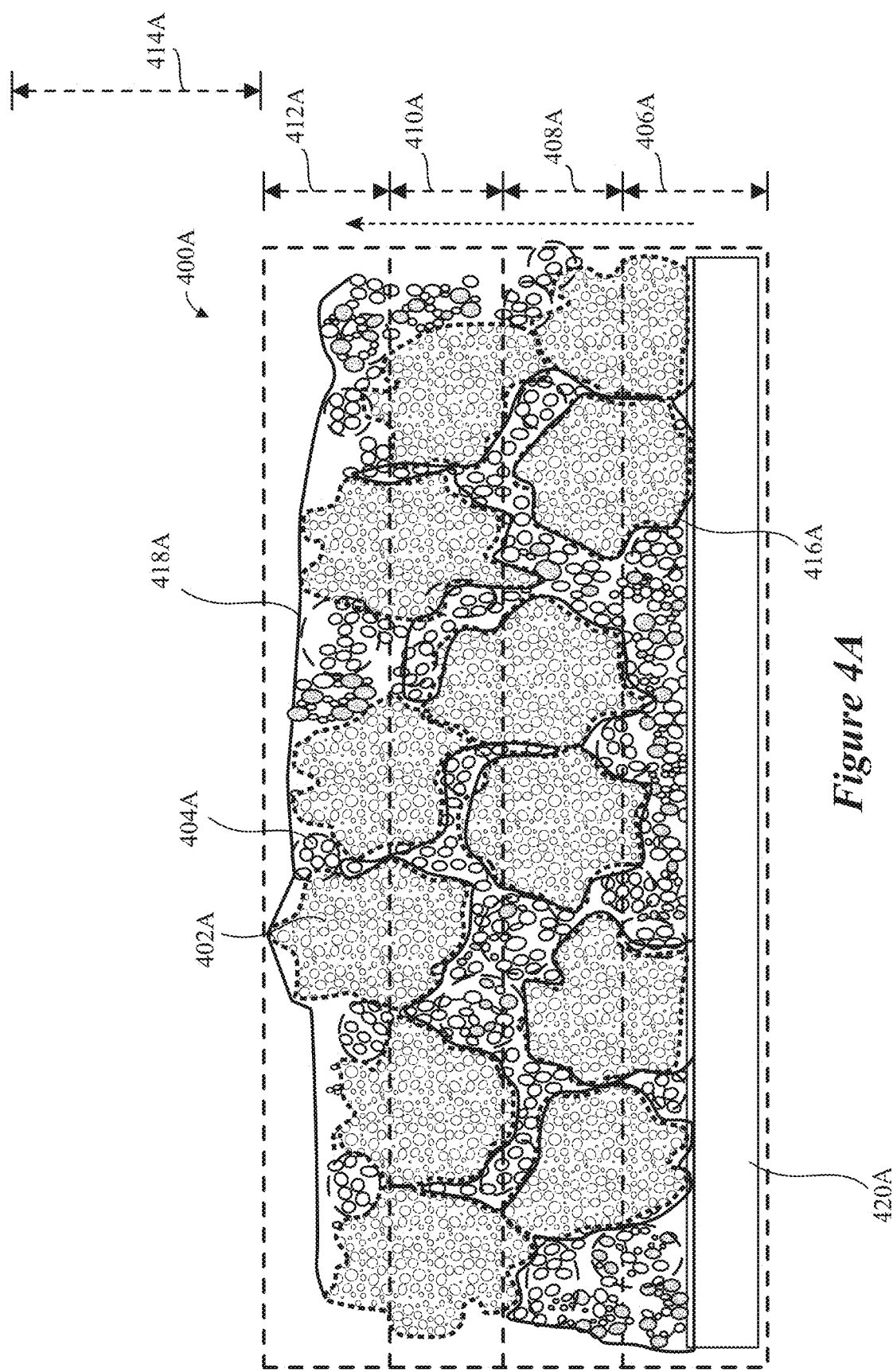
FIG. 4A shows a schematic of the structure shown in FIG. 3 with lithium (Li) metal infused into nanoscale gaps therein.
Figure 4B:
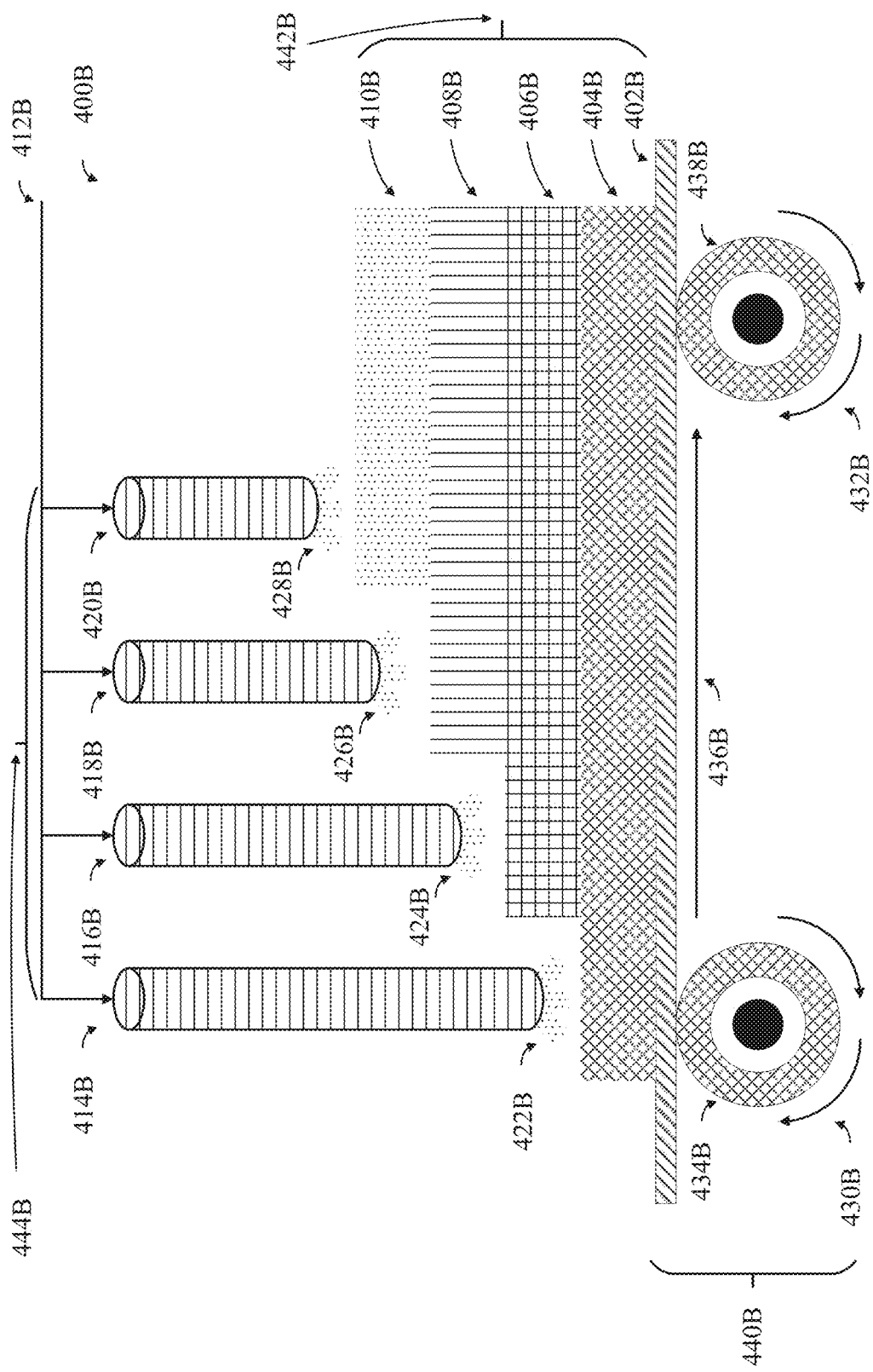
FIG. 4B shows a schematic diagram of a series of plasma spray torches positioned in a continuous sequence above a roll-to-roll (R2R) processing apparatus.

Carbon-based particle 100A, may be fabricated any number of ways using both known and novel techniques disclosed herein, including:

slurry-casting, referring to conventional metalworking, manufacturing and/or fabrication techniques in which a liquid material is usually poured into a mold, which contains a hollow cavity of the desired shape, and then allowed to solidify; or a plasma spray-torch system 400B, such as that shown in FIG. 4B, which may be used to perform layer-by-layer deposition to grow carbon-based particle 100A incrementally.

Either technique as described above, or any other known or novel fabrication techniques, may be used to produce carbon scaffold 300, shown in FIG. 3, in a graded manner. Control over the electrical gradients can result in the carbon scaffold 300 having varying degrees of electrical conductivity as dictated at least in part by any one or more of electrical gradients and ionic conductive gradients, described as follows:

electrical gradients can be defined by the graphene sheets 101B substantially orthogonally fused together form the open porous scaffold 102A, where electrical conduction occurs along and across contact points of graphene sheets 101B; and, ionic conductive gradients, such as Li ion transport, movement, or migration through the hierarchical pores 101A and the contiguous microstructures 107E, can be benefited, in certain configurations of the carbon-based particle 100 by the effective shortening of the diffusion pathways 109E throughout thickness of the carbon scaffold 300B in the vertical height direction A as shown in FIG. 3B to, for example, permit Li ions intercalated between adjacent few-layer graphene sheets, such as the graphene sheets 101B, to escape and migrate toward a liquid electrolyte surrounding the carbon scaffold 300B on route to the cathode curing electrochemical cell discharge-charge cycling.

Reference has been made throughout the presently disclosed implementations to various forms of carbon synthesized in-flight within a reactor to create the graphene sheets 101B, which are interconnected and conduct electricity along contact points and may vary in shape, size, position, orientation, and/or structure. Such variances can be influenced in differences in crystallinity and the particular type of carbon allotrope(s) used for creation of electrically conductive interconnected agglomerations of graphene sheets 101B. Crystallinity implies the degree of structural order in a solid. In a crystal, atoms or molecules are arranged in a regular, periodic manner. The degree of crystallinity therefore has a significant influence on hardness, density, transparency, and diffusion.

Accordingly, the carbon-based particle 100 can be produced in the form of an organized scaffold, such as a carbon-based scaffold, out of a reactor or be created during post-processing activities taking place outside of primary synthesis within a reactor.

Plasma processing and/or plasma-based processing, may be conducted within a reactor as disclosed by Stowell, et al., "Microwave Chemical Processing Reactor", U.S. Pat. No. 9,767,992, issued on Sep. 19, 2017, where supply gas is used to generate a plasma in the plasma zone to convert a process input material, such as methane and/or other suitable hydrocarbons in a gaseous phase, into separated components in a reaction zone to facilitate in-flight synthesis of carbon-based materials.

Alternative to synthesis by or within a microwave reactor as described above, thermal energy may be directed toward or near carbon-containing feedstock materials supplied in a gaseous phase onto a sacrificial substrate 306 of the carbon scaffold 300 shown in FIG. 3 to sequentially deposit multiple layers of carbon-based particles 100A by, for example, plasma spray-torch system 400B shown in FIG. 4B. Such particles may be either fused together in-flight, in a microwave reactor, or deposited, in a thermal reactor, in a controlled manner to achieve varying concentration levels of carbon-based particles 100A to therefore, in turn, achieve graded electrical conductivity proportionate to concentration levels of carbon-based particles 100A in the carbon scaffold 300. Such procedures may be used to formulate porous carbon-based electrode structure, such as carbon scaffold 300, that has a high degree of tunability, such as in electrical conductivity and ionic transport, while also eliminating many production steps and otherwise retaining a conventional outward appearance.

The open porous scaffold 102A can be produced with an open cellular structure such that a liquid-phase electrolyte can easily infiltrate into various pores, such as any one or more of the pathways, voids, and the like of the contiguous microstructures 107E, therein. Skeletal portions of open porous scaffold 102A may be referred to as a matrix or a frame, and pores, such as hierarchical pores 101A and/or the contiguous microstructures 107E, can be infiltrated with a fluid, liquid or gas, whereas, skeletal material is usually formed as a solid material.

Porosity of the Carbon-Based Particle

A porous medium, such as carbon-based particle 100A, can be characterized by its porosity. Other properties of the medium, such as permeability, tensile strength, electrical conductivity, and tortuosity, may be derived from the respective properties of its constituents, of solid matrix and fluid interspersed therein, as well as media porosity and pore structure. Carbon-based particle 100A having the contiguous microstructures 107E interspersed throughout therein can be created out of a reactor to achieve desirable porosity levels that are conducive for Li ion diffusion. Related to such Li ion diffusion, the graphene sheets 101B facilitate electron conduction along contact points thereof while also allowing for electrons to reunite with positive Li ions at reaction sites.

Regarding, porosity and tortuosity of open porous scaffold 102A of carbon-based particle 100A, an analogy may be made to marbles in a glass jar. Porosity, in this example, refers to spacing between the marbles that allows liquid-phase electrolyte to penetrate into void spaces between the marbles, similar to the contiguous microstructures 107E that define the diffusion pathways 109E within the carbon-based particle 100A. The marbles themselves may be like swiss cheese, by allowing electrolyte not only to penetrate in cracks between the graphene sheets 101B, but also into each graphene sheet themselves, an individual graphene sheet is shown in FIG. 1C. In this example as well as others, the relative shortening of the diffusion pathways 109E refers to how long it takes Li ions infiltrated therein by, for example, capillary action to contact active material, such as S confined within pores 105E. The diffusion pathways 109E accommodate convenient and rapid infiltration and diffusion of electrolyte, which may contain Li ions, into carbon-based particle 100A, which can then be grown or otherwise synthesized further to create carbon scaffold 300 with graded electric conductivity.

The shortening of the diffusion pathways 109E refers toward the shortening of diffusion lengths through which Li ions move within open porous scaffold 102A in carbon scaffold 300 and not of the active material, such as S, itself confined within the pores 105E of the contiguous microstructures 107E. This is on contrast to conventional techniques that require the diffusion length of the active material to be shortened only by making the thickness of the active material lesser or smaller. The diffusion pathways 109E within the contiguous microstructures 107E can act as Li ion buffer reservoirs by controlling flow and/or transport of Li ions therein to provide a freer flowing structure for Li ion transport therein, as may be beneficial for Li ion confinement, as reacted with S coated on exposed carbon surfaces of the pores 105, and later Li ion transport during electrochemical cell charge-discharge cycles. Transport of Li ions throughout the diffusion pathways 109E in the general directions shown in FIG. 1F can take place in a liquid electrolyte initially infused and captured within open porous scaffold 102A, where such infusion of electrolyte occurs prior to cyclic carbon scaffold 300 usage in discharge-charge cycles.

Examples exist permitting for the initial diffusion and distribution of liquid-phase electrolyte in open porous scaffold 102A of carbon-based particle 100A to fill up and occupy hierarchical pores 101A and/or the contiguous microstructures 107E prior to usage of carbon scaffold 300, synthesized or otherwise created by layer-on-layer deposition of carbon-based particles 100A. Vacuum or air may also be used to fill hierarchical pores 101A and/or the contiguous microstructures 107E, which may allow or assist with wetting of electrolyte with carbon-containing exposed surfaces within open porous scaffold 102A.

Li ions bounce from one location to another by a chain reaction, similar to the striking of newton balls, where one hits to result in force transference resulting in the movement of other balls. Similarly, each Li ion moves a relatively short distance, yet remains able to move great numbers of Li ions in the collective through this type of chain reaction as described. The extent of individual Li ion movement may be influenced by the quantity of Li ions supplied altogether to carbon scaffold 300B via capillary infusion into open porous scaffold 102A, as may be the crystallographic arrangement of Li ions and/or particles in, around, or within agglomerations of graphene sheets 101B.

Electrochemical Cell Anode or Cathode Created from Carbon Scaffold

The carbon scaffold 300, shown in FIG. 3, can be integrated in battery or supercapacitor applications, battery types including Li ion batteries and Li S batteries. The carbon scaffold 300 can be incorporated into either the anode or the cathode for Li ion and Li S battery systems, although the contiguous microstructures 107E will need to be prepared to confine S in the pores 105E or elsewhere to accommodate the creation and confinement of polysulfides (PS) as well as the control of PS migration. An example battery system may include an electrochemical cell configured to supply electric power to a system. The electrochemical cell may have an anode containing an anode active material, a cathode containing a cathode active material, a porous separator disposed between the anode and the cathode, and an electrolyte in ionic contact with the anode active material and the cathode active material.

The anode and cathode may include sacrificial substrate 306, that is electrically conductive, with a first layer deposited there-upon as a first contiguous film having a first concentration of carbon-based particles 100A shown as carbon-based particles 302 in FIG. 3, such that a redundant description of the same is omitted.

A porous arrangement formed in the carbon scaffold 300 as defined by the carbon-based particles 302, which are synonymous with and used interchangeably with multiple carbon-based particle 100A adjoined together, and smaller carbon particles 304 interspersed throughout the carbon scaffold 300. The porous arrangement of the carbon scaffold 300 receives electrolyte dispersed therein for Li ion transport through interconnected hierarchical pores 101A and/or the contiguous microstructures 107E that, similar to individual carbon-based particles 100A and/or 302, define one or more channels including:

microporous frameworks defined by a dimension 101E of >50 nm that provide tunable Li ion conduits;

mesoporous channels defined by a dimension 102E of about 20 nm to about 50 nm, generally defined under IUPAC nomenclature and referred to as mesopores or mesoporous, that act as Li ion-highways for rapid Li ion transport therein; and microporous textures defined by a dimension 103E of <4 nm for charge accommodation and/or active material confinement.

The first layer including a first concentration of carbon-based particles 100A and/or 302 can be configured to demonstrate an electrical conductivity ranging from 500 S/m to 20,000 S/m. A second, or any subsequent, layer can be deposited on the first, or any preceding, layer. The second layer can include a second contiguous film formed by a second concentration of carbon-based particles 100A and/or 302 in contact with each other to yield a second electrical conductivity ranging from 0 S/m to 500 S/m, or otherwise lower than the first electrical conductivity.

Carbon scaffold 300 may be prepared for subsequent Li infiltration, referred to herein as being pre-lithiated, and later infused with Li ion liquid solution via capillary action to create lithiated carbon scaffold 400A as shown in FIG. 4A. Film layers 406A, 408A, 410A, and 412A, each having defined thicknesses in the vertical direction extending from the current collector, may be synthesized in-flight in a microwave reactor, or deposited layer-by-layer in or out of a thermal reactor. Film layers 406A, 408A, 410A, and 412A have varying electrical conductivity ranging from high, such as at film layer 406A, to low, such as at film layer 412A, in a direction orthogonal and away from the current collector, which may also be a sacrificial and/or electrically conductive substrate. In an example configuration, each layer of the film layers 406A, 408A, 410A, and 412A can be produced with a defined, and a progressively declining, concentration of carbon-based particles 302 to achieve particular electrical resistance values, such as where:

The film layer 406A is produced with a relatively high defined concentration of carbon-based particles 302 conducive for low Li ion transport and low electrical resistance, at <1,000Ω, suitable for high electrical conductivity;

the film layers 408A and 410A are produced with systematically decreasing electrical conductivity by engineering the carbon-based particles 302 to demonstrate desirable interfacial surface tension to promote wetting of exposed carbon surfaces with molten Li metal; and the film layer 412A is produced with a relatively low defined concentration of carbon-based particles 302 conducive for high Li ion transport and high electrical resistance, at >1,000-10,000Ω, suitable for high electrical resistance.

Varying electrical conductivity may be at least partially proportionate to interfacial surface tension of a Li ion solution infiltrated into the porous arrangement of the open porous scaffold. Infiltration of the Li ion solution (such as including the Li ions 108E) can be performed via capillary infusion engineered to promote wetting of surfaces of open porous scaffold 102A exposed to Li ion solution. The diffusion pathways 109E, as shown in FIG. 1E, ensure that deposition and stripping operations associated with one or more oxidation-reduction, also referred to as redox, reactions occurring within carbon-based particles 100A and/or 302B are uniform. Electroactive material can reside in the pores 105E of the contiguous microstructures 107E when they are used to form the open porous scaffold 102A, which itself may be incorporated within any one or more of the anode and the cathode. In some implementations, the contiguous microstructures 107E may be formed from or otherwise contain single-layer graphene (SLG), as shown in FIG. 1C, and/or few-layer graphene (FLG) including from 1 to 10 graphene planes, shown as the agglomerations 101B of multiple layers of the graphene sheets 101C in FIG. 1B. Groupings of the graphene sheets 101C can be positioned in a substantially aligned orientation along a vertical axis and fused together at substantially orthogonal angles. Anode active material or cathode active material may have a specific surface area from approximately 500 $m^2/g$ to 2,675 $m^2/g$ when measured in a dried state, and may contain a graphene material suitable for lithiation, the graphene material comprising any one or more of pre-lithiated graphene sheets, pristine graphene, graphene oxide, reduced graphene oxide, graphene fluoride, graphene chloride, graphene bromide, graphene iodide, hydrogenated graphene, nitrogenated graphene, boron-doped graphene, nitrogen doped graphene, chemically functionalized graphene, physically or chemically activated or etched versions thereof, conductive polymer coated or grafted versions thereof, and/or combinations thereof.

In any one or more of the discussed examples in relation to lithiated carbon scaffold 400A, electrically conductive interconnected agglomerations of graphene sheets 101B are sintered together to form open porous scaffold independent of a binder, however alternative examples do exist where a binder is used. Configurations with or without a binder may each involve open porous scaffold 102A acting or serving as an active lithium intercalating structure with a specific capacity of approximately 744-1,116 mAh/g, or more. Also, examples include the preparation of graphene sheets 101B using chemically functionalized graphene, involving the surface functionalization thereof, comprising imparting to open porous scaffold 102A a functional group selected from quinone, hydroquinone, quaternized aromatic amines, mercaptan, disulfide, sulfonate ($—SO_3$), transition metal oxide, transition metal sulfide, other like compounds or a combination thereof.

The current collector shown in FIG. 4A, is, for example, at least partially foam-based or foam-derived and is can be selected from any one or more of metal foam, metal web, metal screen, perforated metal, sheet-based 3D structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, and combinations thereof.

Anode or cathode electrically conductive or insulative material, referred to herein as active material can include any one or more of nanodiscs, nanoplatelets, nano-fullerenes, carbon nano-onions (CNOs), nano-coating, or nanosheets of an inorganic material selected from:
  bismuth selenide or bismuth telluride,
  transition metal dichalcogenide or trichalcogenide,
  sulfide, selenide, or telluride of a transition metal;
  boron nitride, or
  a combination thereof, inclusive of molten Li metal interspersed therein to provide a source for Li ions upon dissociation during normal electrochemical cell discharge-charge cycles, etc.

The nanodiscs, nanoplatelets, nano-coating, or nano sheets can have a thickness less than 100 nm. In other examples, the nanoplatelets can have a thickness less than 10 nm and/or a length, width, or diameter less than 5 μm.

Producing an Anode or Cathode Created from the Carbon Structures

Example processes for producing a three-dimensional (3D) carbon-based electrode, such as that created from lithiated carbon scaffold 400A, can include depositing, such as from one or more plasma-based thermal reactors or torches, in which thermal energy is propagated through a plasma and/or feedstock material supplied in a gaseous state, carbon-based particles 100A or 400A to form a first contiguous film layer, such as layer 406A shown in FIG. 4A, on a substrate, where the first contiguous film layer is characterized by a first electrical conductivity. Each of the carbon-based particles comprises electrically conductive three-dimensional (3D) aggregates or agglomerations of graphene sheets 101B. The aggregates are can be orthogonally fused together to form open porous scaffold 102A to facilitate electrical conduction along and across contact points of the graphene sheets.

A porous arrangement formed in open porous scaffold 102A, where the porous arrangement is conducive to receive electrolyte dispersed therein for Li ion transport through interconnected pores, such as hierarchical pores 101A and/or the contiguous microstructures 107E, that define the diffusion pathways 109E. The first contiguous film layer has an average thickness no greater than approximately 100-200 μm. In an example, a binder material is combined with graphene sheets 101B to retain graphene sheets 101B in a desired position to impart structure to open porous scaffold 102A. The binder may be or comprise a thermosetting resin or a polymerizable monomer, wherein curing the resin or polymerizing the polymerizable monomer forms a solid resin or polymer with assistance of heat, radiation, an initiator, a catalyst, or a combination thereof. The binder may be initially a polymer, coal tar pitch, petroleum pitch, mesa-phase pitch, or organic precursor material and is later thermally converted into a carbon material.

Additional quantities of the carbon-based particles 100A are deposited on the first contiguous film layer to form a second contiguous film layer there-upon, the second contiguous film layer having a second electrical conductivity lower than the first electrical conductivity, and being positioned closer to electrolyte 414A and away from the current collector, which may be a sacrificial substrate. Li ion solution can be infiltrated into, such as by capillary infusion action, open porous scaffold 102A to react with exposed carbon on surfaces thereof to facilitate Li ion dissociation and electric current supply, where the exposed carbon on the open porous scaffold can include a surface area greater than approximately 100 m²/gm.

Carbon-based particles 100A and/or lithiated carbon scaffold 400A can be synthesized in-flight in a microwave reactor, or deposited in a bottom-up manner, referring to a layer-by-layer deposition or growth within a thermal reactor, and may then be cast, via a liquid slurry to be subsequently dried to form a carbon-based electrode that may be suitable for implementation or incorporation within a Li ion battery. Such a slurry may, in some examples, comprise chemical binders and conducting graphite, along with the electrochemically active innate carbon.

The term hierarchical implies an arrangement of items in which the items are represented as being above, below, or at the same level as one another. Here, carbon-based particle 100A and/or lithiated carbon scaffold 400A may be grown by layer-by-layer deposition in a thermal reactor to create one or more grades, as indicated by film layers 406A to 412A of the conductive particles 100A, 302B and/or 402A, referring to that created by specific control of electrical, referring to contact points of graphene sheets 101B, and ionic, referring to the diffusion pathways 109E, conducting gradients throughout the thickness of lithiated carbon scaffold 400A. Tuning of each individually deposited layer 406A through 412A results in relatively higher electrical conductivity at the current collector interface, and progressive lower electrical conductivity moving outwardly therefrom.

The graphene sheets 101B within carbon-based particle 100A can serve as both electrical conductors, by conducting electric current through contact points and/or regions, and as active Li intercalating structures to provide a source for the specific capacity of the anode electrode at 744-1,116 mAh/g, such as 2 to 3 times that otherwise available from conventional graphite anodes at 372 mAh/g. As a result, interconnected 3D bundles of graphene sheets 102 within the carbon-based particle 100A may be considered as nanoscale electrodes that concurrently enable a relatively high-volume fraction of electrolytically active material along with efficient, 3D interpenetrating, ion, and electron pathways.

This unique 3D structure of the carbon-based particle 100A enables both storage of electric charge at its exposed surfaces via capacitive charge storage for desirable high-power delivery, relative to conventional applications, and also provides faradaic redox ions within the bulk thereof for desirable high electric energy storage. Redox, as generally understood and as referred to herein, refers to reduction-oxidation reactions in which the oxidation states of atoms are changed involving the transfer of electrons between chemical species, most often with one species undergoing oxidation while another species undergoes reduction.

Faradaic, as generally understood and as referred to herein, refers to a heterogeneous charge-transfer reaction occurring at the surface of an electrode, prepared with, and/or otherwise incorporating carbon-based particle 100A. For instance, pseudocapacitors store electrical energy faradaically by electron charge transfer between electrode and electrolyte. This is accomplished through electrosorption, redox reactions, and intercalation processes, termed pseudocapacitance.

Roll-to-Roll Processing for Producing an Electrochemical Cell Electrode Created from the Carbon Scaffold Regarding manufacturing, lithiated carbon scaffold 400A can be manufactured, to fabricate and/or build electrochemical cell electrodes, such as cathodes and/or anodes, in large-scale quantities by sequential, layer-by-layer, such as layers 406A through 412A shown in FIG. 4A, deposition of concentrations of carbon-based particle 100A and/or 100E onto a moving substrate, such as a current collector, through a roll-to-roll (R2R) production approach. By consolidating 3D carbon scaffold structures directly out microwave reactors, analogous to exiting plasma spray processes, electrode films can be continuously produced without the need for toxic solvents and binders that are otherwise used in slurry cast processes for battery electrodes. Therefore, battery electrodes employing lithiated carbon scaffold 400A may be more readily produced with controlled electrical, ionic, and chemical concentration gradients due to the layer-by-layer, sequential particle deposition capabilities of a plasma-spray type processes; and, specific elements, such as dopants, can also be introduced at different stages within the plasma deposition process.

Also, due to the pores 105E and/or the contiguous microstructures 107E interspersed throughout carbon-based particle 100A, lithiated carbon scaffold 400A may be manufactured in a manner such that it is gravimetrically, referring to a set of methods used in analytical chemistry for the quantitative determination of an analyte based on its mass, superior to known devices. That is, carbon-based particle 100A, with pores and/or voids defined throughout 3D bundles of graphene sheets 102 and/or conductive carbon particles 104, may be lighter than comparable battery electrodes without a mesoporous structure including various pores and/or voids, etc.

Carbon-based particle 100A may feature a ratio of active material to inactive material that is superior relative to conventional technologies, in that greater quantities of active material are available and prepared for electricity conduction there-through relative to inactive and/or structural reinforcement material. Such structural reinforcement material, although involved in defining a general structure of carbon-based particle 100A, may not be involved or as involved in electrically conductive interconnected agglomerations of graphene sheets 101B. Accordingly, due to its high active material to inactive material ratio, carbon-based particle 100A may demonstrate superior electrical conductivity properties relative to conventional batteries, as well as being significantly lighter than such conventional batteries given that carbon may be used to replace traditionally used heavier metals. Therefore, carbon-based particle 100A may be particular well-suited for demanding end-use application areas that also may benefit from its relatively light weight, automobiles, light trucks, etc.

Carbon-based particle 100A may be created to rely electrically conductive interconnected agglomerations of graphene sheets 101B to obtain a percolation threshold, referring to a mathematical concept in percolation theory that describes the formation of long-range connectivity in random systems. Below the threshold a giant connected component does not exist, while above it, there exists a giant component of the order of system size. Accordingly, 3D bundles of graphene electrically conductive interconnected agglomerations of graphene sheets 101B may conduct electricity from the current collector, as shown in FIG. 4A, toward electrolyte 414A.

Roll-to-Roll (R2R) Plasma Spray Torch Deposition System

As a variation from the presently disclosed atmospheric MW plasma reactor used to produce particle-based output including integrated, contiguous 3D hierarchical carbon scaffold films, a spray torch configuration can be employed to produce similar such carbon-based structures, such as that shown by roll-to-roll (R2R) system 400B. Plasma torches permit for materials to be initially formulated, similar to waveguided reactor, then accelerated into an impact zone on a substrate surface that can be either moving or stationary. Each zone of the R2R process can provide for unique control of dissimilar mixed phase or composite material synthesis, formulation, consolidation, and integration, such as densification.

The plasma torch can be used to deposit carbon-based particles on a continuous, moving substrate to enable an additive type process control at locations of hot plasma jets depositing the carbon-based particles and beyond the plasma afterglow region up to the impact zone of the substrate. Various properties can be controlled, such as defect density, residual stress, through control of deposition thicknesses of film layers, chemical and thermal gradients, phase transformations, and anisotropy. For electrochemical cell electrode fabrication, not only can the atmospheric MW plasma torch create formulated and integrated continuous 3D graphene films without the need for toxic solvents such as NMP and or use of binders in accordance with conventional slurry casting process, but the plasma torch can be used to create integrated electrode/current collector film structures for enhanced performance at a reduced cost.

FIG. 4B shows a roll-to-roll (R2R) system 400B employing an example arrangement of a group 444B of plasma spray torches 422B through 428B, such as 422B, 424B, 426B, and/or 428B, all of which are configured to perform layer-by-layer deposition to fabricate, otherwise referred to as growing, the carbon-based scaffold 300B, shown in FIG. 3B, and/or variants thereof, incrementally. Group 444B of plasma spray torches 414B through 420B are oriented in a continuous sequence above the R2R processing apparatus 440B, which, may include wheels and/or rollers 434B and 439B configured to rotate in the same direction, 430B and 432B, respectively, to result in translated forward motion 436B of sacrificial layer 402B upon which layers 442B of carbon scaffold 436B may be deposited in a layer-by-layer manner to achieve a graded electrical conduction gradient proportionate to the concentration level of carbon-based particles 100A contained per unit volume area in each progressive deposited layer, such as film layers 406A-412A.

Such deposition may involve the positioning of group 444B of plasma spray torches 414B through 420B as shown in FIG. 4B, with an initial, in direction of forward motion 436B, spray torch 414B extending the furthest in a downward direction, toward sacrificial layer 404B from feedstock supply line 412B, positioned to spray 422B carbon-based material to deposit initial layer 404B, also may be shown as interim layer 406A in FIG. 4A, and so on and so forth, of carbon scaffold 300B on sacrificial layer 402B. Initial layer 404B may be deposited to achieve the highest conductivity values, with each of the subsequent layers 406B through 410B featuring a proportionately less-dense dispersion of carbon-based particle 100A composing carbon-based scaffold 300B to achieve a graded electric gradient for layers 442B.

That is, plasma spray torches 414B through 420B may be oriented to have incrementally decreasing, or otherwise varying, heights as shown in FIG. 4B, such that each spray torch from group 444B may be tuned to spray, from spray 422B to 428B, respectively, sprays of carbon-based feedstock material supplied by feedstock supply line 412B. Accordingly, battery electrodes can be more readily produced with controlled electrical, ionic, and chemical concentration gradients due to the layer-by-layer, sequential deposition described herein with connection to plasma spray-torch system 400B, which presents desirable features of plasma spray type processes; and, specific elements or additional ingredients can also be introduced at different stages within the plasma-based spray deposition process described by plasma spray-torch system 400B. Such control may, extend to tunability of plasma spray-torch system 400B to achieve target electric field and/or electromagnetic field properties of any one or more of layers 442B.

Group 444B of plasma spray torches 414B through 420B may employ plasma-based thermally enhanced carbon spraying techniques to provide carbon coating processes in which melted or heated materials are sprayed onto a surface. The feedstock, coating precursor, is heated by electrical, plasma or arc. or chemical means, such as a combustion and/or a flame.

Thermal spraying by plasma spray torches 414B through 420B can provide thick coatings of approximately a thickness in the range of 20 μm or more to several mm, depending on the process and feedstock, over a large area at high deposition rate as compared to other coating processes such as electroplating, physical and chemical vapor deposition. Coating materials available for thermal spraying include metals, alloys, ceramics, plastics, and composites. They are fed in powder or wire form, heated to a molten or semi-molten state, and accelerated towards substrates in the form of μm-size particles. Combustion or electrical arc discharge is usually used as the source of energy for thermal spraying. Resulting coatings are made by the accumulation of numerous sprayed particles. The surface may not heat up significantly, allowing the coating of flammable substances.

Coating quality is usually assessed by measuring its porosity, oxide content, macro and micro-hardness, bond strength and surface roughness. Generally, the coating quality increases with increasing particle velocities.

Carbon Scaffold Implemented in a Li S Secondary Battery

Group 444B of plasma spray torches 414B through 420B may be configured or tuned to spray carbon-based material in a controlled manner to achieve specific desired hierarchical and organized structures, such as open porous scaffold 102A of carbon-based particle 100A and/or 100E with the contiguous microstructures 107E suitable to be used for Li ion infiltration via capillary action therein dependent on percentage porosity of carbon-based particle 100A and/or 100D. Total quantities of S able to be infused into the contiguous microstructures 107E and/or deposited on exposed surface regions of carbon-based particle 100A and/or 100D, and other such similar structures. may depend on the percentage porosity thereof as well, where 3D fractal-shaped structures providing larger pores, such as pores 105E, each having dimension 103E can efficiently accommodate and micro-confine S for desired time-frames during electrochemical cell operation. Examples exist permitting for the combination of S to prevent any resultant polysulfides (PS) migrating out of pores 105E purely by designing and growing structural S, with confinement of S being targeted at a defined percentage, such as: 0-5%, 0-10%, 0-30%, 0-40%, 0-50%, 0-60%, 0-70%, 0-80%, 0-90%, and/or 0-100%, any one or more of such ranges successfully showing of retardation of polysulfide migration out of the electrode structure.

Carbon Scaffold Implemented in a Li Air Secondary Battery

Existent Li air cathodes may last only 3-10 cycles, and thus have not yet been universally understood to provide very promising or reliable technologies. In such cathodes, air itself acts as the cathode, therefore the reliable and robust supply of air flowing through the cathode, such as through pores, orifices, or other openings, effectively currently precludes realistic applications in consumer grade portable electronic devices such as smartphones.

Devices can be made with some sort of air pump mechanism, but air purification remains an issue, given that any amount of impurity prevalent in the air can and will react with available Li in parasitic side-reactions ultimately degrading specific capacity of the overall electrochemical cell. Moreover, air only provides only about 20.9% $O_2$, and thus is not as efficient as other alternative current advanced battery technologies.

Nevertheless, even in view of the above-mentioned challenges, examples provided above relating to carbon-based particle 100A, 100D and/or any variants thereof implemented in carbon scaffold 300B and/or lithiated carbon scaffold 400A can be configured to function in a 3D-printed battery. Notably, measures can be taken to guard against, such as by tuning to achieve desirable structural reinforcement in certain targeted areas of open porous scaffold 102A, to prevent against unwanted and/or sudden collapse of porous structures, such as to create clogging of passageways defined therein. In example, carbon scaffold 300B can be decorated with a myriad of metal oxides to achieve such reinforcement, which may also control or otherwise positive contribute to mechanical tunneling of the structure itself once lithium reacts with air to spontaneously form a solid from that state, etc. Traditional circumstances, such as absent special preparations undertaken regarding implementation of the disclosed carbon-based particle 100A and/or the like with Li air cathodes can otherwise involve Li ions reacting with carbon provided in a gaseous state, such that the Li ion and the carbon-containing gas react to form a solid that expands. And, depending on where this expansion occurs, can mechanically degrade the overall carbon-based mesoporous scaffold structure, such as of carbon scaffold 300B.

Preparation for Lithiation of Carbon-Based Particles

To enable alternative non-Li or lithiated carbon-based scaffolded cathodes, such as those confining sulfur, oxygen, and vanadium oxide, over current lithium oxide compound cathodes, as well as to accommodate first charge lithium loss, resulting reduced coulombic efficiency, in current Li ion cells, a scalable pre-lithiation method for carbon-based structured intended for implementation in electrochemical cell electrodes may be required. As a result, various experimental attempts have been conducted with carbon-based particle 100A, 100D and/or any derivative structures based therefrom, including carbon scaffold 300B such as ball milling, post thermal annealing, and electrochemical reduction from an additional electrode. Such efforts have been used to pre-lithiate, such as chemically preparing a carbon-based structure to react with and/or confine lithium physically and/or chemically, but have met with uniformity, lithium reactivity, costs, and scalability challenges.

Nevertheless, by fine-tuning reactor process parameters, carbon-based particle 100A, 100D, and/or carbon scaffold 300B may be synthesized and/or fabricated by layer-by-layer deposition process, as substantially discussed earlier, to serve as a carbon-based host structure with engineered surface chemistry, such as including nitrogen and oxygen doping to facilitate rapid decomposition involving disproportionation of oxides.

Upon thermal activation, which can include the formation of one or more sparks, Li metal can be spontaneously, such as without a pressure gradient and non-reactively infiltrated driven by capillary forces to create a controlled, pre-lithiated carbon structure or particle building blocks. Subsequently, such pre-lithiated particle building blocks can be synthesized into an integrated composite film with graded electrical conductivity from:

a high conductivity at a back plane in contact with the current collector, such as shown by interim layer 406A, to an insulated ion conducting layer at the electrolyte/electrode plane.

Surface chemistry, as may be related to non-reactive infiltration of Li metal can be tuned by optimizing oxide thermal reduction degree, such as an exotherm, by using thermogravimetric analysis (TGA) or differential scanning calorimetry DSC analytical techniques.

To address scalability concerns as may be related to transitioning from a low-volume laboratory testing and sample production environment, to a high-volume large-scale plant capable of fulfilling multiple customer orders simultaneously, the above described pre-lithiation process is readily adaptable to a continuous roll-to-roll (R2R) format, analogous to other liquid melt wetting processes such as brazing.

Thin film Li clad foil, which can in some configurations include tantalum (Ta) or copper (Cu), can be loaded onto a heated calendaring roll, to be brought into contact with carbon-based particle 100A, or carbon film, in the case of the spray torch process, in a controlled thermal, dry environment. Thermal residence, such as soak, time, gradient, and applied pressure can adjust and controlled to facilitate both: (1) activation; and, (2) infiltration process steps.

Initiation of Lithiation of the Carbon Scaffold

Prior to the development of Li metal infusion methods into carbon-based structures and/or agglomerate particles, efforts have been undertaken to assess the following two scenarios:

growing microwave graphene sheets that have extended D-spacing that would allow Li intercalation to occur in-between individual graphene sheets at a much more efficient or a faster rate than what would occur in typical, commercially-available, graphene sheets; and, growing FLG in such a way to successfully and repeatably achieve such higher de-spacing; and using a wet liquid Li metal front that propagates into the hierarchical pores 101A and/or the contiguous microstructures 107E defined by open porous scaffold 102A of carbon-based particle 100A and/or 100D, where attraction from Li metal to exposed carbon-based surfaces to wet the same relative to otherwise functionalizing exposed carbon-based surfaces.

The presently disclosed thermal reactors can perform post processing to create highly organized and structured carbons that have that functioning relating to the infiltration of molten Li metal and/or other species, such as infiltration of aluminum into a silicon carbide-sintered material, and hammering the surface of the particles to promote infiltration of a molten (Li) metal front without additional pressure from outside sources. Such efforts permit for continuous wetting instead of using capillary pressure to push metal into open porous scaffold 102A of carbon-based particle 100A and/or 100D.

FIG. 4A shows a lithiated carbon scaffold formed from several interconnected carbon-based particles 402A, similar in form and function to carbon-based particles 100A and/or 100E, synthesized and deposited at varying concentration levels in the film layers 406A to 412A, from most concentrated to least concentrated. All of the film layers 406A through 412A, are configured to be infiltrated, via non-reactive capillary infusion methods, with a molten Li metal and/or Li ion solution in liquid state or phase for intercalation of Li ions in-between pairs of graphene sheets of the graphene sheets 101B. Example D-spacing of approximately 1 Å to 3 Å can be targeted during synthesis of the graphene sheets 101B to retain more Li ions between alternating graphene sheets than conventional graphene sheet stacks.

Voids 416A, referring to vacant regions or spaces, between adjacent and/or contacting carbon-based particles 402A may be defined by a section of lithiated carbon scaffold 400A positioned away from a current collector 420A and facing a liquid-phase electrolyte layer, a passivation layer 418A. Passivation implies a material becoming passive, that is, less affected or corroded by the environment of future use. In addition, or in the alternative, a Li ion conduction insulating, or graded interphase layer can be deposited on layer 412A, such as at the same location of the passivation layer 418A, facing electrolyte 414A to minimize side reactions with free and/or physically and/or chemically unattached Li in ionic form.

Prior to the deposition or placement of any such encasing layer, Li, as provided by molten Li metal, may be flowed in liquid state into the voids 416A defined by the carbon-based particles 402A to assist in forming electrochemical gradients proportionate to the level of concentration of carbon-based particles 402A in each layer of the film layers 406A-412A.

Repeated, or cyclical, Li ion electrode, such as the anode or the cathode, usage in secondary batteries can result in problems due to usage of molten Li metal, such as volume expansion during re-depositing in electroplating operations, implying a process that uses an electric current to reduce dissolved metal cations so that they form a thin coherent metal coating on an electrode. The term can also be used for electrical oxidation of anions on to a solid substrate, as in the formation of silver chloride on silver wire to make silver/silver-chloride electrodes.

Processes used in electroplating with relation to infiltration of Li ion solution into lithiated carbon scaffold 400A may be referred to as electrodeposition, also known as electrophoretic deposition (EPD), and is analogous to a concentration cell acting in reverse. Electroplating, as described above, with Li ions can result in a volume expansion on the order of approximately 400% or more of lithiated carbon scaffold 400A. Such an expansion is undesirable from a stability standpoint micro-mechanically and causes degradation with many dead zones, referring to inactive or non-chemically and/or electrically activated regions, therefore ultimately preventing the derivation of longer lifespans out of so-equipped Li ion batteries. Generally, it is desirable to have a majority of the Li ion material plate, meaning reduce onto a smooth and uniform surface to therefore facilitate uniform deposition of Li ions. Removal will also be smooth in a smooth planar interface.

In practice, Li, when infiltrated into the carbon scaffold 400A may tend to form unwanted dendrites, defined as crystals that develop with a typical multi-branching tree-like form. Such Li ion dendrites, also in the form of acicular Li ion dendrites, acicular describing a crystal habit composed of slender, needle-like crystal deposits, grow away from surfaces upon which Li ions are infiltrated, such as upon and/or in-between individual graphene sheets 101B. In some circumstances, with enough battery charge-discharge cycling, a dendritic protrusion or protuberance can grow across all the way through from an anode incorporating the lithiated carbon based scaffold 400A to a cathode positioned opposite to the carbon based scaffold within an electrochemical cell to cause a short route or circuit, describing when there is a low resistance connection between two conductors that are supplying electrical power to a circuit. This may generate an excess of voltage streaming and cause excessive flow of current in the power source. The electricity will flow through a short route and cause a short circuit.

Capillary Li ion infusion techniques into lithiated carbon scaffold 400A can address many of the described problems. Nevertheless, a persistent issue encountered in Li ion batteries includes that a conventional cathode provides only a limited quantity of specific capacity or energy capability. Likewise, on the anode side, decreases have also been observed in specific capacity and energy density as well. Thus, even in view of how relatively desirable, in terms of electric energy storage capacity and current delivery, a Li ion battery may be compared to Li metal hydride or lead-acid, or Ni Cad batteries, even greater advancements in electric power storage and delivery are possible, regarding the protection against or prevention of unwanted Li-based dendritic formations, upon the incorporation of any one or more of the presently disclosed carbon-based materials, such as the lithiated carbon-based scaffold 400A, to approach the theoretic capacity of pure Li metal, which has a specific capacity of around 3,800 mAh/g.

Other approaches have been undertaken including the development of solid-state batteries, describing no liquid phases at all. However, attention has returned to Li metal, due to oxide electrolyte being used to achieve and stabilize contact with Li. And, alternatives to Li metal have also been explored including Si, Sn, and various other alloys. However, even upon elimination of Li metal, a Li ion source may still be required.

Alternative-to-lithium materials in a Li ion battery electrode structure may yield the following energy density values: oxides provide 260 mAh/g; and, sulfur (S) provides 650 mAh/g. Due to its relatively high energy density capabilities, it is desirable in battery electrode applications to confine sulfur (S), so it is not solubilized or dissolved into surrounding electrolyte. To that effect, sulfur micro-confinement is needed, as described earlier in relation to the pores 105E of the contiguous microstructures 107E of, as shown in FIG. 1E, of the open porous scaffold 102A. A confined (or micro-confined liquid implies a liquid that is subject to geometric constraints on a nanoscopic scale so that most molecules are close enough to an interface to sense some difference from standard bulk conditions. Typical examples are liquids in porous media or liquids in solvation shells.

Confinement, and/or micro-confinement, referring to confinement within microscopic-sized regions regularly prevents crystallization, which enables liquids to be supercooled below their homogenous nucleation temperature even if this is impossible in the bulk state. Thus, in view of the various challenges presented above, and others not discussed here, various improvements to traditional graphite-based anodes may be achieved by instead employing few layer graphene (FLG) materials and/or structures, defined as having less than 15 layers of graphene grown, deposited or otherwise organized in a stacked architecture with Li ions intercalated there-between at defined interval and/or concentration levels. Any one or more of carbon-based particle 100A, 100D and/or the like may be so prepared.

Doing so, going from graphite to FLG, may improve specific capacity from approximately 380 to over a 1,000 mAh/g for Li-intercalated carbon-based structures. Disclosed materials can replace graphite with FLG to permit for a higher active surface area and can increase spacing in-between individual graphene layers for infiltration of up to 2 to 3 Li ions, as opposed to just 1 Li ion as commonly may be found elsewhere, as shown by FIG. 1I indicating that the various graphite or graphene layer planes can be controlled, in terms of D-spacing, to achieve various fitments of Li ions in-between adjacent graphite or graphene layer planes.

In graphene, hexagonal carbon structures in each graphene sheet may stay positioned on top of each other, this is referred to as an A-A packing sequence instead of an A-B packing sequence. An example carbon packing sequence is shown in the chemical structural diagram shown in FIG. 1G, where Li ions can fit in void spaces defined by carbon atoms arranged and bonded in a hexagonal lattice structure. Particularly, configurations are envisioned for graphene sheets and/or few-layer graphene (FLG) where individual layers of graphene may be stacked directly on top of each other to obtain incommensurate, disproportionate and/or otherwise irregular, stacking as shown by Stage 3 in FIG. 1H, which in turn permits for the intercalation of addition Li ions in-between each graphene layer of FLG structures.

Under traditional conditions and circumstances, the insertion of Li ions from, the top-down or bottom-up in layered graphene structures may prove exceedingly difficult in practice. Comparably, Li ions more easily insert in-between individual graphene layers separated by a definable distance. Thus, the key is to manage and tune exactly how much edge area is available. In that regard, any of the carbon-based structured disclosed herein are so tunable. And, carbon in graphene is also conductive—therefore, this feature provides for dual-roles by: (1) providing structural definition to FLG scaffold electrode structures, such as carbon scaffold 300B and/or lithiated carbon scaffold 400A; (2) and, conductive pathways therein.

Production techniques employed to fabricate any one or more of the carbon-based structures disclosed herein may indicate a desirability of adjustment of individual graphene-layer edge lengths relative to planar surfaces thereof; also, the adjustment of the spacing in between individual graphene stacks may be possible. Graphene, given its two-dimensional structure, necessarily provides significantly more surface area in which Li ions can be inserted. Thus, applying graphene sheets in accordance with various aspects of the subject matter disclosed herein may provide a natural evolution in the direction of enhanced energy storage density.

Individual graphene sheets are held in position as a part of the plasma growth process. Carbon based gumball-like structures are self-assembled in-flight as described earlier from FLG and/or combinations of to form particles, such as carbon-based particle 100A, 100D, 402A and/or the like, with a defined long-range order defined as where solid carbon materials demonstrate a crystalline phase structure. Once the positions of carbon atom and its neighbors are defined, the location of each carbon atom can be defined precisely throughout the crystalline phase structure such that smaller structures agglomerate to form essentially what resembles a gumball.

Size dimensions of such gumball-like structures, describing individual carbon-based particles 100A and/or the like, may be on the order of 100 nm across at their respective widest points. Larger agglomerated particles forming a carbon lattice structure 1800 as shown in FIG. 18 can be made up from multiple gumball-like structures may be an order of magnitude larger, about 20-30 microns in diameter and provide structural definition to one or more of the film layers 406A-412A shown in FIG. 4A.

In contrast, traditional battery electrode production methods typically employ known deposition techniques such as chemical vapor deposition (CVD) or other fabrication techniques, nanotubes, etc., to grow structures off of a defined fixed substrate or surface, and thus do not involve the in-flight fusing of carbon-based particles in a substantially atmospheric vapor flow stream of a carbon-containing gaseous species as disclosed herein. Such known assembly processes and procedures can tend to be very labor intensive, and they may also permit for the growth of structures of limited thickness, 200-300 microns in thickness.

Graphene-on-graphene densification of multiple FLG on an original gumball-based carbon scaffold, such as the carbon-based particles 100A, the carbon scaffold 300B, the lithiated carbon scaffold 400A, and/or the like may also result in increased energy density and capacity. Such densification in target regions of the carbon scaffold may also be performed or otherwise accomplished after creation of a larger agglomerated particle comprising multiple carbon-based particles 100A. Generally, Li ions may be plated onto electrode prior to reduction, therefore Li ion may transition from an ion to a metal state dependent on battery chemistry. Moreover, in an implementation, similar to electroplating, graphene may be grown in a stacked manner on other materials, such as plastic, and tuned to obtain a desirable bright and/or smooth finish. Such electroplating processes are reversible and may include separate but interrelated plating process and a stripping processes, intended to place the Li ions and/or atoms down and for the subsequent removal thereof.

In continual cyclical use of secondary Li ion batteries, involving multiple charge-discharge-recharge cycles, surfaces upon which carbon-based structures are grown and/or built may eventually roughened and therefore susceptible to or accommodative of unwanted dendrite growth. In contrast, techniques employed to produce carbon-based particles 100A and/or the like, as discussed above, substantially prevent such dendrites from growing, enabled by the usage of Li metal substantially free of impurities along with carbon-based graphene structures to enable high specific capacity values.

Usage of graphene sheets permits for relatively greater exposed surface area available for plating or intercalating operations for the infiltration referring to non-reactive capillary infusion of Li ions. Thus, any tendency to go to a certain point anymore is removed; and, fundamentally the way plating and stripping occurs may be changed due to the graphene having a higher surface-area to volume ratio than other conventional carbon-based materials such as graphite. Li ions may be introduced at least partially relying upon liquid Li; however, given Li's predisposition for chemical reactivity with surrounding and/or ambient elements, water-based moisture and oxygen must be kept away. Similarly, the introduction of impurities results in deleterious effects. Metal-matrix composites have been studied, in relation to the disclosed carbon-based structures, regarding usage of Li metallically bonding or otherwise forming a metal-matrix composite with C, therefore offering additional options regarding the fine-tunability and management of reactivity at exposed surfaces.

Li in contact with C may result in circumstances where the free energy of carbide of Li at contact surfaces must be suppressed and/or controlled to avoid unwanted reactivity related to spontaneous Li infiltration in carbon-based particle 100A and/or the like. Traditionally, Li, in a liquid phase, typically forms carbonates and other formations due to the chemistry of the electrolyte. However, what is proposed by the present examples relates to the creation of a relatively stable solid electrolyte interface (SEI) prior to the introduction of the liquid electrolyte.

Moreover, multiple methods and/or processes to affect Li ion interface areas may be available. For instance, preparing the surface of liquid Li by alloying with Si and other elements will reduce the reactivity and promote overall Li ion wetting of larger agglomerated particles, each comprising multiple carbon-based particles 100A. In an example, approximately less than 1.5% of Li was observed to have preferentially moved to exposed surfaces, exposed to the electrolyte.

3D Hierarchical Graphene with Increased Specific Capacity (~3×) Over Conventional Graphite Anodes Commercial use of graphitic carbon materials for anode active materials as well as fine carbon black materials for electrical conduction is justified by their relatively low cost, excellent structural integrity for the insertion and extraction of Li+ ions, safety free from Li dendrite formation, and formation of a protective passivation layer against many electrolytes such as that associated with the formation or build-up of the solid electrolyte interphase (SEI).

The low specific capacity of graphite at 372 mAh/g, having stoichiometric formula-$LiC_6$, however, is a critical limitation and as a result, can potentially hinder the advance of large-scale energy storage systems that demand high energy and power densities. By designing and applying a three-dimensional (3D) graphene with intercalated Li and/or S compounds electrode approach as disclosed herein by any one or more of the aforementioned Figures, a larger loading amount of active anode materials can be accommodated while facilitating Li ion diffusion. Further, 3D nanocarbon frameworks, such as that defined by open porous scaffold 102A and/or the like) can impart:

an electrically conducting pathway; and structural buffer to high-capacity non-carbon nanomaterials, which results in enhanced Li ion storage capacity.

Both (1) and (2) enhance Li ion storage capacity (>1,000 mAh/g) and enhanced cycling (stability) performance can be achieved with these 3D structures.

Integration with Li Ion (and Li S) Battery Electrode

Figure 5:
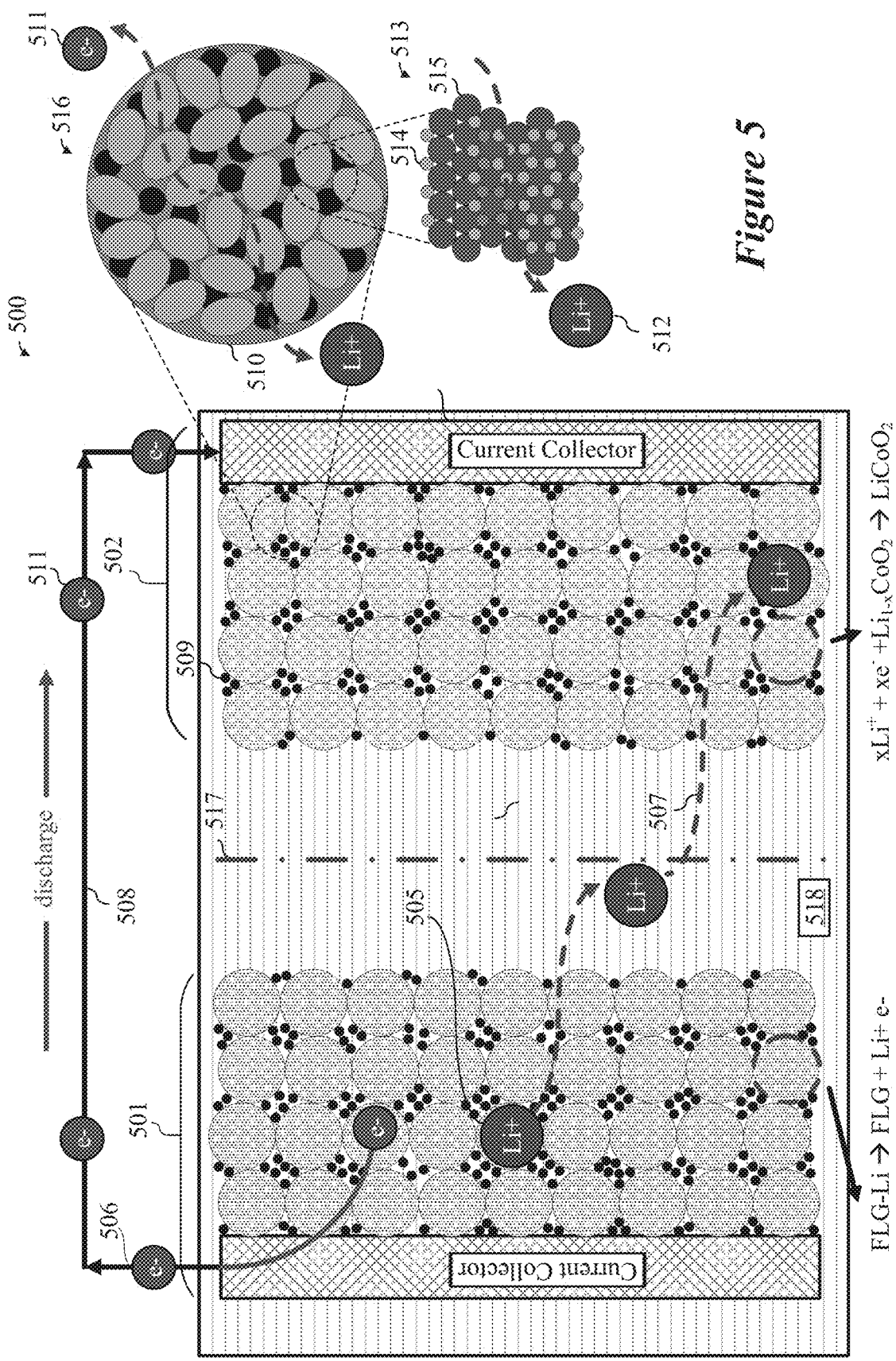
FIG. 5 shows an schematic diagram for an example Li ion or Li S electrochemical cell.

An example Li ion, or Li S, secondary electrochemical cell system 500 is shown in FIG. 5, having an anode 501 and cathode 502 separated by a separator 517. Any one or more of the anode 501 and the cathode 502 can be substantially formed by the lithiated carbon scaffold 400A shown in FIG. 4A, and represented here in a simplified representation of larger and smaller carbon particles 509, all of which are at least partially confine Li ion-conducting electrolyte solution 518 containing dissociated Li ion conducting salts 505 as shown. The separator, a porous membrane to electrically isolate the anode 501 and the cathode 502 from each other, is also in the position showed. Single Li ions migrate through pathway 507 back and forth between the electrodes of the Li ion-battery during discharge-charge cycles and are intercalated into carbon-based active materials forming any one or more of the anode 501 and the cathode 502 for confinement therein as necessary for optimal secondary electrochemical cell 500 performance.

Electrolytes, such as the electrolyte solution 518, can be generally categorized into several broad categories, including liquid electrolytes and solid electrolytes. The liquid electrolyte is most commonly used electrolyte system across many conventional batteries due to its high ionic conductivity, low surface tension, low interface impedance, and good wettability within the electrode. In Li S battery systems, liquid electrolytes dominate because they help compensate for a lot of the potentially encountered poor electrochemical kinetics of S and lithium sulfide ($Li_2S$). In Li S systems, a liquid electrolyte containing an ether-based solvent can be used, since because ether-based solvents, unlike carbonates, do not negatively react with S and generally have better Li ionic transport properties. A potential drawback of using ether-based electrolytes includes solubility of long chain polysulfides (PS), which can eventually lead to Li S electrochemical cell degradation due to PS shuttle, migration, and volumetric expansion of the cathode leading to compromise of its structural integrity.

Outside of conventional liquid-phase electrolytes, solid state electrolytes can be potentially configured to stop formation and growth of Li dendrites, and to stop the PS shuttle as solid state electrolytes effectively convert Li S systems from a multi-phase system to a single-phase system, resulting in no internal shorting, no leakage of electrolytes, and non-flammability. Solid polymer electrolytes can be defined as a porous membrane possessing the ability to transport Li ions across that membrane. A solid electrolyte can be further categorized into solid polymer electrolytes, gel polymer electrolytes, and non-polymer electrolytes. A solid polymer electrolytes can be composed of a lithium salt dissolved in a high molecular weight polymer host. Common polymer hosts used are polyethylene glycol (PEO), polyvinylidene fluoride or polyvinylidene difluoride (PVDF), poly(p-phenylene oxide) or poly (PPO), poly(vinylidene fluoride-co-hexafluoropropylene) (PVDF-HFP), and poly(methyl methacrylate) (PMMA), etc.

Gel polymer electrolytes can be similar to solid polymer electrolytes in that they have a high molecular weight polymer, but also include a liquid component tightly trapped within the polymer matrix. Gel polymer electrolytes, in some implementations, were developed to compensate for poor ionic conductivity observed in solid polymer electrolytes. Over other forms of solid electrolytes, non-polymer solid electrolytes have advantages of high thermal and chemical stability.

Non-polymer solid electrolytes consist of a ceramic and commonly found non polymer electrolytes include LIthium Super Ionic CONductor (LISICON), $Li_7La_3Zr_2O_{12}$ (LLZO), $Li_7La_{2.75}Ca_{0.25}Zr_{1.75}Nb_{0.25}O_{12}$ (LLCZN), Garnet, and Ge-Doped $Li_{0.33}La_{0.56}TiO_3$ (Ge-LLTO) Perovskite, etc., and can have a thickness in a range of approximately 0.5 μm to 40 μm, which can be configured to substantially prevent any one or more of Li dendrite formation or growth. Nevertheless, some solid electrolytes can suffer from certain challenges including relatively poor Li ionic conductivity and weight. At the thicknesses needed to prevent Li dendrite growth, observed ionic impedance can so high that a so-equipped Li ion or Li S battery may not function as desired, while at the thicknesses needed to have acceptable Li ionic conductivities, Li dendrite growth may not be prevented.

During discharging, Li is deintercalated from the anode 501. The active materials of the cathode 502 can include mixed oxides. Active materials of the anode 501 can include primarily graphite and amorphous carbon compounds including those presented herein. These are the materials into which the Li is intercalated.

The Li ion conducting salt 505 can dissociate to provide mobile Li ions available for intercalation into any one or more of the unique carbon-based structures disclosed herein that can be incorporated into any or more of the anode 501 or the cathode 502 as a formative material to achieve specific capacity retention capability exceeding 1,100 mAh/g or more as facilitated by the contiguous microstructures 107E. Li ions form complexes and/or compounds with S in Li S systems and are temporarily confined during charge-discharge cycles at levels not otherwise achievable through conventional unorganized carbon structures that require adhesive definition and combination via a binder, which can as discussed earlier also inhibit overall battery performance and longevity.

The pores 105E of the contiguous microstructures 107E shown in FIG. 1E, which may form the carbon based particle 100A, 100D, 402A and/or the like and be used to produce conductive graded film layers for any one or more of the anode 501 or the cathode 502 can be defined, during synthesis, to include a micropore volume (pores <1.5 nm). Sulfur (S) is infused via capillary force into the pores 105E where the S is be confined. Successful microconfinement of sulfur would prevent dissolved polysulfides (PS), as presented earlier regarding Li S systems generally, from recipitating outside of their original pores. To achieve an active carbon composite capable of holding achievable quantities of S, a pore volume of 1.7 cc/g with all 1.7 cc/g attributed to pores with an opening <1.5 nm may be needed.

Operationally, in either Li ion or Li S systems, Li ions migrate from the anode 501 through the electrolyte 518 and the separator 517 to the cathode 502. Here, molten Li metal 514 micro-confined, as shown in enlarged areas 516 and 513, within few-layer graphene sheets 515 associated with any of the presently disclosed carbon-based structures used as formative materials for the anode 501 or the cathode 502. Molten Li metal may dissociate in the anode 501 pursuant to the following equation (8):

$$FLG\text{-}Li \rightarrow FLG + Li + e- \qquad (8)$$

Eq. (1) shows electrons 506 and 511 discharging 508 to power an external load such that Li ions 512 migrating to cathode 502 return to a thermodynamically favored position within a cobalt oxide-based lattice pursuant to the following equation (9):

$$xLi^+ + xe^- + Li_{1-x}CoO_2 \rightarrow LiCoO_2. \qquad (9)$$

During charging, this process is reversed, where lithium ions 505 return-migrate from the cathode 502 through the electrolyte 518 and the separator 517 to the anode 501.

Disclosed carbon-based structures, referring to the surprising favorable specific capacity values made possible by the unique multi-modal hierarchical structures of carbon-based particle 100A, 100D and/or derivatives thereof, including carbon scaffold 300B and lithiated carbon scaffold 400A, any one or more of which can be configured to build upon traditional advantages offered by Li ion technology. Compared to sodium or potassium ions, the relatively smaller Li ion exhibits a significantly faster kinetics in the different oxidic cathode materials. Another difference includes that, as opposed to other alkaline metals, Li ions can intercalate and deintercalate reversibly in graphite and silicon (Si). And, a lithiated graphite electrode enables higher cell voltages. Disclosed carbon-based material therefore enhance the ease through which Li ions can intercalate and deintercalate reversibly between graphene sheets, due to the unique lay-out of few-layer graphene (FLG), such as 5-15 layers of graphene in a generally horizontally stacked configuration 101C, as employed in carbon-based particle 100A and/or the like, and are suitable for application hardcase, pouch cell, and prismatic applications.

Stabilization of Artificial Solid-Electrolyte Interface (SEI) Films by Doping

At present, current Li ion batteries form a protective passivation layer (such as the passivation layer 418A shown in FIG. 4A), or solid electrolyte interface (SEI) at the electrode surface exposed to electrolyte during a pre-conditioning step when the electrolyte is first introduced followed by initial discharge and charge steps. Although electrolyte chemistry and pre-conditioning protocols, such as charge/discharge rate and overvoltage, may be adjusted to optimize film passivation, referring to SEI formation, conventional film layers incorporated into electrodes can still be chemically and mechanically unstable.

Figure 6A:
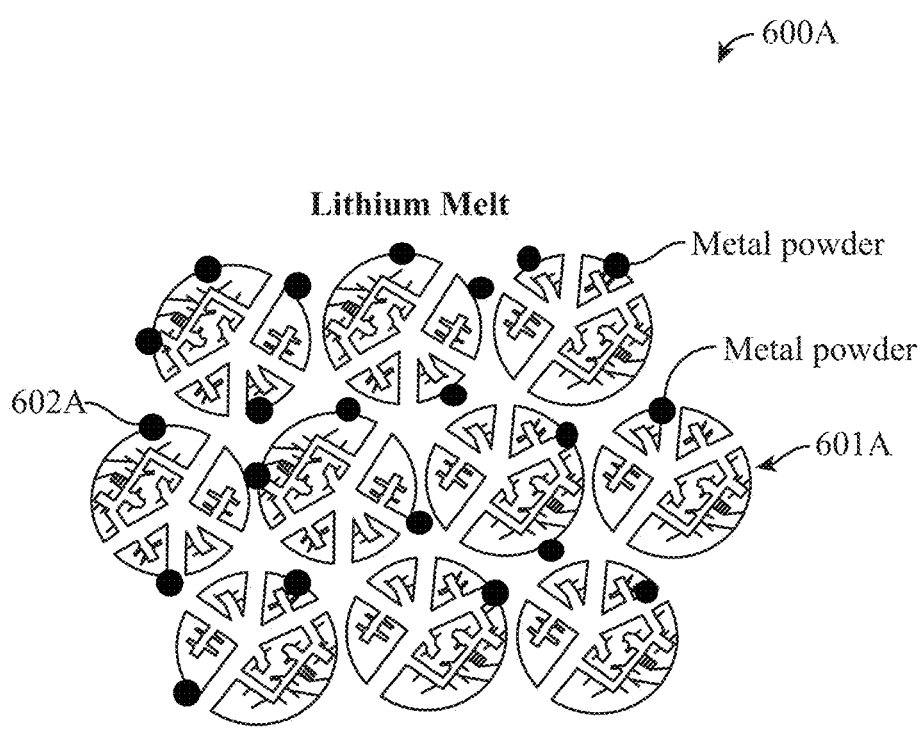
FIG. 6A shows a schematic diagram of the incorporation of metal powders into a carbon particle for Li wetting and infiltration.

Referring now to FIG. 6A, specific elements 602A may be introduced to the aforementioned carbon materials 600A by doping. The elements 602A, such as silicon, sulfur, nitrogen, phosphorous at an example exposed electrode surface 601A can be coated at specified levels of conformal coverage onto the electrode surfaces 601A of the carbon structures, such as ranging from sparse decoration to complete conformal coverage. Precedence for formation of stable solid-state electrolyte ion conducting layers have been reported in literature; referring to sulfide-based thioLISCONs, defined as Lithium Sulfur CONductors having the chemical formula $Li_{3.25}Ge_{0.25}P_{0.75}S_4$, and phosphate-based NASCIONs, such as sodium (Na) Super Ionic CONductor, which usually refers to a family of solids with the chemical formula $Na_{1+x}Zr_2Si_xP_{3-x}O_{12}$, $0<x<3$ and the acronym is also used for similar compounds where Na, Zr and/or Si are replaced by isovalent elements. The formation of a stabilizing solid state passivation layer as explained here include doping specific elements 602A the electrode surface 601A can be engineered prior to battery assembly and thereby decouple the formation process of a stable solid state ion conducting layer from the reduction/oxidation events that occur when in contact with electrolyte, as encountered in current Li-ion battery fabrication which still often suffers from long term stable operation.

Manufacturing with Slurry Cast Techniques

In combination with conductive particles, such as carbon black, and optionally polymer binders and solvent, such as NMP, any one or more of the tuned 3D hierarchical graphene-based particles disclosed herein can be directly incorporated into conventional slurry cast electrode fabrication processes as follows:

an active graphene based (FLG) substitute for graphite particles, in the case of the anode; and/or infused with active sulfur (S) in the case of the cathode. The 3D graphene particles provide high specific capacity graphene building blocks with interconnected mesoporous ionic conducting channels for rapid Li ion transport along with carbon black and binder to ensure electrical conducting pathways, such as defined by the graphene sheets 101B used as a formative material for the contiguous microstructures 107E, which also provide mechanical integrity.

Disclosed carbon materials can be pre-lithiated by ball milling and/or post thermal annealing and electrochemical reduction from a third electrode, at:

a relatively low concentration to offset first charge Li loss in conventional oxide cathode cell; or at a relatively higher concentration to increase overall specific capacity for both oxide and alternative cathode configurations, and then slurry cast into electrodes.

Figure 6B:
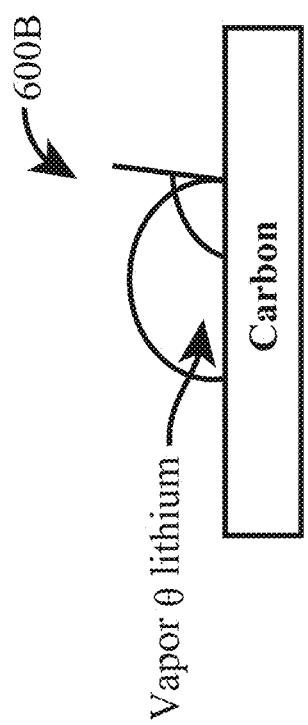
FIGS. 6B and 6C show schematic diagrams for chemically non-reactive systems and chemically reactive systems, respectively.
Figure 6C:
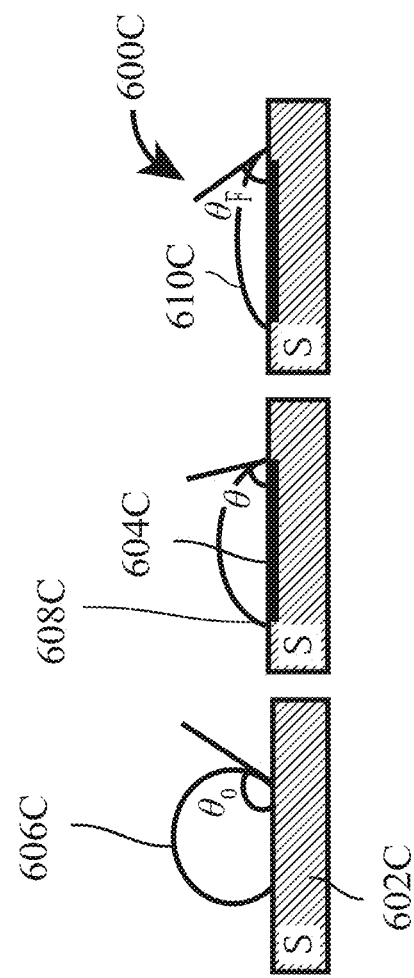

FIGS. 6B1 and 6B2 show a schematic diagrams comparing a chemically non-reactive system 600B1 against a chemically reactive system 600B2 in the context of active material infiltration and confinement of lithium (Li) within the active material, according to some implementations. Although configurations where molten Li metal is infiltrated into any one or more of the presently disclosed carbon-based structures shown in FIG. 1A through FIG. 1E, such as the contiguous microstructures 107E, alternative or additional implementations provide for the infusion of molten Li metal droplets, in a vapor phase, into pores, such as the pores 105E. In the chemically non-reactive system 600B1, Li metal droplets are prepared, or are expected to, fail to react with carbon on contact with exposed carbon surface due to, for example, Li-phobicity of the carbon. Regardless, infusion of vapor-phase Li droplets at an intrinsic contact angle (θ) between approximately 50° and 90° can provide a balance between competing liquid-to-solid adhesive forces, such as adhesion observed between liquid-phase molten Li droplets (such as that used to provide the Li ions 108E) and solid-phase carbon proportional to ($\gamma_{sl}$) cohesive forces in liquid ($\gamma_{lv}$).

Wetting, occurring between the vapor-phase Li and solid-phase carbon, is defined as the ability of a liquid to maintain contact with a solid surface, resulting from intermolecular interactions when the two are brought together where the degree of wetting, or wettability, can be determined by a force balance between adhesive and cohesive forces. Desirable degrees of wetting can occur where adhesive energy is near cohesive energy, such as with tightly-held bonds, as encountered in liquid-phase metals dispersed on solid-phase metals, or as seen in semiconductors including silicon (Si), germanium (Ge), or silicon carbide (SiC), as well as ceramics including any one or more of carbides, nitrides, or borides, which can demonstrate metallic-like behavior near exposed surfaces. And, usage of liquid-phase metals with a relatively high solubility for atmospheric contaminants, such as oxygen (O), nitrogen (N), or moisture ($H_2O$ vapor), or carbon, can reduce the contact angle observed or needed during wetting at contaminated solid surfaces, or at pure-carbon surfaces.

In the chemically reactive system 600B2, wetting of a carbon surface layer 602B2, such as that encountered on surfaces of the carbon-based particle 100A exposed to Li metal, can be accompanied by chemical reaction occurring at that interface, such as the dissolution of solid carbon materials or the formation of a new 3D layer 604B2 or compound involving at least partial consumption of the underlying carbon surface layer 604B2. The addition of dopants, tuned by type and concentration, at the carbon surface layer 602B2 can also affect a degree or extent of wetting, as shown by the various fluid positions 606B2, 608B2 and 610B2, showing a molten Li droplet with very little wetting at position 606B2 with progressively greater wetting at positions 608B2 and 610B2, respectively. The formation of the new 3D layer 604B2 can, in some implementations, alter properties of the underlying carbon surface layer 602B2, such properties including electrical conductivity, or can otherwise limit, by pinching off, infiltration into porous media by the formation of a volumetrically expanded reaction product, shown as the new 3D layer 604B2.

For either the chemically non-reactive system 600B1 or the chemically reactive system 600B2, decreasing the contact angle of liquid Li metal droplet beads, such as that shown in position 610B2, can promote wetting of the underlying carbon surface layer 602B2. And, for configurations where the carbon surface layer 602B2 incorporates adsorbed or chemically bonded oxygen (O), the addition of elements, such as that also referred to as getters, with a high O solubility can reduce or otherwise control O activity at the new 3D layer 604B2. For solid variants of the carbon surface layer 602B2, the addition of elements such as nickel (Ni), iron (Fe), or others to liquid-phase metals having a high carbon solubility can insure a relatively high surface activity or affinity.

Figure 7:
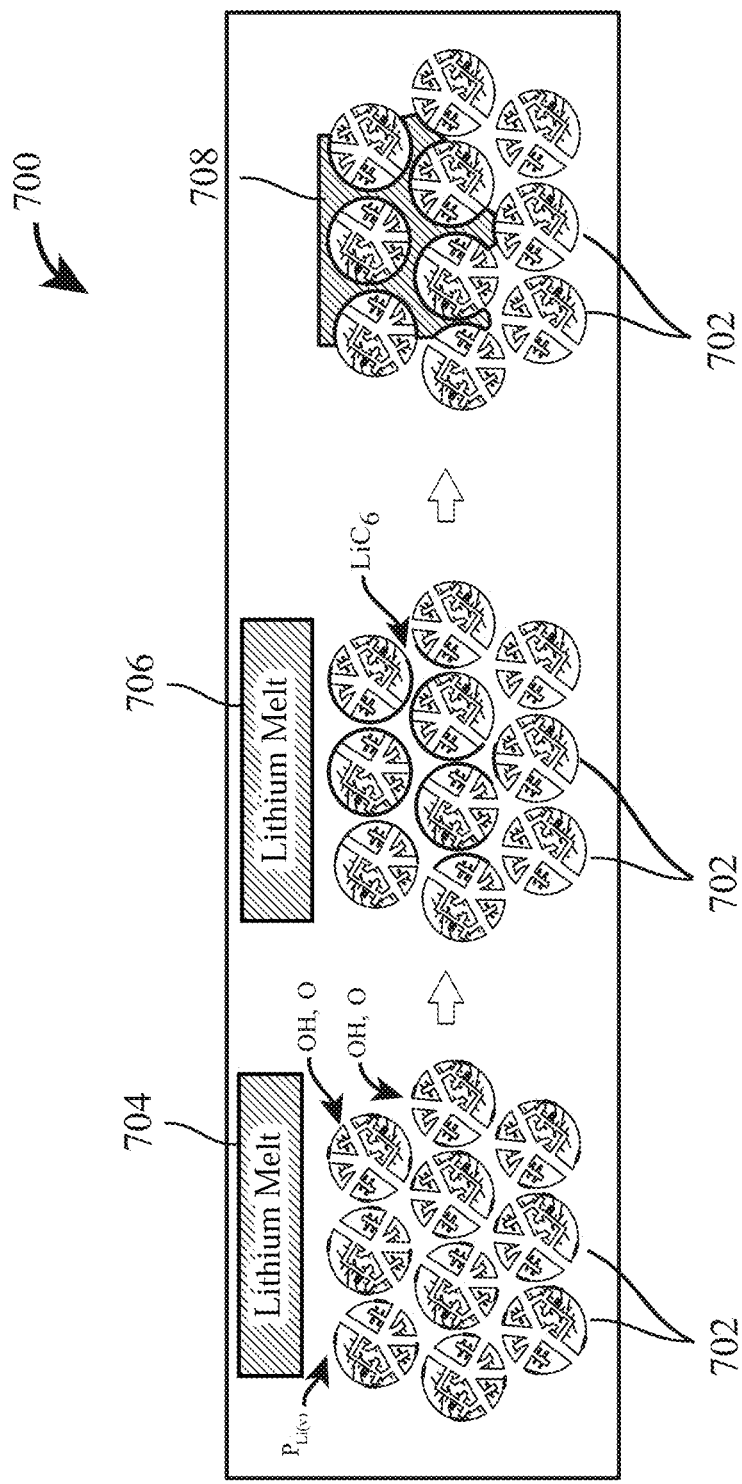
FIG. 7 shows an example process workflow where molten Li metal is infiltrated into void spaces between carbon agglomerations.

FIG. 7 shows an example process workflow where molten Li metal is infiltrated into void spaces between carbon agglomerations to initiate a reaction at exposed carbon surfaces, according to some implementations. Considerations for infiltrating Li metal 704, 706 into packed carbon scaffold 702, which may be incorporated within or otherwise provide a formative material for any one or more of the presently disclosed carbon-based structures such as carbon particle 100A shown in FIG. 1A or contiguous microstructures 107E shown in FIG. 1E, are shown in an infiltration process workflow schematic 700. Surface conditions of the carbon scaffold 702 can be tuned prior to infiltration by molten Li metal, which can enter into the carbon scaffold 702 by any one or more of capillary infusion using molten Li metal in a liquid-phase, or infusion of molten Li metal droplets suspended in air forming a Li metal vapor. Precise tuning of the following conditions at carbon scaffold 702 surfaces exposed to incoming Li include control of:

atmospheric contaminants such as moisture ($H_2O$ vapor), oxygen (O), nitrogen (N), and hydrocarbons configured to confine or contain physiosorbed or chemisorbed O;

formation of nitrogen bonds at surface during post plasma treatment; and purity of lithium metal, such as control of prevalent surface oxides, nitrides, and carbonates.

Figure 8C:
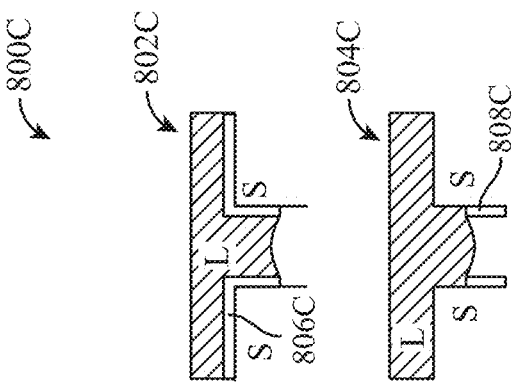
FIGS. 8B and 8C show non-reactive and reactive systems regarding Li infiltration into carbon structures.

Li infiltration can be initiated by capillary infusion of molten Li metal 704, 706 to intersperse within the carbon scaffold 702 as well as fill, forming a lithiated carbon compound 708, void spaces of the packed carbon scaffold 702. Procedures can be followed by a non-reactive Li wetting infiltration and post-reaction processed. Various specific process options exist through which Li can be infiltrated into the carbon scaffold 702, including:

usage of molten Li metal to initiate a reaction at exposed carbon surfaces—assuming conditions of controlled hydroxyl group (OH) and oxygen (O) adsorption on exposed surfaces of the carbon scaffold 702, such as one or more lithiophilically-functionalized surfaces that are configured to provide Li adsorption centers, thermal oxide reduction or exposure of the carbon scaffold 702 to above-positioned pristine molten Li metal vapor for a duration of, for example 30 to 45 seconds at approximately 200° C., can initiate a chemical reaction at exposed surfaces of the carbon scaffold 702 to form a lithiophilic surface, such as $LiC_6$;

coating of exposed carbon surfaces with surface active elements to control surface contaminants on interfacial regions of molten Li metal and exposed carbon—fluxing elements can be used to break oxide skull and/or facilitate melting of halogens including fluorine (F), oxide getters can be used to reduce oxide (Ti, other);

promoting alloying and wetting by coating exposed carbon surfaces with elements, such as metals, having a lower surface energy than Li and/or elements such as silicon (Si) aluminum (Al) that facilitate Li wetting and/or infiltration; and incorporating metal powders, or metal containing compounds, such as silicon carbide (SiC), and others, in carbon preform, such as, SiNP, Ni, and other, to serve as binder and facilitate wetting infiltration allowing for the control of a ratio of metal to carbon dependent on non-reactive wetting parameters. FIG. 8A shows an equation for a rate of infiltration a carbon-based structure with void spacing therein defined by any one or more of the 3D carbon-based particles shown in FIG. 1A through FIG. 1F, according to some implementations.

FIG. 8A shows an equation for modelling a rate of Li infiltration into any one or more of the porous regions of the currently presented carbon-based structures, such as the pores 105E and contiguous pathways 107E shown in FIG. 1E of the carbon-based particle 100A shown in FIG. 1A. The rate of infiltration can be controlled by the non-reactive viscous resistance of liquid metal, such as molten Li metal, followed by a chemical reaction between the liquid metal contacting the carbon to yield carbide pursuant to Washburn's equation 800A shown in FIG. 8A, where σ and η are surface tension and viscosity of liquid, respectively, θ is the contact angle and $r_{eff}$ is the effective pore radius of pores, such as the pores 105E shown in FIG. 1E, that can be interspersed throughout a carbon-based scaffold, such as the carbon-based scaffold 702 shown in FIG. 7. Therefore, as can be seen by the various coefficients used in the Washburn's equation 800A, capillary flow is described by modelling the carbon-based pre-form structure as a theoretical bundle of parallel cylindrical tubes to effectively represent imbibition into porous materials.

Figure 8B:
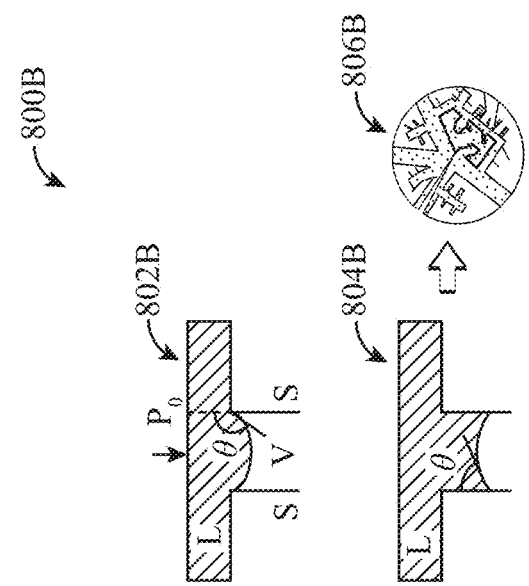
Figure 8A:
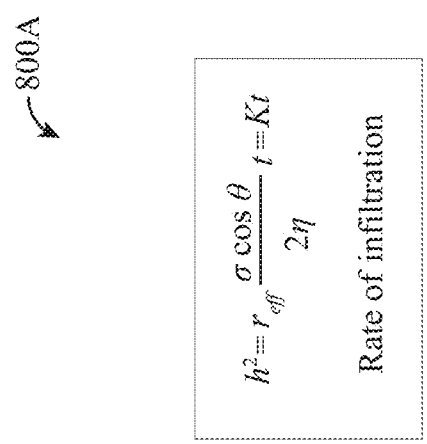
FIG. 8A shows an equation for a rate of infiltration a carbon-based structure.

FIG. 8B shows a non-reactive system 800B including a non-wetting configuration 802B and a spontaneous wetting configuration 804B, according to some implementations. For instance:

in the non-wetting configuration 802B, a pressure ($P_0$) is applied to overcome capillary pressure, such as the pressure between two immiscible fluids in a thin tube, resulting from the interactions of forces between the fluids and solid walls of the tube, and can be limited by viscous friction, such as that established and characterized by the Washburn's equation 800A; L can denote a liquid-phase Li layer, such as that provided by molten Li metal, S can denote solid carbon surfaces exposed to L, θ can denote the contact angle of L to S, and V can denote viscous friction and characterized by the Washburn's equation 800A at the contact region of L to S;

in the spontaneous wetting configuration 804B, θ is maintained at an angle of <60° to achieve non-reactive Li infiltration of the carbon-based scaffold; and any one or more of the non-wetting configuration 802B or the spontaneous wetting configuration 804B can be incorporated in or otherwise implemented in an example carbon-based scaffold 806B, which may be a formative part of any one or more of the presently disclosed carbon-based structures.

FIG. 8C shows a reactive system 800C including a wettable reactive product layer configuration 802C and a non-wettable surface layer configuration 804B, according to some implementations. The wettable reactive product layer configuration 802C can involve the formation of a new 3D layer 806C similar to that discussed earlier with relation to the chemically reactive system 600B2 shown in FIG. 6B2, where the formation of the new 3D layer 604B2 or compound involves at least partial consumption of the underlying carbon surface layer 604B2. Here the solid carbon material S can be at least partially consumed to produce or generate the new 3D layer 806C which can be or include $LiC_6$. In contrast, in the non-wettable surface layer configuration 804B, surfaces of S immediately facing, such as in the vertical direction, L are not reactive such that encroachment of L into capillary, tubular, open regions results in consumptive reaction with S to yield a new 3D layer 808C only along those capillary open regions.

Figure 9:
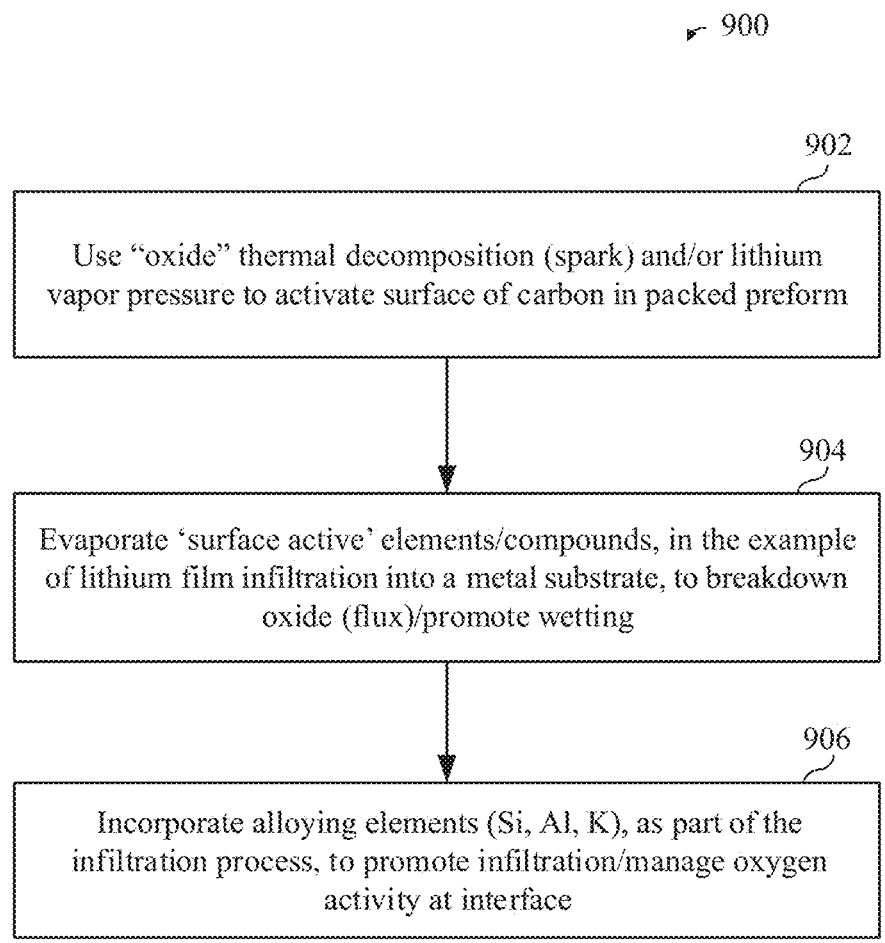
FIG. 9 shows a flowchart depicting example operations of lithiating and alloying a carbon-based structure.

FIG. 9 shows a flowchart 900 for a method of lithiating and alloying a carbon-based structure, according to some implementations. At block 902, oxide thermal decomposition can be used to initiate surface interface reaction by lithium (Li) vapor pressure to activate surface of carbon in packed preform. At block 904, surface active elements compounds, in the example of Li film infiltration into a metal substrate, can be evaporated to breakdown oxide flux and/or promote wetting. At block 906, alloying elements, such as silicon (Si), aluminum (Al), and potassium (K), can be incorporated as part of the infiltration process to promote infiltration/manage oxygen activity at interface.

Figure 10A:
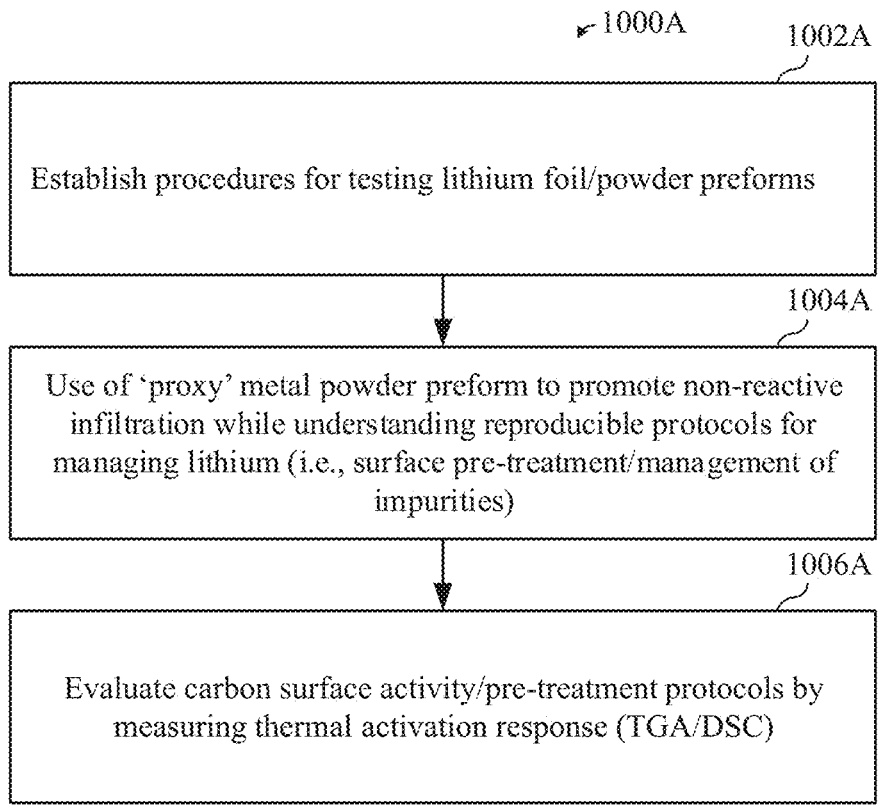
FIG. 10A shows a flowchart depicting example operations of preparing a carbon-based structure.

FIG. 10A shows a flowchart for a method 1000A of preparing a carbon-based structure to undergo a lithiation operation, according to some implementations. At block 1002A, procedures can be established for testing lithium foil/powder preforms. At block 1004A, of proxy metal powder preform can be used to promote non-reactive infiltration while understanding reproducible protocols for managing lithium, such as surface pre-treatment/management of impurities. At block 1006A, carbon surface activity/pre-treatment protocols can be evaluated by measuring thermal activation response through various techniques including thermogravimetric analysis (TGA) and/or differential scanning calorimetry (DSC).

Figure 10B:
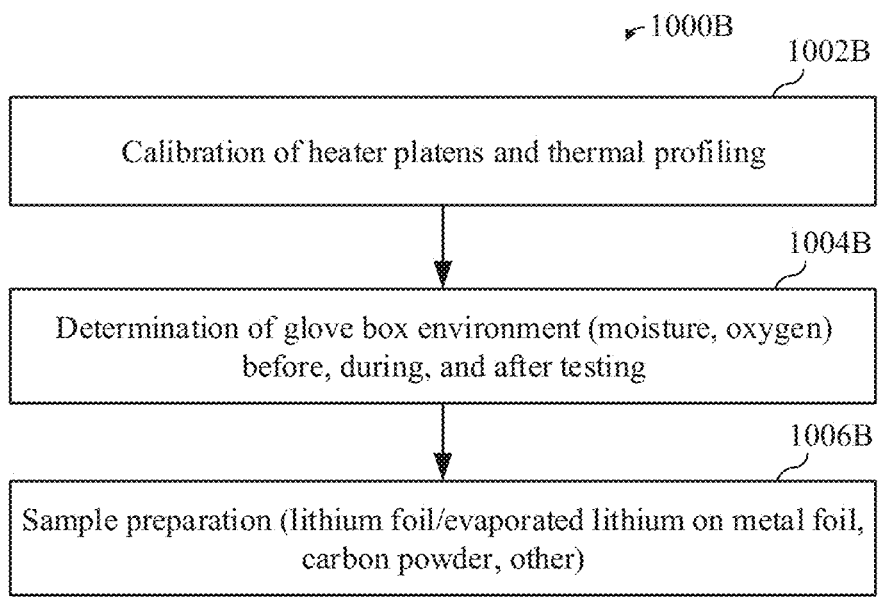
FIG. 10B shows a flowchart depicting example operations of preparing Li materials.

FIG. 10B shows a flowchart for another method 1000B of preparing Li materials suitable for usage in a lithiation operation, according to some implementations. At block 1002B, heater platens can be calibrated, and a thermal profiling of materials can be conducted. At block 1004B, a glove box environment can be determined, such as involving conditions or settings for moisture and oxygen before, during, and after testing. At block 1006B, sample can be prepared from any one or more of lithium foil and/or evaporated lithium on metal foil, carbon powder, and others.

Figure 10C:
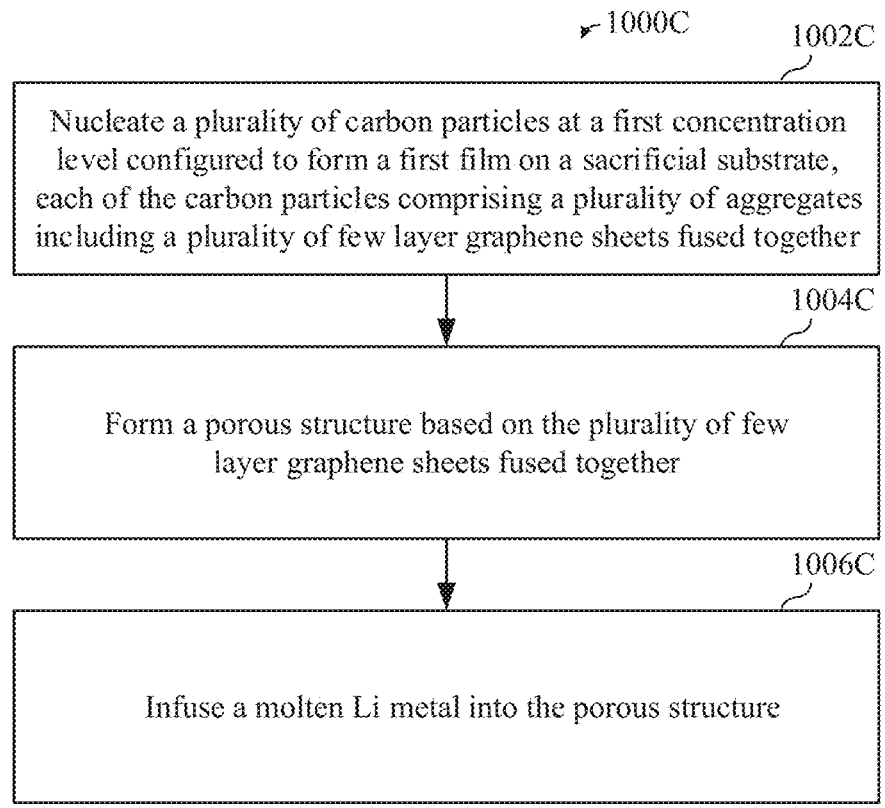
FIG. 10C through FIG. 10P show flowchart depicting example operations of fabricating an electrochemical cell electrode.

FIG. 10C shows a flowchart for a method 1000C of nucleating a plurality of carbon particles at a first concentration level. At block 1002C a plurality of carbon particles can be nucleated at a first concentration level configured to form a first film on a sacrificial substrate, each of the carbon particles comprising a plurality of aggregates including a plurality of few layer graphene sheets fused together. At block 1004C a porous structure can be formed based on the plurality of few layer graphene sheets fused together. At block 1006C, a molten Li metal can be infused into the porous structure.

Figure 10D:
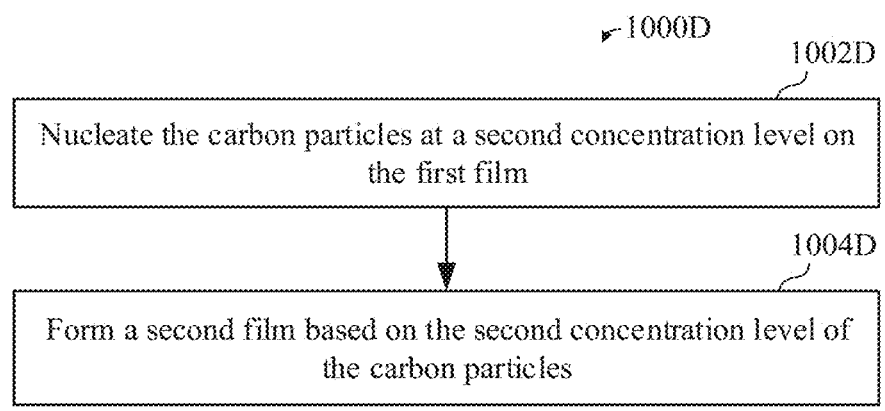

FIG. 10D shows a flowchart for a method 1000D of nucleating a plurality of carbon particles at a second concentration level. At block 1002D, the carbon particles can be nucleated at a second concentration level on the first film. At block 1004D, a second film can be formed based on the second concentration level of the carbon particles.

Figure 10E:
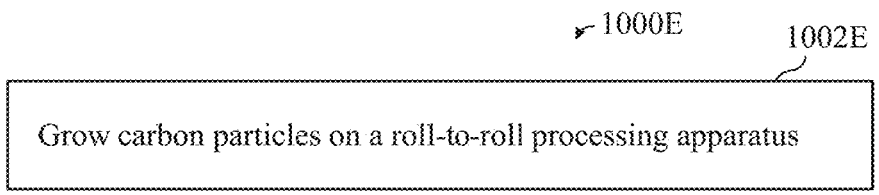

FIG. 10E shows a flowchart for a method 1000E of growing carbon particles. At block 1002, carbon particles can be grown on a roll-to-roll processing apparatus.

Figure 10F:
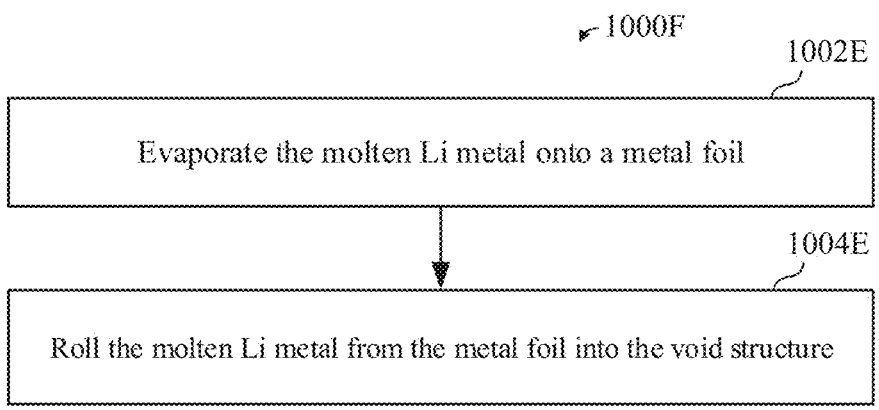

FIG. 10F shows a flowchart for a method 1000F of evaporating the molten Li metal. At block 1002E, the molten Li metal can be evaporated onto a metal foil. At block 1004E, the molten Li metal can be rolled from the metal foil into the porous structure.

Figure 10G:
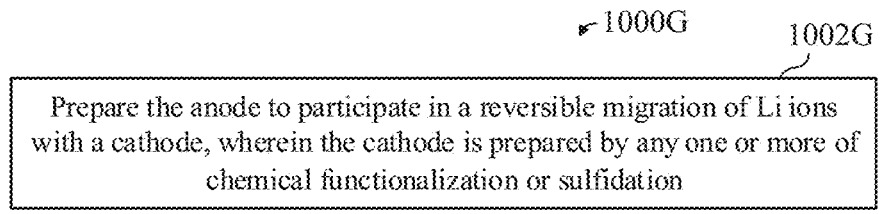

FIG. 10G shows a flowchart for a method 1000G of preparing the anode to participate in a reversible migration of Li ions. At block 1002G, the anode can be prepared to participate in a reversible migration of Li ions with a cathode. The cathode is prepared by any one or more of chemical functionalization or sulfidation.

Figure 10H:
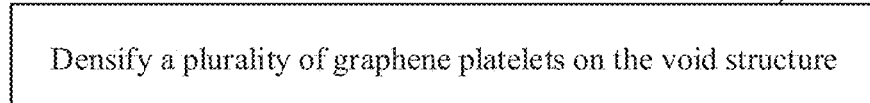

FIG. 10H shows a flowchart for a method 1000H of densifying a plurality of graphene platelets. At block 1002H, a plurality of graphene platelets can be densified on the void structure.

Figure 10I:
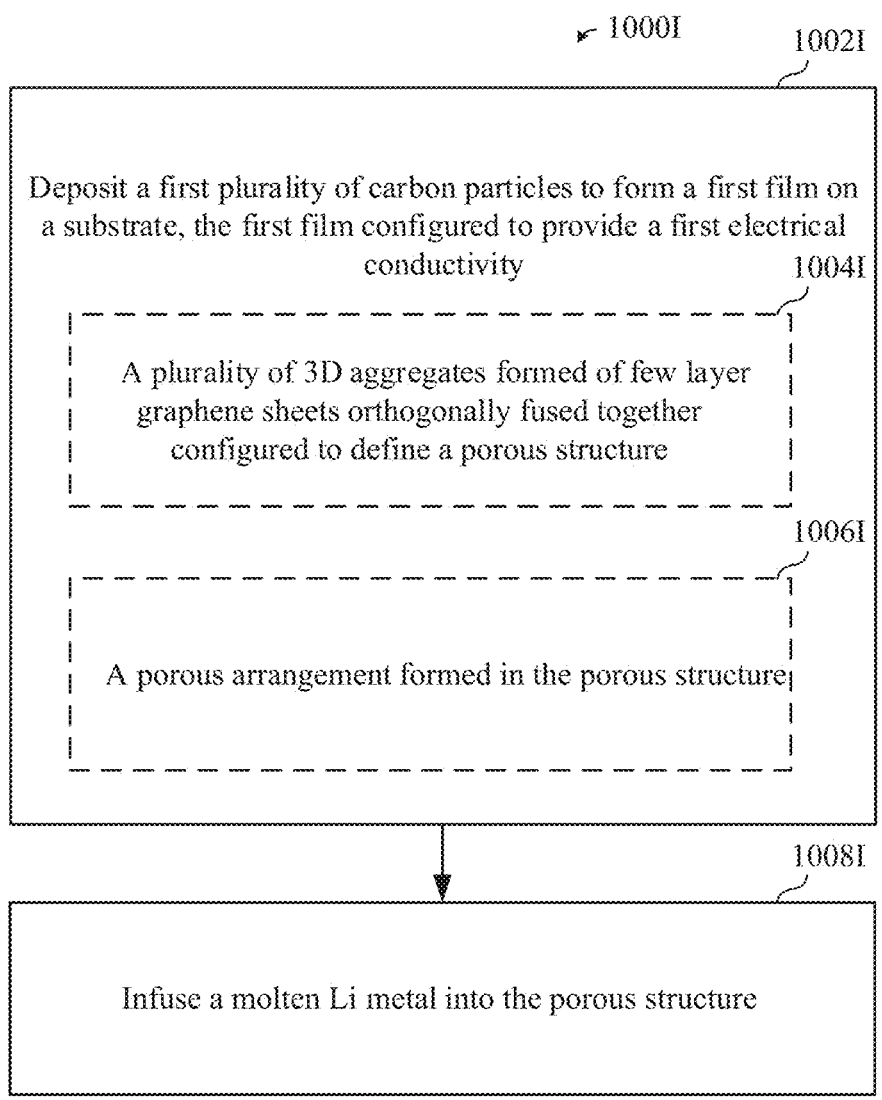

FIG. 10I shows a flowchart for a method 1000I of depositing a first plurality of carbon particles to form a first film. At block 1002I, a first plurality of carbon particles can be deposited to form a first film on a substrate, the first film configured to provide a first electrical conductivity. At block 1004I, a plurality of 3D aggregates formed of few layer graphene sheets can be orthogonally fused together configured to define a porous structure. At block 1006I, a porous arrangement can be formed in the porous structure. At block 1008I, a molten Li metal can be infused into the void structure.

Figure 10J:
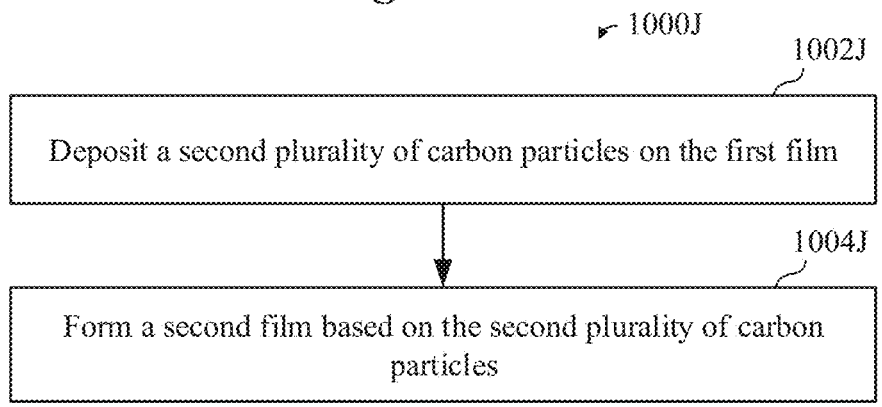

FIG. 10J shows a flowchart for a method 1000J of depositing a second plurality of carbon particles. At block 1002J, a second plurality of carbon particles can be deposited on the first film. At block 1004J, a second film can be formed based on the second plurality of carbon particles.

Figure 10K:
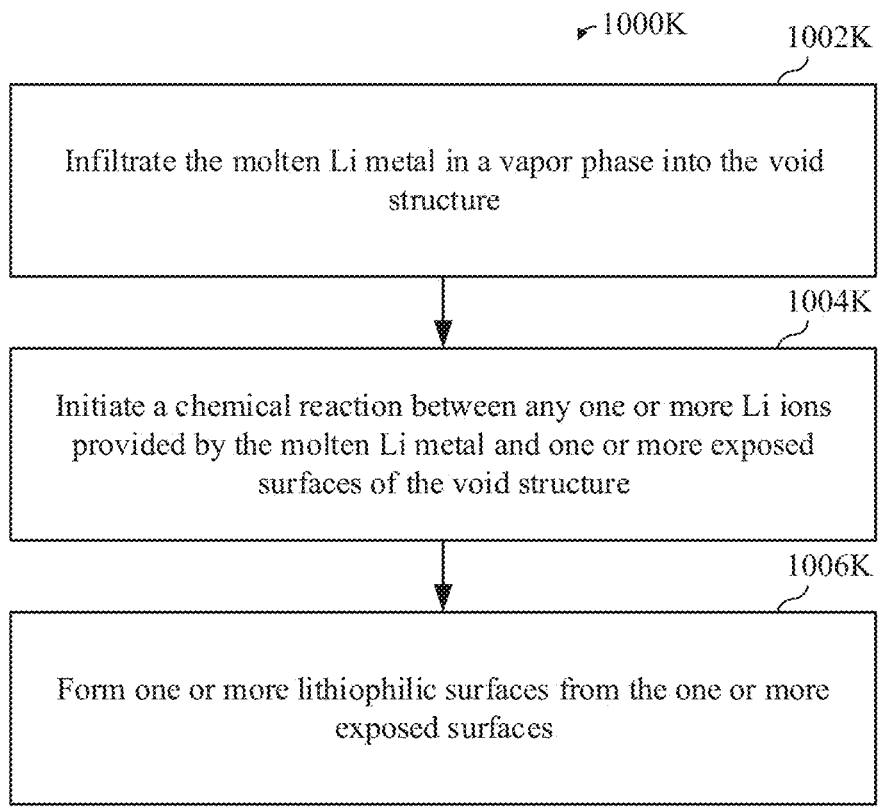

FIG. 10K shows a flowchart for a method 1000K of infiltrating the molten Li metal. At block 1002K, the molten Li metal can be infiltrated in a vapor phase into the void structure. At block 1004K, a chemical reaction can be initiated between any one or more Li ions provided by the molten Li metal and one or more exposed surfaces of the void structure. At block 1006K, one or more lithiophilic surfaces can be formed from the one or more exposed surfaces.

Figure 10L:
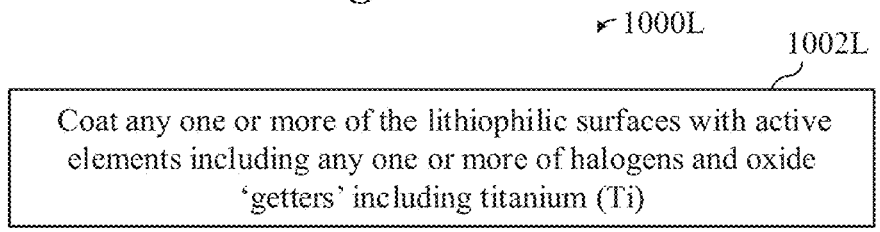

FIG. 10L shows a flowchart for a method 1000L of coating any one or more of the lithiophilic surfaces. At block 1002L, any one or more of the lithiophilic surfaces can be coated with active elements including any one or more of halogens and oxide getters including titanium (Ti).

Figure 10M:
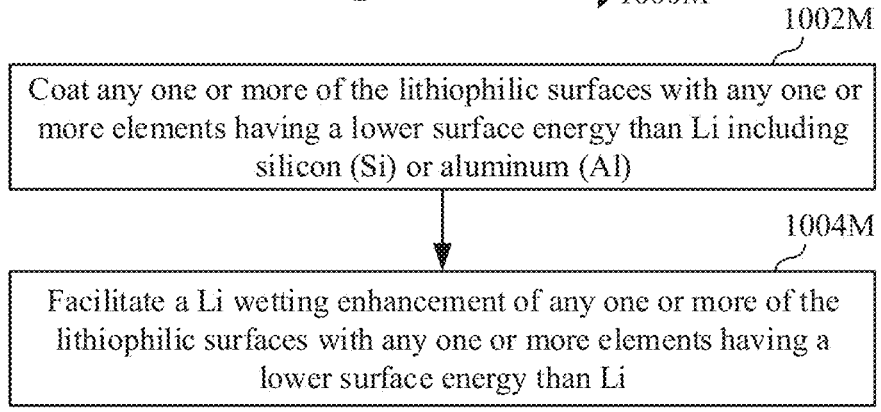

FIG. 10M shows a flowchart for a method 1000M of coating any one or more of the lithiophilic surfaces. At block 1002M, any one or more of the lithiophilic surfaces can be coated with any one or more elements having a lower surface energy than Li including silicon (Si) or aluminum (Al). At block 1004M, a Li wetting enhancement can be facilitated of any one or more of the lithiophilic surfaces with any one or more elements having a lower surface energy than Li.

Figure 10N:
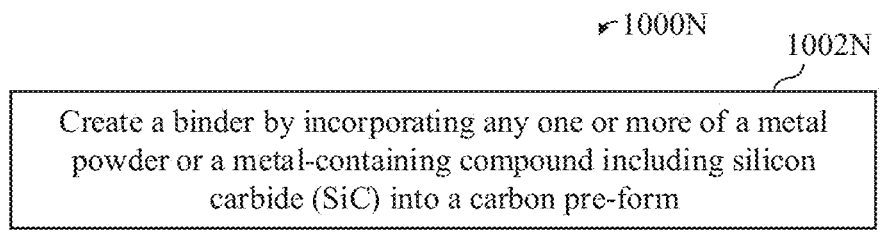

FIG. 10N shows a flowchart for a method 1000N of creating a binder. At block 1002N, a binder can be created by incorporating any one or more of a metal powder or a metal-containing compound including silicon carbide (SiC) into a carbon scaffold.

Figure 10O:
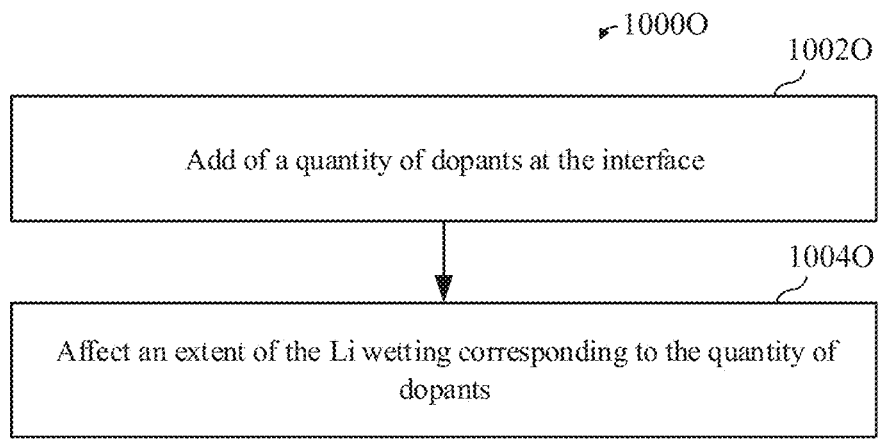

FIG. 10O shows a flowchart for a method 1000O of adding of a quantity of dopants. At block 1002O, of a quantity of dopants can be at the interface. At block 1004O, an extent of the Li wetting can be affected corresponding to the quantity of dopants.

Figure 10P:
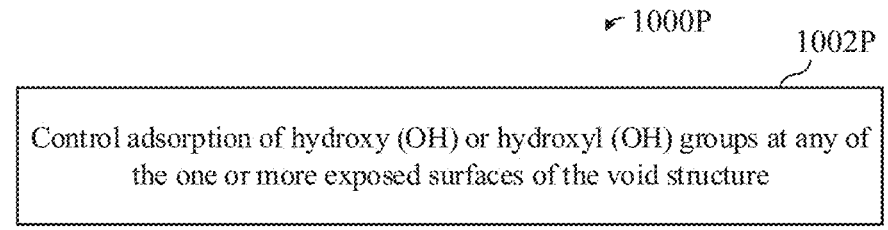

FIG. 10P shows a flowchart for a method 1000P of control adsorption of hydroxy (OH) or hydroxyl (OH) groups. At block 1002P, adsorption of hydroxy (OH) or hydroxyl (OH) groups can be controlled at any of the one or more exposed surfaces of the void structure.

Figure 11A:
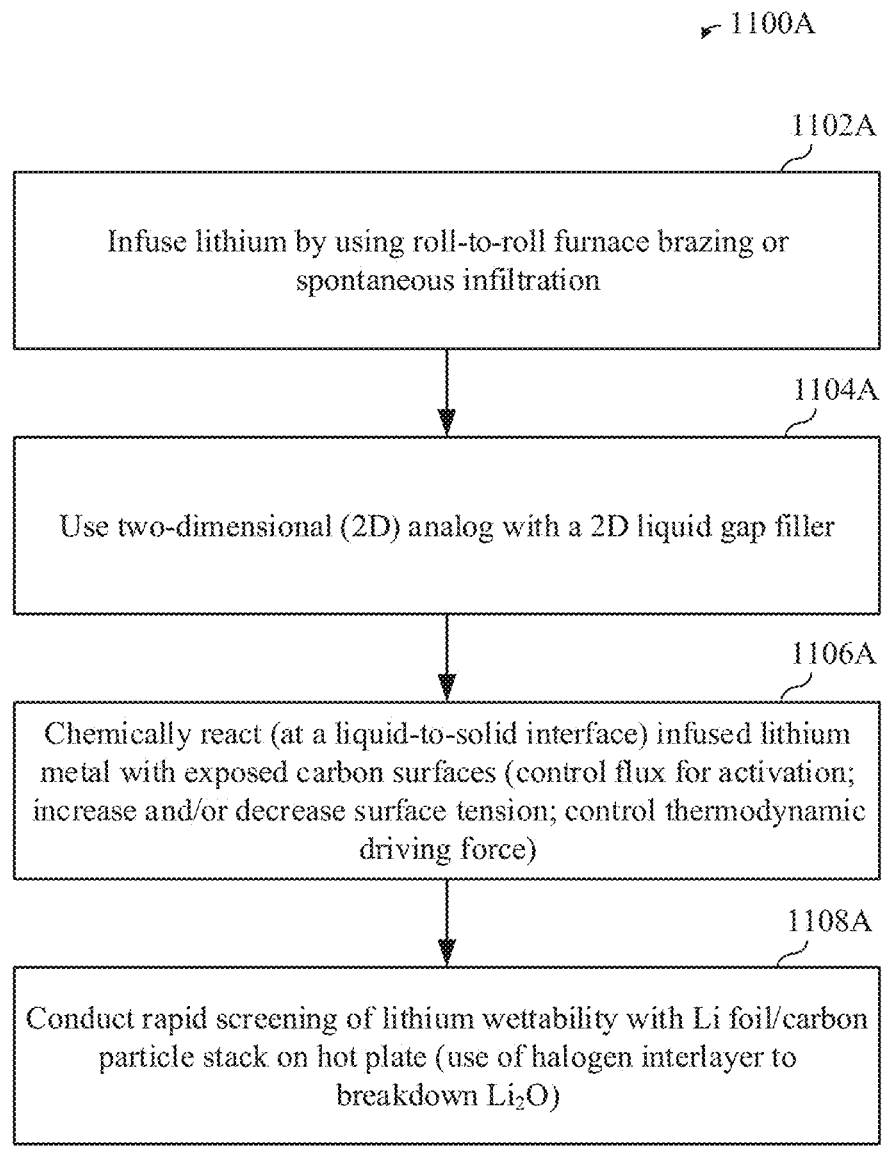
FIG. 11A through 11C show depicting example operations of preparing a carbon particle for lithiation.

FIG. 11A shows a flowchart for a method 1100A of Infuse lithium. At block 1102A, lithium can be infused by using roll-to-roll furnace brazing or spontaneous infiltration. At block 1104A, a two-dimensional (2D) analog can be used with a 2D liquid gap filler. At block 1106A, infused lithium metal can be chemically reacted at a liquid-to-solid interface with exposed carbon surfaces with controlled flux for activation, increased and/or decreased surface tension, and controlled thermodynamic driving force. At block 1108A, rapid screening of lithium wettability can be conducted with Li foil/carbon particle stacked on hot plate by using a halogen interlayer to breakdown $Li_2O$.

Figure 11B:
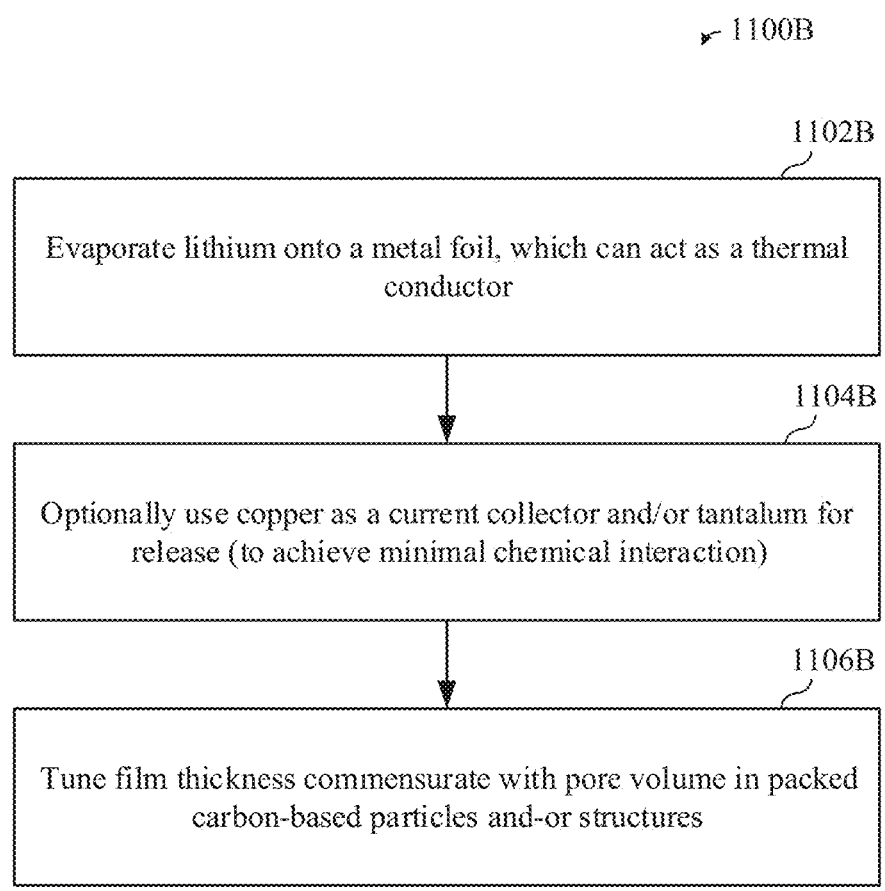

FIG. 11B shows a flowchart for a method 1100B of evaporating lithium (Li) onto a metal foil. At block 1102B, lithium can be evaporated onto a metal foil, which can act as a thermal conductor. At block 1104B, copper can be optionally used as a current collector and/or tantalum for release to achieve minimal chemical interaction. At block 1106B, film thickness can be tuned commensurate with pore volume in packed carbon-based particles and-or structures.

Figure 11C:
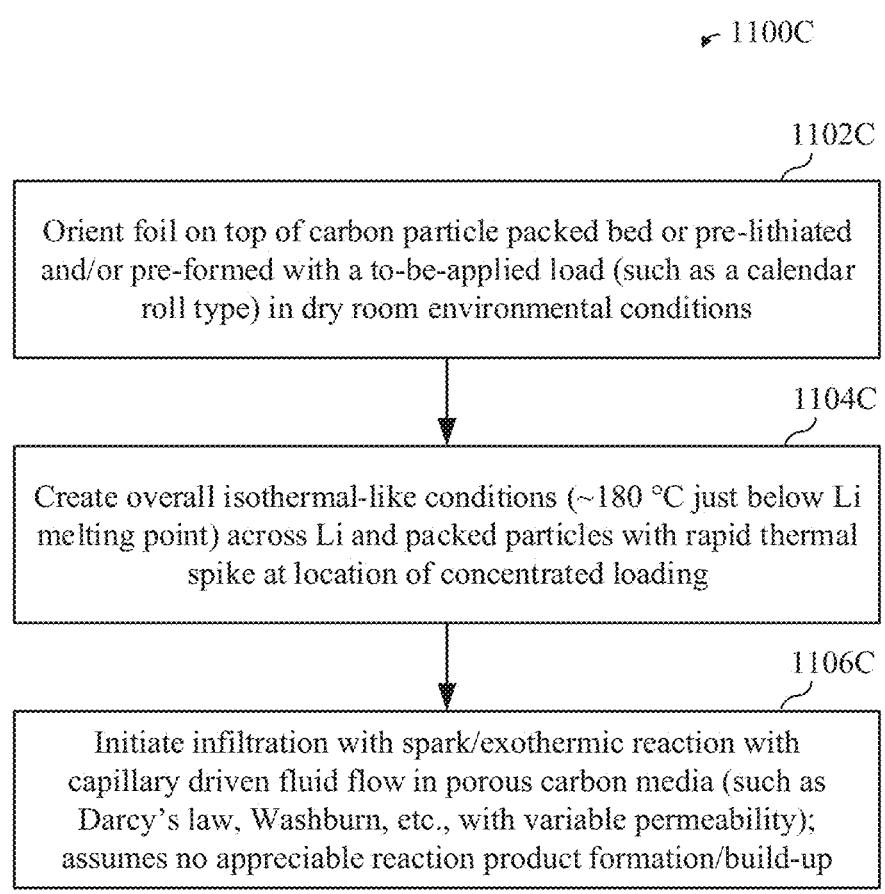

FIG. 11C shows yet another flowchart for a method 1100C of preparing a carbon particle for lithiation, such as through process referred to as pre-lithiation. At block 1102C, foil on top of carbon particle packed bed or pre-lithiated and/or pre-formed can be oriented with a to-be-applied load, such as a calendar roll type, in dry room environmental conditions. At block 1104C, overall isothermal-like conditions, such as at approximately 180° C., and/or immediately below the Li melting point, can be created across Li and packed particles with rapid thermal spike at location of concentrated loading. At block 1106C, an exothermic reaction can be used to initiate infiltration followed with a capillary driven fluid flow in porous carbon media taking advantage of principles related to Darcy's law, Washburn, etc. with variable permeability. The capillary driven fluid flow assumes no appreciable reaction product formation/build-up.

Figure 12:
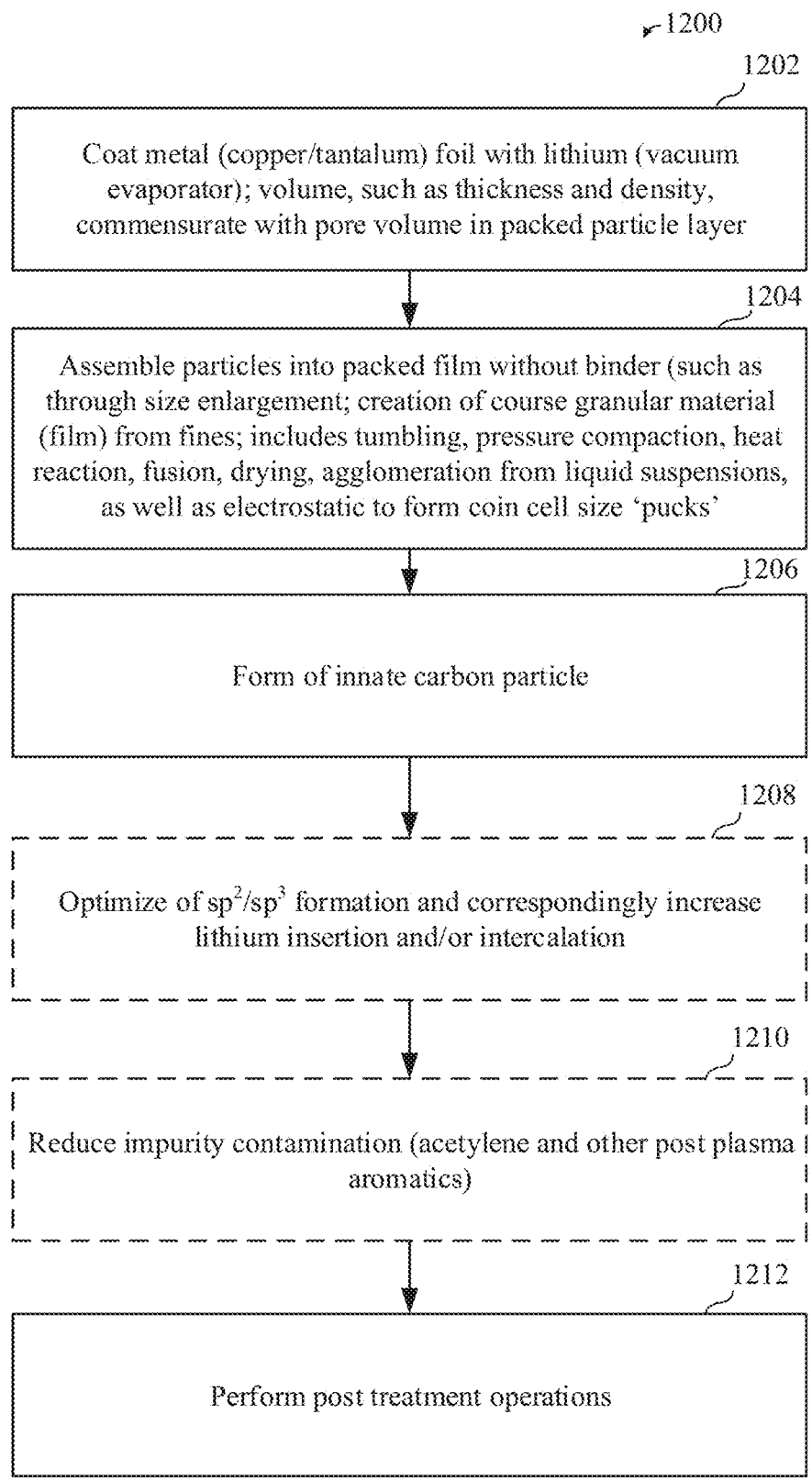
FIG. 12 shows a flowchart depicting example operations of performing Li infusion of a carbon particle.

FIG. 12 shows a flowchart of a method 1200 of performing a Li infusion of a carbon particle during its formation with a vaporized Li, according to some implementations. At block 1202, metal, such as copper and/or tantalum, foil can be coated with lithium, such as in a vacuum evaporator; measured Li volume, such as thickness and density, can be commensurate with pore volume in packed particle layer. At block 1204, particles can be assembled into a packed film without binder, such as through size enlargement, creation of course granular material, such as film, from fines, where assembly techniques can include tumbling, pressure compaction, heat reaction, fusion, drying, agglomeration from liquid suspensions, as well as electrostatic to form coin cell size pucks. At block 1206, an innate carbon particle can be formed. At block 1208, $sp^2/sp^3$ ratios of carbon during formation can be optimized to correspondingly increase lithium (Li) insertion and/or intercalation. At block 1210, impurity contamination, such as that caused by acetylene and other post plasma aromatics, can be reduced. At block 1212, post treatment operations can be performed.

Figure 13:
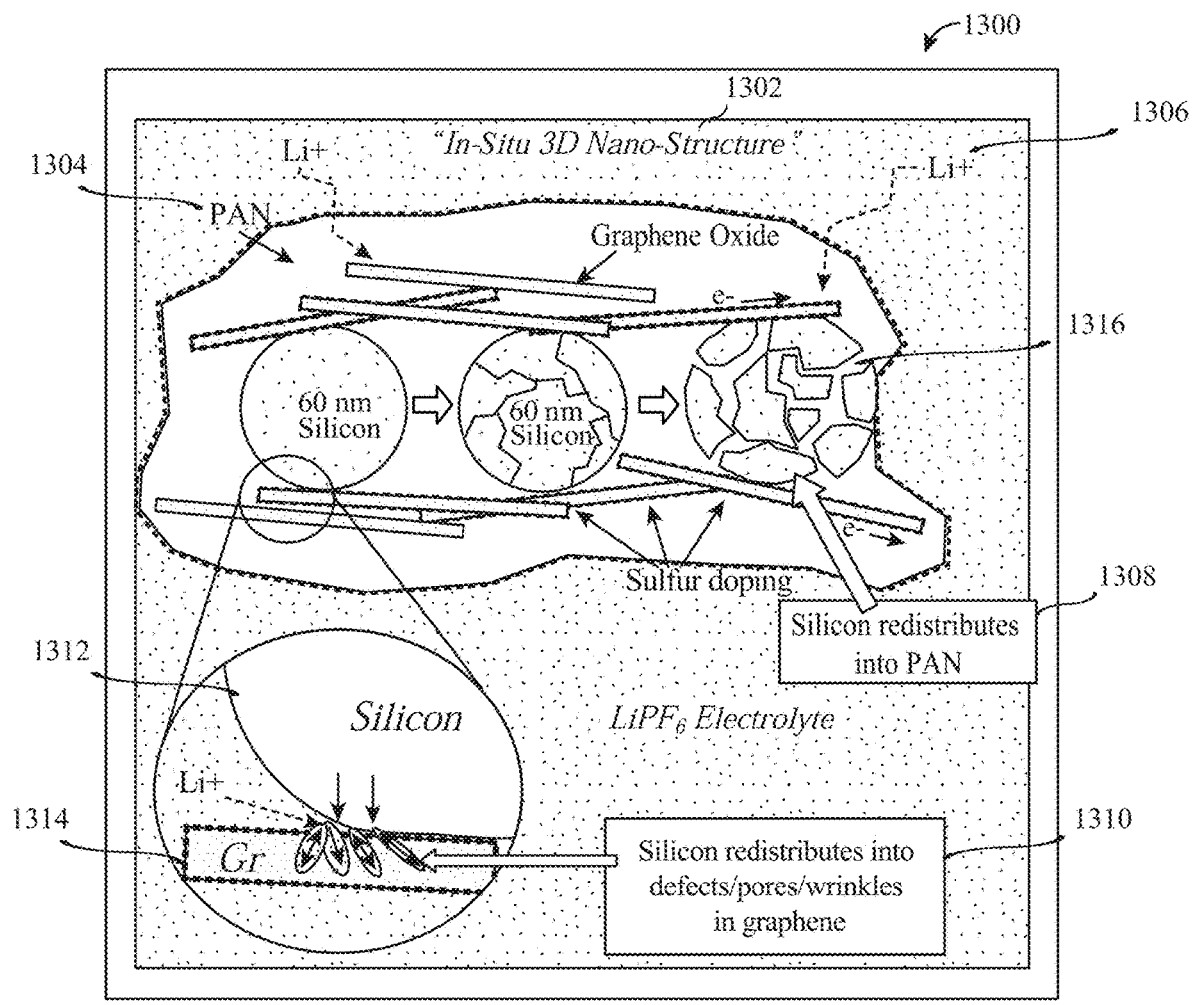
FIG. 13 shows a schematic of an anode.

FIG. 13 shows a schematic diagram showing an idealized anode 1300 configuration with 3D graphene-based nanostructures 1302 incorporated therein to provide structural definition to the anode 1300, according to some implementations. The 3D graphene-based nanostructures 1302 can be incorporated into or provide structural definition to any one or more of the presently disclosed carbon-based structures, including the pores 105E and/or the contiguous pathways 107E, both shown in FIG. 1E, and can confine or otherwise retain metal dopants such as silicon (Si) 1312 and create surface-activated diffusional pathways 1316 to handle volumetric expansion during Li ion 1306 alloying—de-alloying cycles, and to also limit electrolyte ingress. Silicon can redistribute, as shown in a pathway 1310, into defects, pores, or wrinkles in few-layer graphene sheets as well as distributing, in a pathway 1308, into a binder 1304, such as highly polar polyacrylonitrile (PAN). Sulfur (S) doping can be performed or occur at graphene 1314 to silicon contact regions or surfaces to assist in Li complexing in Li S battery systems and related charge-discharge cycles to achieve any one or more of the performance figures quoted herein, including a specific capacity greater than 372 mAh/g, which is ordinarily achievable as a theoretical maximum by graphite alone. In some implementations, graphene oxide can be used in addition or in the alternative to few-layer graphene, and the Li S system can be immersed in a $LiPF_6$ liquid-phase electrolyte.

The anode 1300 can be configured with existing or to-be-developed future carbon-based materials, offering backward-compatibility. The surface-activated diffusional pathways 1316 can host Li metal, while Li can also be intercalated in between pairs of few layer graphene sheets. Pore sizes of carbon materials can be tuned in the anode 1300 to achieve certain distributions or containment levels of Li, as well as Li ion flow reversibility, and can be created with either amorphous or crystalline carbon structures.

Pre-lithiation of the anode 1300 can initially include electrochemical or direct contact to molten Li metal to later transition to direct vapor infusion techniques. Carbon structures used as a formative material to construct the anode 1300 can be direct deposited as a film of particles, as substantially described earlier, or from powders. A rate of Li effusion can match a rate of Li insertion within the anode 1300 to avoid excess Li deposited or condensed carbon surfaces exposed to incoming Li. And, production and cost metric considerations of the anode 1300 can include:
- producing carbon-based materials as low-cost powders, rather than films, that are configured to be dropped into to existing Li ion or Li S battery fabrications;
- direct deposition, independent of a binder, of carbon-based films on drums; and
- Li infusion into carbon-based particles and structures, such as slurry cast films/binders, evaporation techniques can be used to purify or dry carbons.

Li infusion of the anode 1300 can include the following procedures established by known roll-to-roll furnace brazing and/or spontaneous infiltration techniques, including any one or more of the following:
- use a two-dimensional (2D) analog with 2D liquid gap filler;
- liquid to solid chemical reactions, using flux for activation;
- increase of a proportion of solid to viscous surface area and decrease a proportion of liquid to viscous surface area to control and tune surface tension and/or thermodynamic driving forces; and
- screen Li wettability with Li foil/carbon particle stack on a hot plate using a halogen interlayer to breakdown any formed lithium oxide ($Li_2O$).

Li infusion of the anode 1300 can also include the following procedures, techniques, or implementations related to the evaporation of Li onto a metal foil configured to act as a thermal conductor:
- selection of copper (Cu) for use as current collector in Li ion or Li S battery systems incorporating the anode 1300;
- tantalum (Ta) interspersed within the anode 1300 for Li ion release resulting in minimal overall chemical interactions; and
- production of carbon-based film thicknesses commensurate with pore volume in packed particles.

Moreover, Li infusion of the anode 1300 can also include the following procedures, techniques, or implementations related to the orienting of Li and Ta foil on top of a carbon particle packed in a bed configuration that can be prepared to receive a load or pressure provided by a rotating calendar roll type drum in dry room environmental conditions:
- forward rotation of a calendaring roll or drum wrapped with a layer of Ta foil that is further wrapped in Li foil compresses against carbon particles prepared as a thin layer of material, which is placed on a copper foil, with heat applied by the calendaring roll and to the Cu foil to melt Li and create molten Li metal that infiltrates into the carbon particles;
- creation of overall isothermal conditions, such as at approximately 180° C., just below the Li melting point across infiltrated Li and packed carbon particles;
- observing a rapid thermal spikes at location of concentrated Li loading; and
- Li infiltration with an exothermic reaction with capillary driven molten Li metal fluid flow in porous carbon media as governed by any one or more of Darcy's law, Washburn's equation, etc., with variable permeability, processes assume no appreciable reaction product formation or build-up.

Still further, Li infusion of the anode 1300 can also include the following procedures, techniques, or implementations:
- coat metal, such as copper (Cu) and/or tantalum (Ta) foil with lithium Li in a vacuum evaporator; control Li volume, such as thickness and density, commensurate with pore volume in a packed carbon particle layer or film;
- assemble carbon particles into a packed film without a binder, although binder options could be considered assuming there is not interaction with molten Li and that the proposed binder could be easily removed after Li infiltration;
- enlargement and/or creation of course granular carbon material, such as a film, from carbon fines, such as by tumbling, pressure compaction, heat reaction, fusion, drying, agglomeration from liquid suspensions, as well as electrostatic to generate coin cell size structures shaped as pucks;
- collecting or screening any of the aforementioned materials within a reactor;
- performing post microwave sintering, or fusing; and
- performing partial compaction into a puck or tablet independent of a carbon die.

Innate carbon particle formation of few layer graphene and other carbons used to form the anode 1300 can include:
- optimizing $sp^2$ and/or $sp^3$ carbon structure formation to increase lithium insertion/intercalation; and
- reducing impurity contamination, such as acetylene and other post plasma aromatics.

Post treatment methods can include:
- washing, such as removing aromatics;
- baking carbons for a duration of approximately 3 hours at approximately 500° C. to remove adsorbed moisture and/or oxygen; and
- nitriding and/or treating carbons with silicon monoxide.

Factors influencing Li infiltration into carbon structures of the anode 1300 can include:
- precursor volume;
- melt temperature, such as from approximately 180° C. to 380° C.;
- particle post treatment, such as at a carbon surface exposed to contact with Li;
- mechanical pressure;
- graphene properties, such few layer, or sheet size;
- carbon structure morphology, including pore size, volume, distribution; and
- surface activation.

Carbon structure response to Li infiltration can include:
- spontaneous infiltration;
- accumulation of excess Li material to achieve a balanced mass proportionate to Li input; and
- extent of infiltration based on the ratio of carbon surface area exposed to incoming Li compared against the overall volume of the carbon structure.

Figure 14:
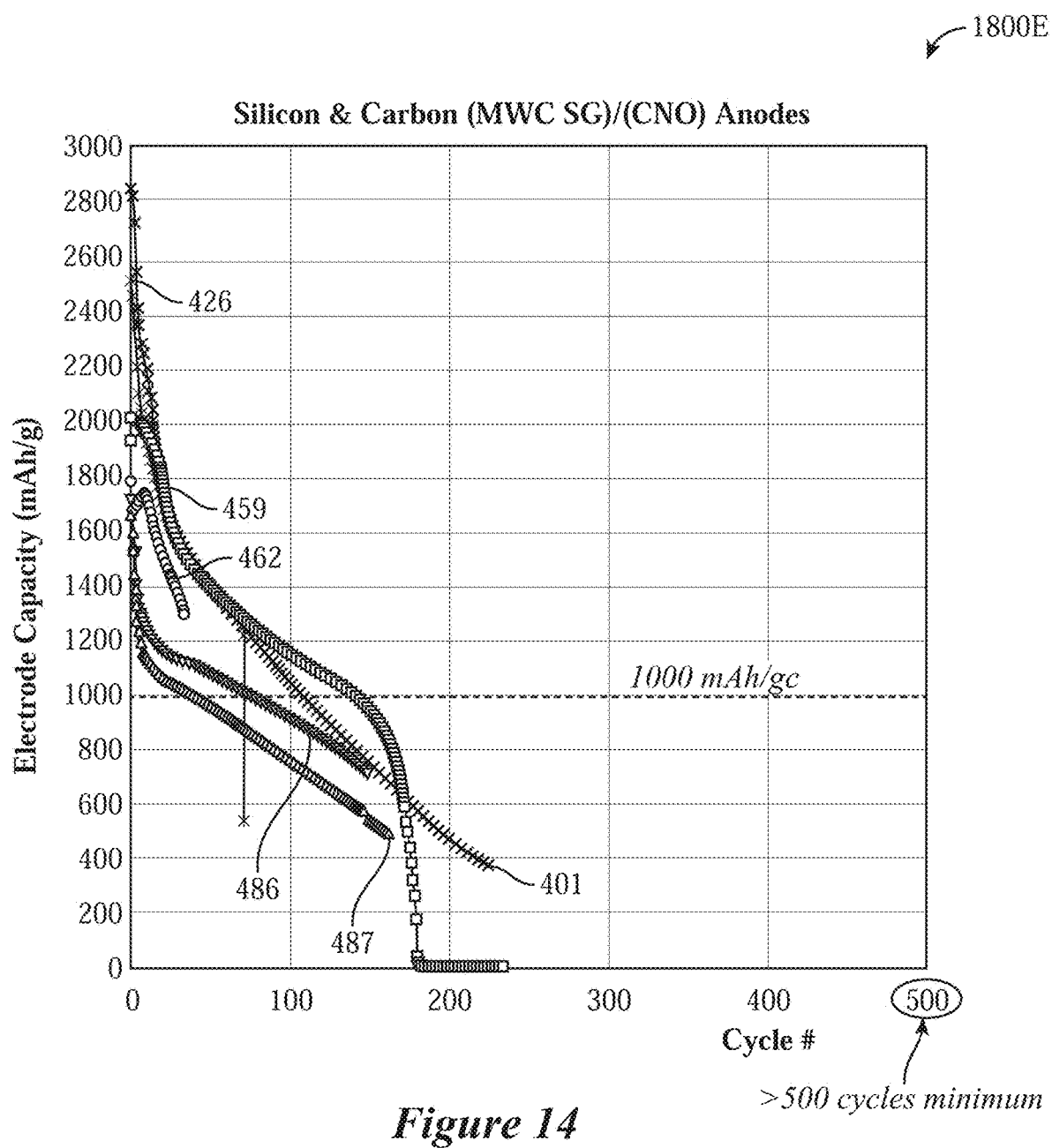
FIG. 14 shows a silicon and carbon anode performance over multiple usage cycles.

FIG. 14 shows a silicon and carbon (Si—C) performance comparing anode specific capacity in mAh/g over charge-discharge cycle number, according to some implementations. The various series shown including 426, 459, 462, 486, 487, and 401 can include variants and/or preparations similar to the anode 1300 shown in FIG. 13 or any one or more of the carbon structures shown in FIG. 1A through FIG. 1F incorporated within a Li ion or Li S system anode. As shown, the presently disclosed carbon structures can uniformly yield specific capacity values significantly higher than 372 mAh/g as commonly associated with a graphite anode.

Figure 15:
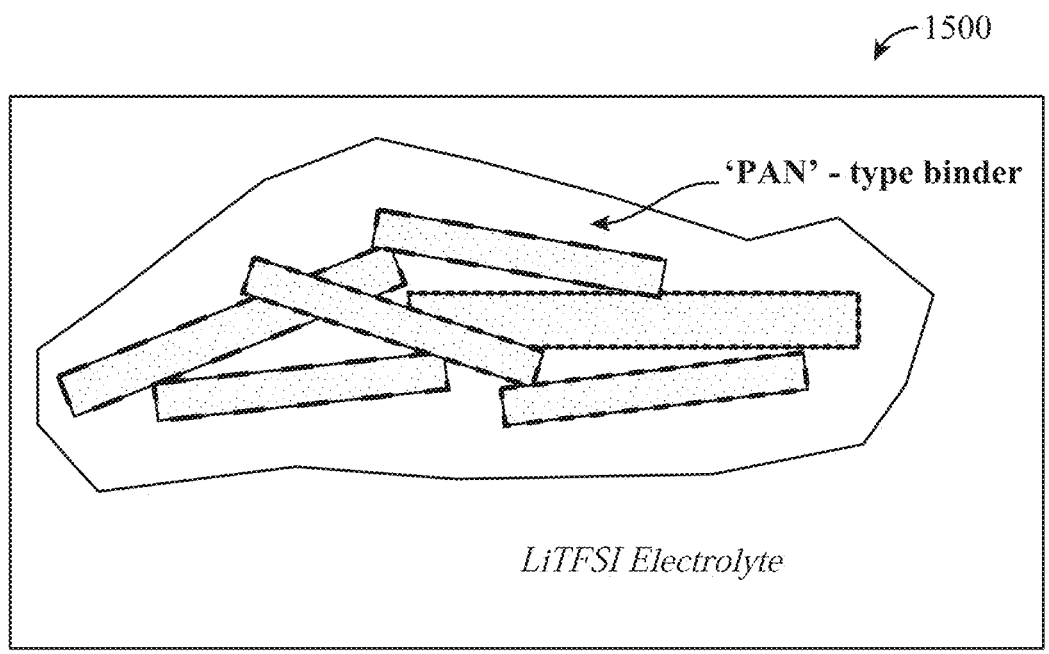
FIGS. 15 and 16 show schematics s related to an idealized cathode configuration with lithium sulfide ($Li_2S$) nanoparticles in graphene dispersed therein.
Figure 16:
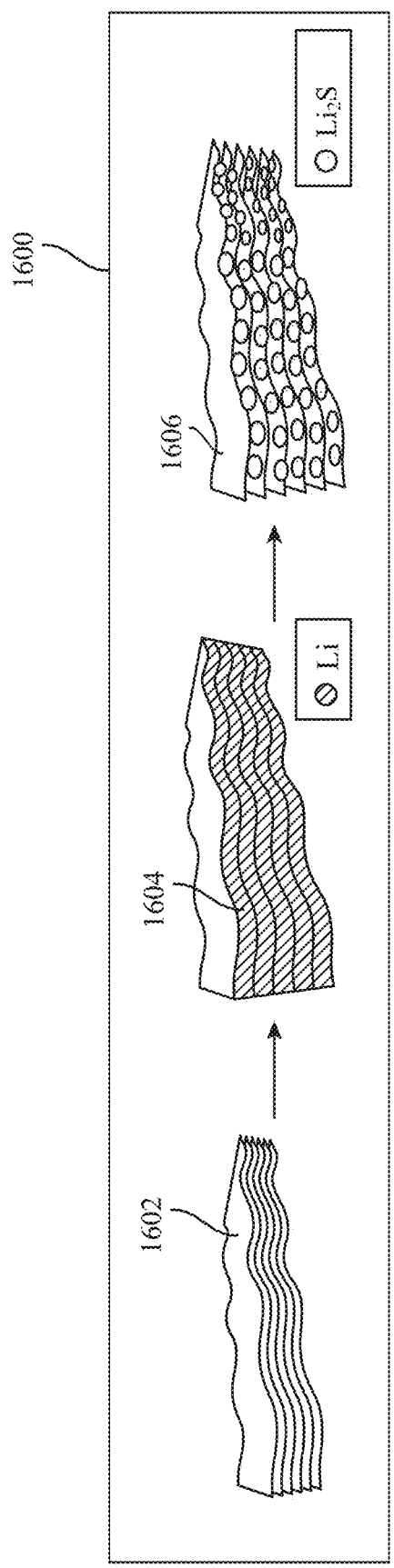

FIGS. 15 and 16 show schematic diagrams related to an idealized cathode configuration 1500, shown in FIG. 15, featuring dispersed lithium sulfide ($Li_2S$) nanoparticles in graphene sheets held together by a PAN type binder and submerged in LiTFSI electrolyte solution to provide facile Li ionic transport and electric conduction as well as mitigation and control of polysulfides (PS) generated in Li S battery system charge-discharge cycles, according to some implementations. The idealized cathode configuration 1500 can be implemented at least in part with any one or more of the presently disclosed carbon structures, including to form the pores 105E and/or contiguous microstructures 107E shown in FIG. 1E, in Li S battery systems. FIG. 16 shows an example in-situ 3D nanostructured few-layer graphene material 1600, which may be incorporated to provide structural definition to any one or more of the presently disclosed carbon structures. In some implementations, a stack of few-layer graphene sheets 1602 can include milled, sulfur impregnated graphene heated at a two-stage high temperature (HT) process to 250° C. and 350° C. The stack of few-layer graphene sheets 1602 can be infiltrated by Li such as that provided by lithium triethylborohydride ($LiEt_3BH$) in THF solution or n-butyllithium provided in an inert argon (Ar) atmosphere to provide a Li source 1604 by any one or more of the aforementioned Li infiltration techniques. The Li infiltrated stack of few-layer graphene sheets 1602 can undergo HT vacuum treatment at 10 hours at 110° C. to in-situ form $Li_2S$ in pores, such as the pores 105E shown in FIG. 1E, where such $Li_2S$ is involved in Li S electrochemical cell functioning as described earlier.

Figure 17A:
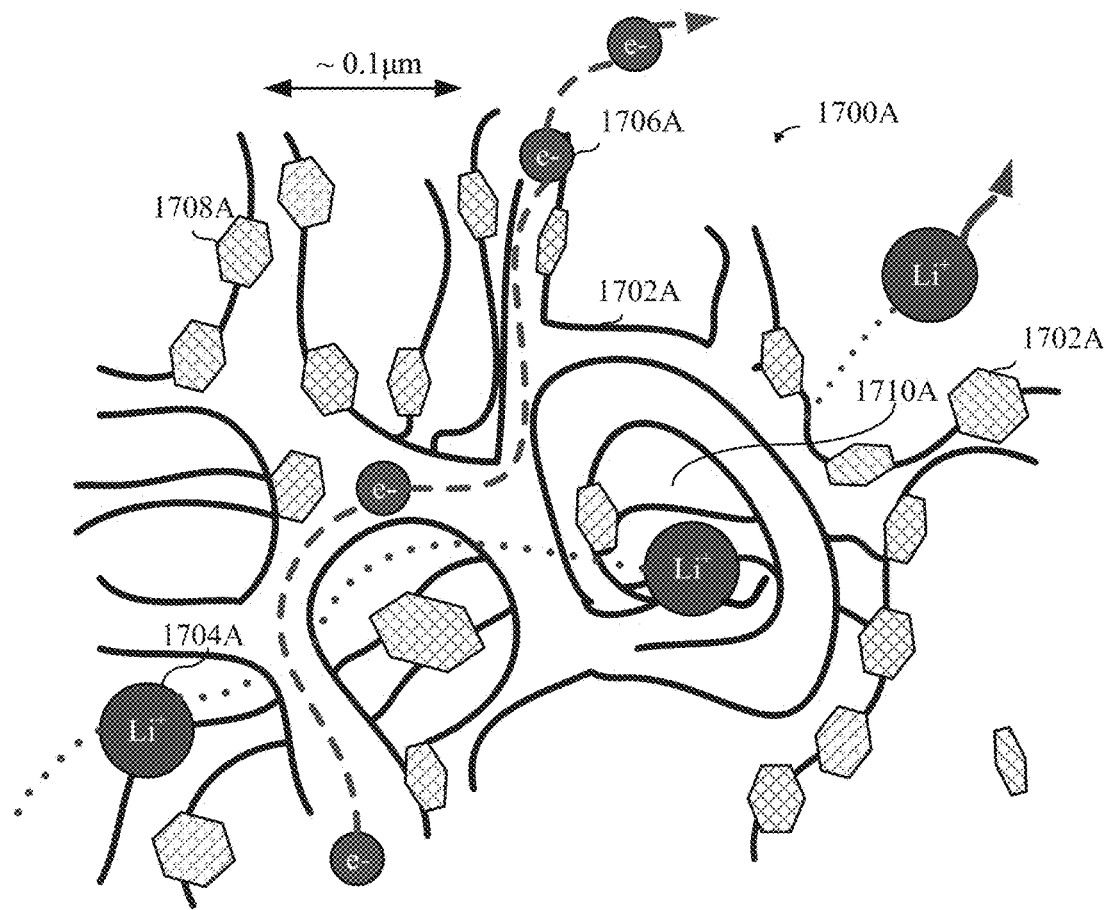
FIGS. 17A and 17B show an enlarged portions of the carbon-based particles of FIGS. 1A through 1F.

FIG. 17A shows an enlarged perspective cut-away view of carbon-based particle 100A, 100E and/or the like. Individual ligaments 1702A formed from as discussed in connection with carbon-based particle 100A shown in FIG. 1A through FIG. 1E, contact surfaces and/or regions between electrically conductive interconnected agglomerations of graphene sheets 101B, may extend to form a lattice and/or tree-like branched structure of section 1700A through which Li ions (Li+) 1704A may be intercalated, inserted in between individual gradient layers of section 1700A comprising, 3D bundles of graphene sheets 101B. Electric current may be conducted via flow of electrons through contact surfaces and/or regions between interconnected 3D bundles of graphene sheets 101B. Li ions, may flow through pores 1710A, sized at a larger size of the bi-modal distribution of voids or pores as described in FIG. 1A through 1E on the order or 20 to 50 nanometers, or be confined, such as via chemical micro-confinement, in pores sized generally on the order of 1 to 3 nanometers.

Therefore, Li ion flow may be finely controlled or tuned in carbon-based particle 100A to, for example, to be diametrically opposite to electron flow as needed to facilitate an electrochemical gradient that may be necessary for electricity conduction and/or electron flow through contact points and/or regions of 3D bundles of graphene sheets 101B. Spacing between individual carbon-based ligaments may be set a 0.1 μm. Those skilled in the art will appreciate that the dimension of 0.1 μm is provided as an example only and that other suitable similar or dissimilar dimensions may exist in section 1700A of carbon-based particle 100A.

Section 1700A may be formed of 3D bundles of graphene sheets 101B that are sintered together with each other to form a configuration where there are no completely open channels such that electricity is necessarily conducted through contact points and/or regions of interconnected 3D bundles of graphene sheets 101B. Thus, liquid passing through voids 1704A and the conductive nature of carbon-to-carbon bonding facilitates a connection of carbon-based materials to other carbon-based materials without the necessity of a chemical binder and/or chemical binding material or agent, many of which resulting in undesirable chemistries or side effects regarding functionality of carbon-based particle 100A.

Open porous scaffold 102A of carbon-based particle 100A presents a departure from traditional industry-standard battery electrodes that may involve slurry-cast boulders, relatively large particles, organized haphazardly on a substrate, such boulders typically requiring a binder to be held together to conduct electricity there-through. Open porous scaffold 102A defined by hierarchical pores 101A and/or the contiguous microstructures 107E of carbon-based particle 100A allows for improved electrical conduction therein.

Figure 17B:
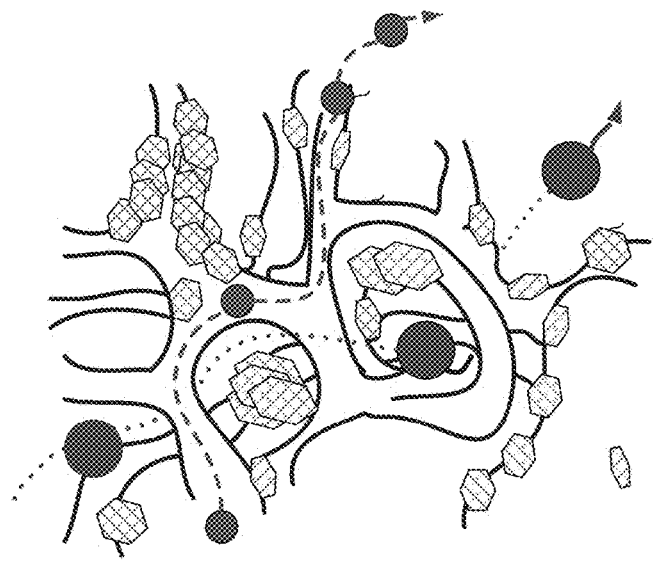

FIG. 17B shows the carbon-based particle of FIG. 17A with graphene-on-graphene densification. For the example of FIG. 17B, surfaces 1700B shown in FIG. 17B and/or surfaces 1708A shown in FIG. 17A at edge regions, at least partially planar surfaces of the branched, tree-like structure of section 1700A of carbon-based particle 100A, may be densified upon the application, deposition, or otherwise growth of multiple additional graphene layers. Such densification processes, methods and/or procedures permit for the creation of intricate, multi-layer, and potentially nearly infinitely tunable 3D carbon structures comprising combinations of 3D bundles of graphene sheets 101B. Accordingly, such fine tunability accomplished by graphene-on-graphene densification may facilitate the attainment of particular electrical conductivity values when carbon-based particle 100 is integrated into an electrode of a battery.

Figure 18A:
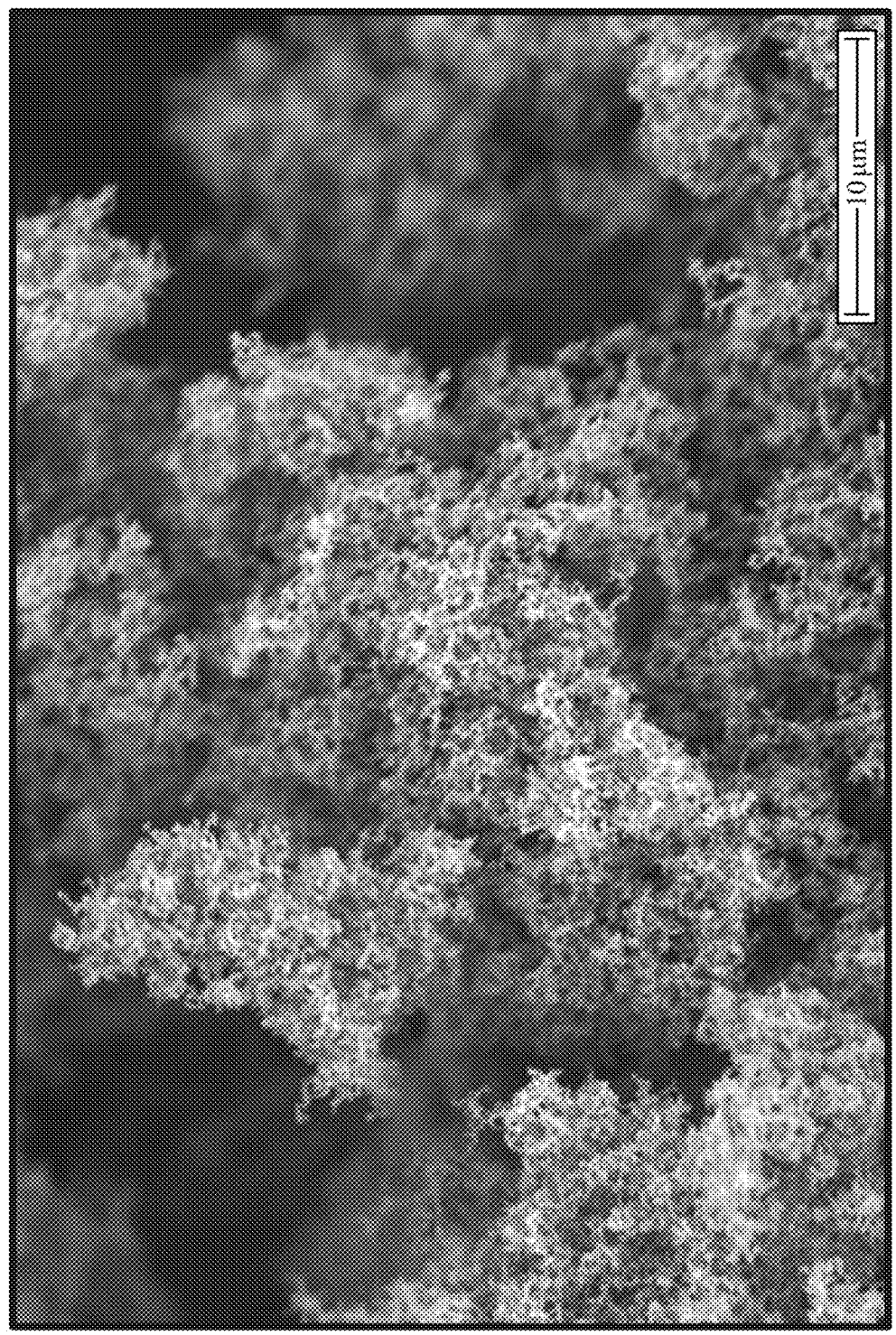
FIGS. 18A through 18E are micrographs of portions of a carbon particles.
Figure 18B:
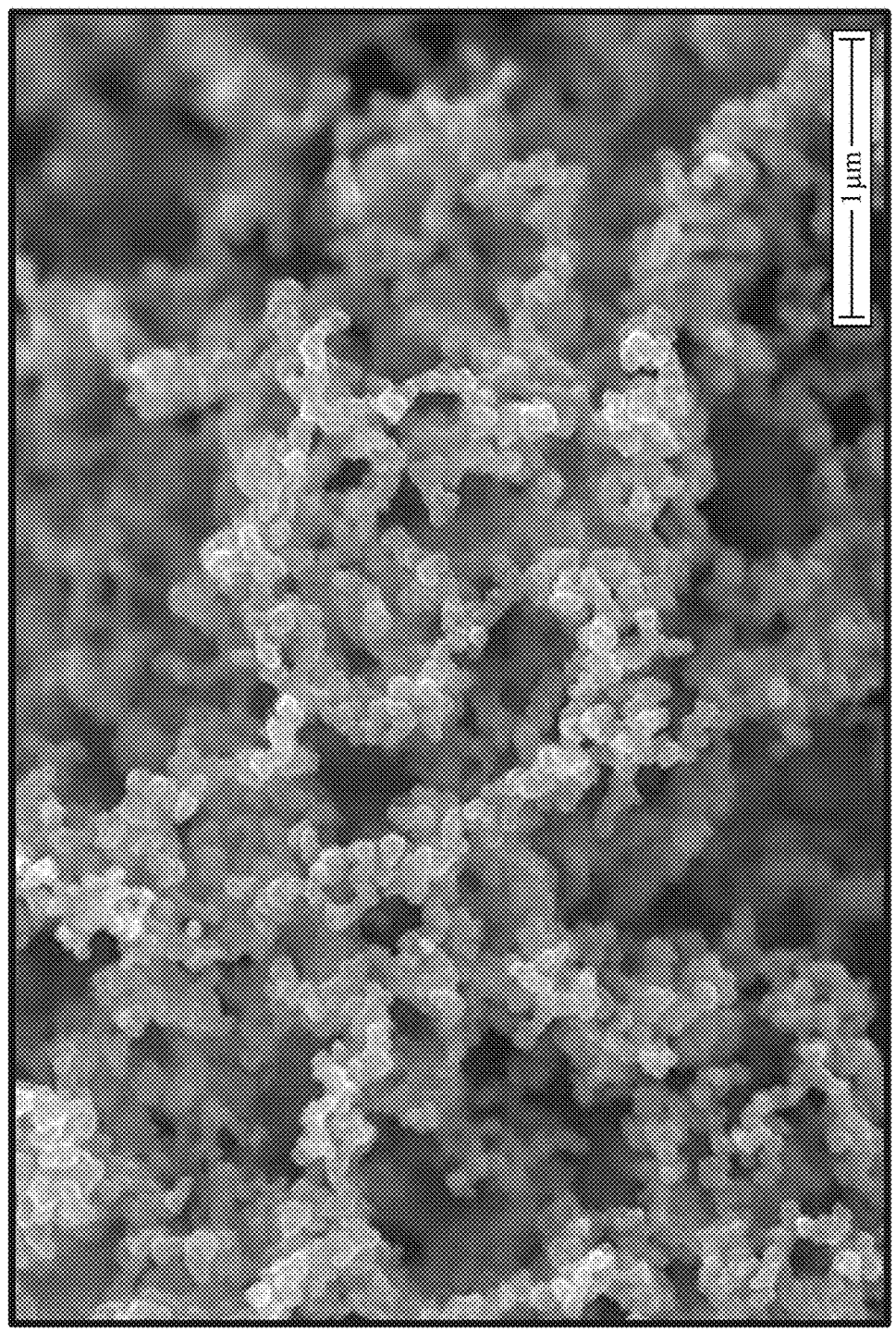
Figure 18C:
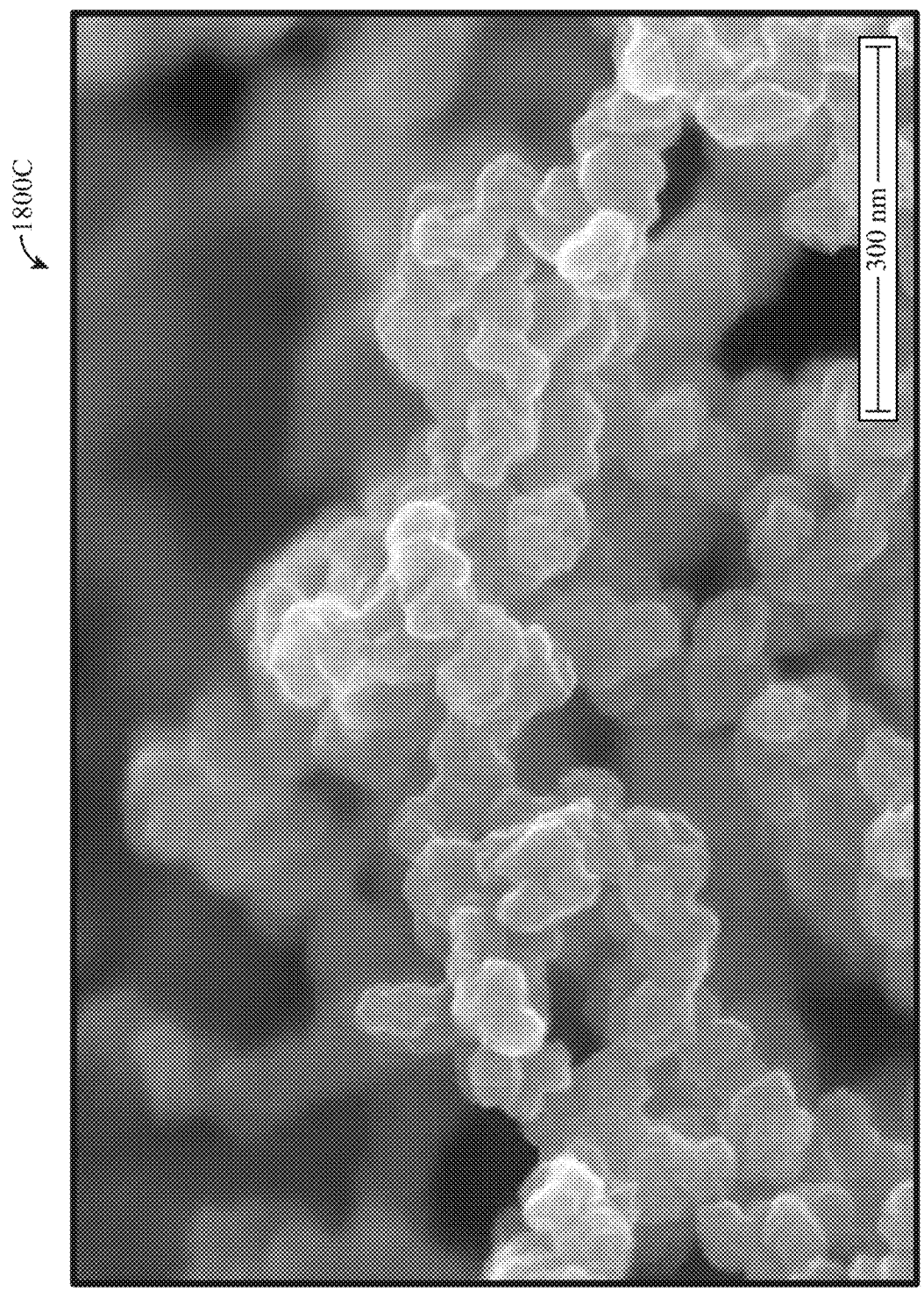

FIG. 18A through FIG. 18C show real-life micrographs 1800A, 1800B, and 1800C, respectively, of any one or more of the presently disclosed carbon structures, include the carbon-based particle 100A and/or the contiguous microstructures 107E shown in FIGS. 1A and 1E, respectively, at various increasing levels of magnification.

Figure 18D:
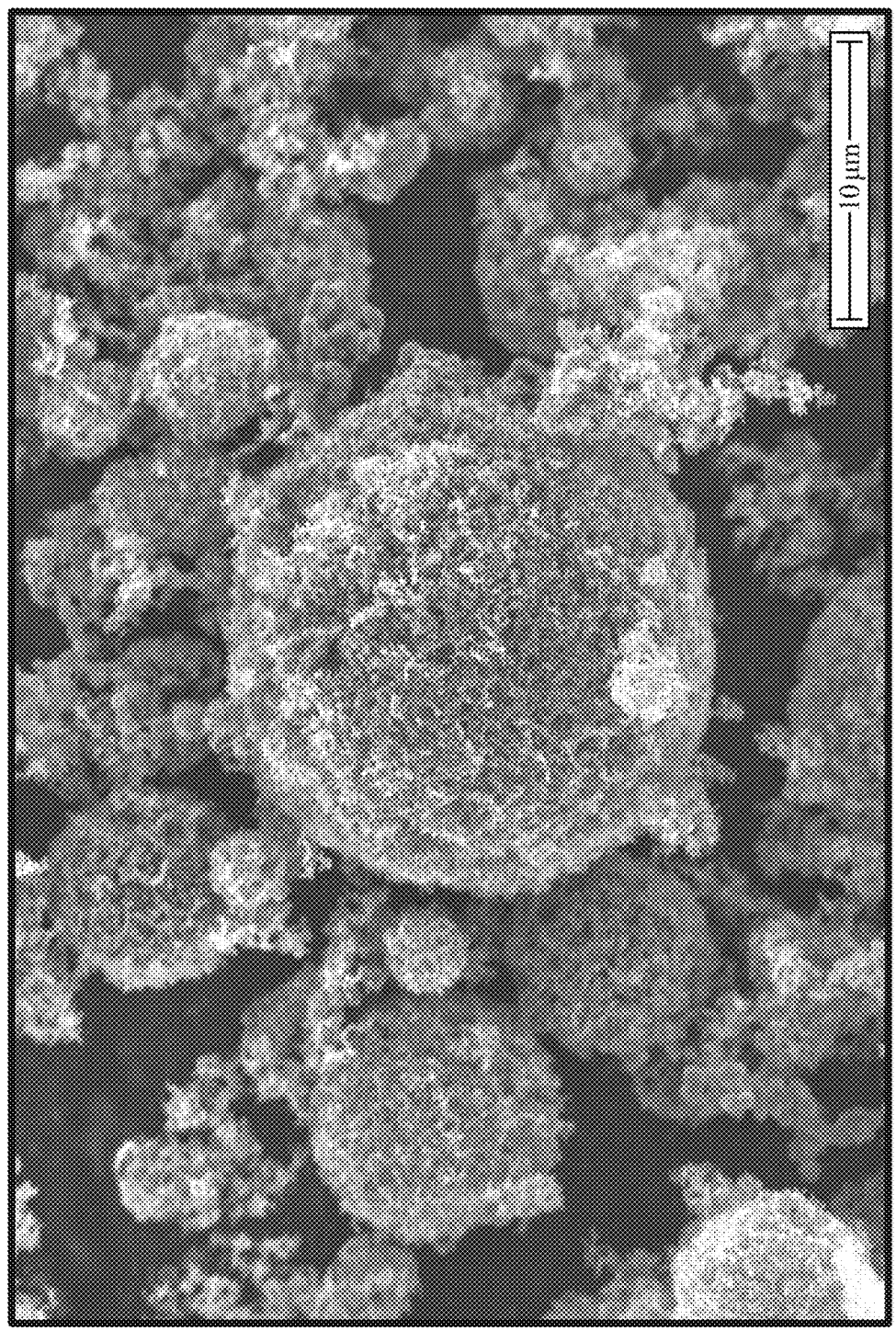

FIG. 18D shows a micrograph 1800D with a composite carbon agglomerate having an internal structure similar to that described for carbon-based particle 100A, complete with pores 105E and contiguous microstructures 107E, and has been prepared both in size and composition for incorporation in a cathode for Li ion systems, but can also be applicable to process and produce cages for Li on an anode. Randomly sized and shaped agglomerates can be used to fabricate any one or more of the presently disclosed electrodes. Nevertheless, tuning procedures can allow for the production of carbon agglomerates and/or particles at regular expected sizes as well, potentially providing for both ease of handling and advantages in processing.

Figure 18E:
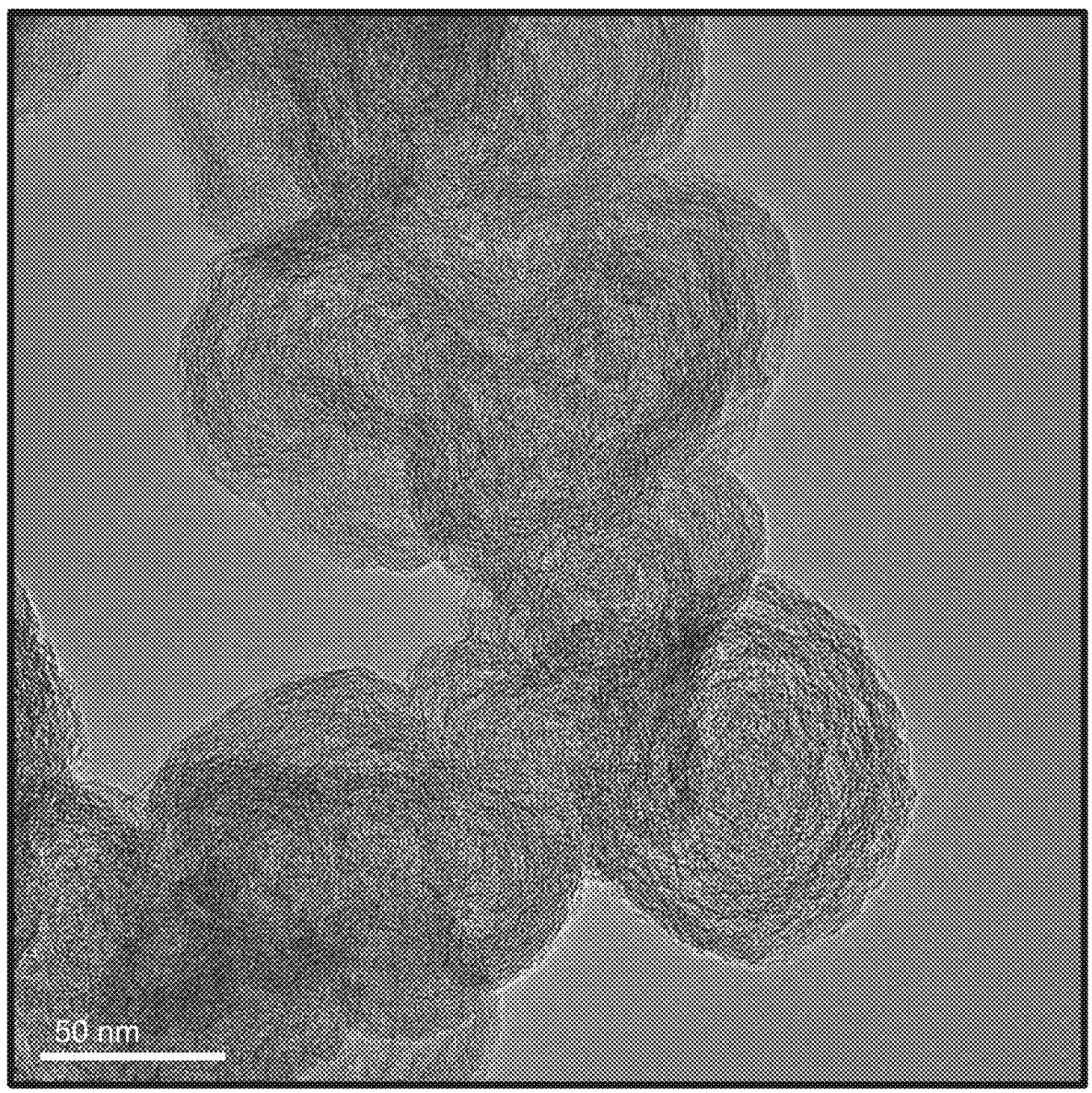

FIG. 18E shows a micrograph 1800E with an activated carbon structure for infiltration with sulfur (S) used in a Li S system cathode as described by at least any one or more of the presently disclosed carbon based structures, including the contiguous microstructures 107E shown in FIG. 1E. The activated carbon structure for infiltration with sulfur (S) shown in micrograph 1800E can be produced by a combined screw conveyor system or through other distinct steps. Thermal reactor produced material has been shown to be more lithiophilic than un-doped and/or un-functionalized microwave-generated carbon structures. In some implementations, the prevalence of organic and/or hydrocarbon-based contamination on the surface of few layer graphenes produced in the reactors may demand the performance of additional post processing refinement steps.

Figure 19A:
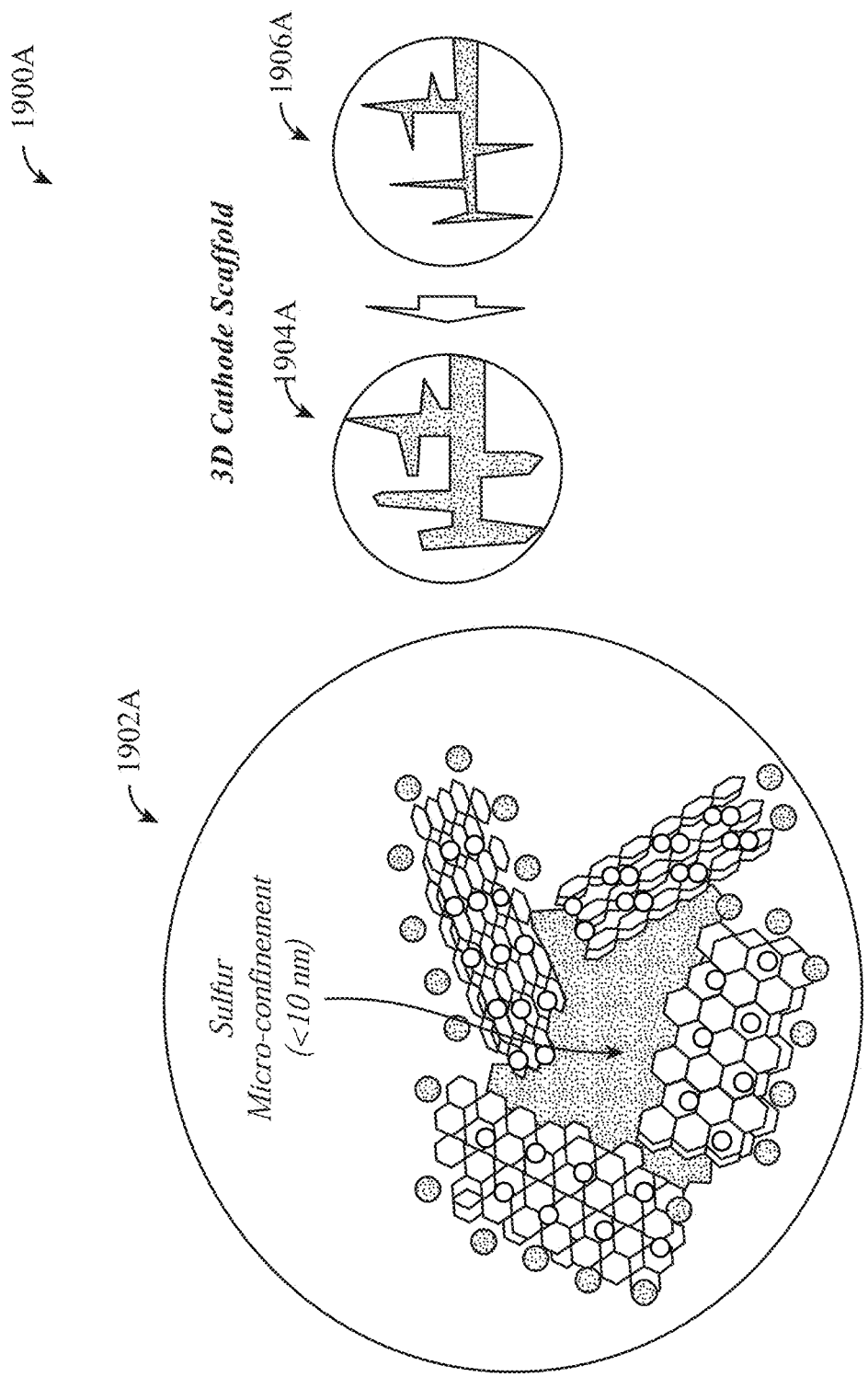
FIG. 19A shows a schematic of a 3D carbon-based cathode.

FIG. 19A shows a schematic depiction 1900A of a 3D graphene-particle cathode scaffold, such as carbon scaffold 300B featuring sulfur (S) micro-confinement therein, suitable for scale-up and/or incorporation with any one or more of the carbons presently disclosed, including usage as a formative material to produce contiguous microstructures 107E shown in FIG. 1E. In the example of FIG. 19A, graphene-based sheets and/or structures containing sulfur entrainment and/or confinement 1902A in various 3D cathode scaffolded structures or configurations, of various thicknesses 1904A and 1906A, are shown. S inclusion in graphene-based battery chemistry provides desirable electric charge storage and retention measured in milliamp hours, further described by the synthesis of a graphene-sulfur composite material by wrapping poly(ethylene glycol) (PEG) coated submicrometer sulfur particles with mildly oxidized graphene oxide sheets decorated by carbon black nanoparticles.

The PEG and graphene coating layers are important to accommodating volume expansion of the coated sulfur particles during discharge, trapping soluble polysulfide intermediates, and rendering the sulfur particles electrically conducting. The resulting graphene-sulfur composite showed high and stable specific capacities up to ~600 mAh/g over more than 100 cycles, representing a promising cathode material for rechargeable Li batteries with high energy density. Other studies have shown that activated graphene (AG) with various specific surface areas, pore volumes, and average pore sizes have been fabricated and applied as a matrix for sulfur. The impacts of the AG pore structure parameters and sulfur loadings on the electrochemical performance of Li-sulfur batteries are systematically investigated.

The results show that specific capacity, cycling performance, and Coulombic efficiency of the batteries are closely linked to the pore structure and sulfur loading. An AG3-sized (S) composite electrode with a high sulfur loading of 72 wt. % exhibited an excellent long-term cycling stability at 50% capacity retention over 1,000 cycles and extra-low capacity fade rate (0.05% per cycle). In addition, when $LiNO_3$ was used as an electrolyte additive, the AG3/S electrode exhibited a similar capacity retention and high Coulombic efficiency at ~98% over 1,000 cycles. The excellent electrochemical performance of the series of AG3/S electrodes is attributed to the mixed micro/mesoporous structure, high surface area, and good electrical conductivity of the AG matrices and the well-distributed sulfur within the micro/mesopores, which is beneficial for electrical and ionic transfer during cycling.

Figure 19B:
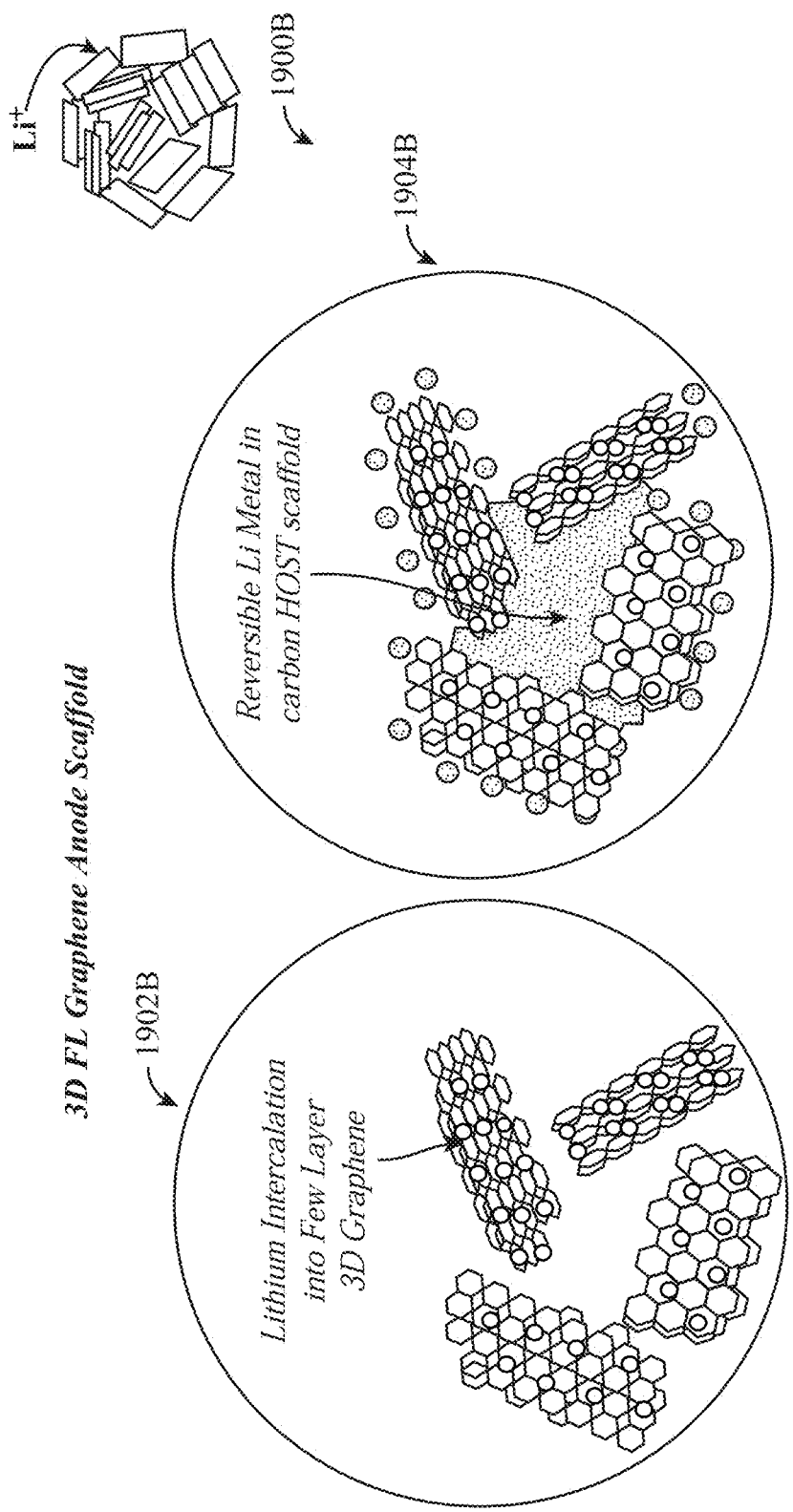
FIG. 19B shows a schematic diagram of a 3D carbon-based anode.

FIG. 19B shows a 3D few-layer graphene anode scaffold, such as carbon scaffold 300 and/or lithiated carbon scaffold 400A prepared for incorporation within or usage as a formative material for a Li ion or Li S system anode with Li intercalation between graphene layers. In the example of FIG. 19B, Li ions (Li+) are shown in various configurations 1900B including as being intercalated into FLG 1902B and reversible inclusion of Li metal in a carbon-based host scaffold 1904B. Li intercalation into bi-layer graphene may relate to and address the real capacity of graphene and the Li-storage process in graphite, which present problems in the field of Li ion batteries.

Corroborated by theoretical calculations, various physiochemical characterizations of the staged lithium bilayer graphene products further reveal the regular Li-intercalation phenomena and therefore fully illustrate this elementary lithium storage pattern of two-dimension. These findings not only make the commercial graphite the first electrode with clear lithium-storage process, but also guide the development of graphene materials in Li ion batteries. Li absorption and intercalation in single layer graphene and few layer graphene differs to that associated with bulk graphite. For single layer graphene, the cluster expansion method is used to systemically search for the lowest energy ionic configuration as a function of absorbed Li content. It is predicted that there exists no Li arrangement that stabilizes Li absorption on the surface of single layer graphene unless that surface includes defects. From this result follows that defect poor single layer graphene exhibits significantly inferior capacity compared to bulk graphite.

In some implementations, carbon-based particle films can include at least the following particle-like properties, in addition to any one or more of: sacrificial, as well as, supporting film substrates; tunable velocity to substrate; tunable impact energy from implantation to adsorption; tunable thickness; and, tunable porosity; any one or more of which can be integrated with additive type manufacturing capability.

In some implementations, any one or more of the presently disclosed carbons and carbon-based structures can enable significant battery performance advantages over currently available Li-ion and/or Li S batteries, including: to achieving any one or more of the physical and/or electrical energy storage and/or conductivity values including an energy density in the range of approximately 400 to 650 (W-h)/kg, with a maximum theoretical value of 850 (W-h)/kg, and also including aspects with a sulfur and/or sulfur-intercalated cathode of 650 (MAh)/g, and, aspects of the graphene sheets 102A and/or conductive carbon particles interspersed therewith to define pores and/or voids, etc., as substantially discussed in connection with that shown in FIG. 1A through FIG. 1E, with ionic Li (Li+) intercalated therein to ultimately achieving an energy density storage value of 900 to 2,000 (mAh)/g.

Figure 20A:
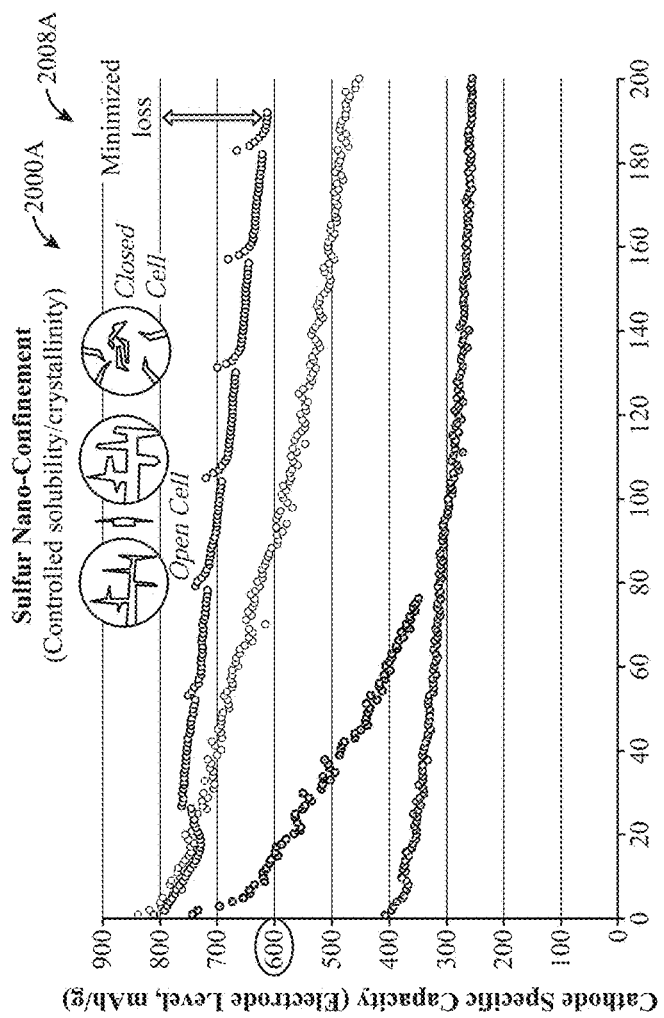
FIG. 20A shows discharge and charge cycles of an example Li S electrochemical cell.

FIG. 20A shows cathode specific capacity levels over cycles and various representative sulfur-nano confinement as representative of application and/or usage of systems based on or using carbon-based particle 100A and derivatives thereof diagrams and images. Improved cathode specific capacity, electrode level, as measured in mAh/g, is shown in graph 2008a for various compositions and/or compounds, any one or more of which at least partially include carbon-based particle 100A formed with s integrated therewith to enhance cathode specific capacity.

Figure 20B:
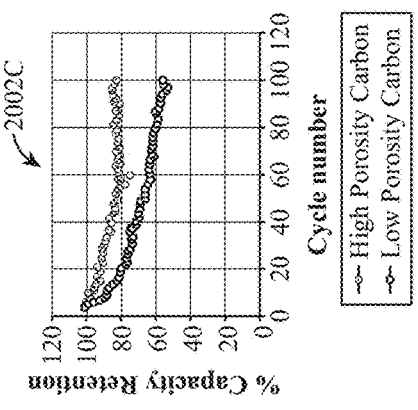
FIGS. 20B and 20C show battery performance charts for batteries equipped with carbon-inclusive electrodes.
Figure 20C:
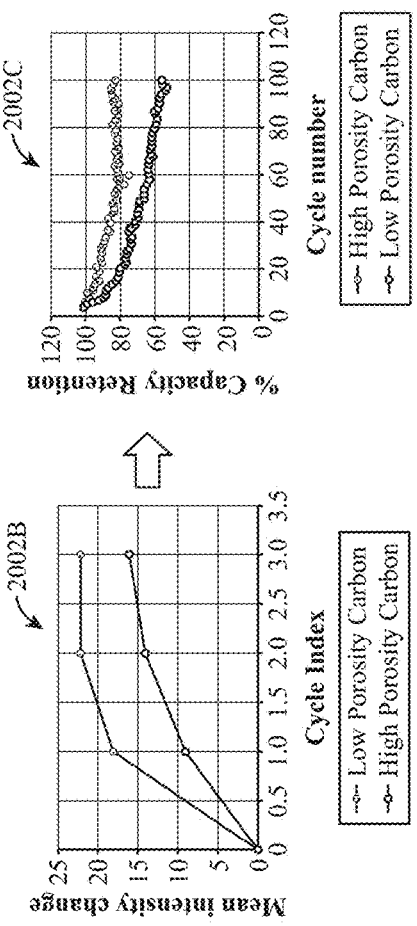

FIGS. 20B and 20C show charts regarding accelerated carbon tuning to mitigate polysulfide (PS) shuttle related issues, indicating that increasing the porosity of carbon-based materials, carbon-based particle 100A and variations thereof, reduces PS shuttling, defined as where sulfur S reach the negative electrode surface and undergo chemical reduction, leading to unwanted automatic electrochemical cell self-discharge. Chart 2002B shown in FIG. 20B shows a mean intensity change of low porosity carbon generally at higher levels than high porosity carbon. Chart 2002C shown in FIG. 20C shows high porosity carbon generally with higher levels of percentage capacity retention over repeated battery usage cycles relative to low porosity carbon.

Tuning of carbon-based particle 100A may achieve more efficient fabrication including Li utilization and potential increase the ration of active material to inactive material within a battery electrode, binder reduction, improved uniformity and controlled electrochemical reactions, such as battery electricity conductivity and/or activity. Parameters of carbon-based particle 100A can be tuned to achieve specific performance features as a function of the percentage of Li loading per unit area or volume of carbon-based particle 100A, including:

- at low loading levels, less than capacity, compensating for first charge losses/more effective SEI formation; at saturation/matched loading, Li rich regions, galvanically coupled to carbon,
- oxidizing materials when in contact with electrolyte and insertion of Li and/or Li-ions via intercalation between graphene layers;
- at excess loading levels, metallic Li is infiltrated into engineered host carbon; configuring the host to serves to accommodate/stabilize expansion of Li and suppress dendrite formation as a result of increased Li surface area, enables specific capacities commensurate with pure Li: >2,000 mAh/g; and,
- preparing Li ion processes/methodology directly transferable to lithium ion hybrid capacitors.

Ongoing challenges, related to the thermal and/or liquid infusion of Li and/or Li ion into carbon-based structures such as carbon-based particle 100A as outlined in listing 2900E can include management of Li reactivity regarding surface tension, wettability at a solid-to-liquid electrolyte interface; management of capillary Li and/or S infiltration kinetics, engineering of electrical gradient through electrode thickness, gradation of Li infiltration such that it is highest at current collector and transitions to a more ionic conducting concentration and/or level at electrolyte interface, and, the carefully tuned engineering of surface chemistry by facilitating stable SEI formation in contact with electrolyte and minimize reactivity with air.

Disclosed aspects may build upon traditional two-dimensional (2D) plating, that may be similar to brightening agents in electroplating. In electroplating, the addition of chemical additives may often increase polarization, decrease current density; such as, redirect current density to low as opposed to high areas, such as protrusions; produce a relatively high nucleation rate, and result in a moderate charge transfer rate. In the context of plating or stripping for battery charge and discharge cycles, for batteries with electrodes equipped with carbon-based particle 100A as shown in FIG. 1A through FIG. 1E, carbon film may serve as a flexible support for SEI formation as well as, redirecting current density to low, as opposed to high, areas.

Employed herein in a context of producing carbon-based particle 100A and integrating it with a Li ion battery, cementation may be employed in any one or more of the disclosed fabrication techniques. Cementation implies a process of altering a metal by heating it in contact with a powdered solid, precipitation in copper production may refer to and/or involve a heterogeneous process. Such a process may imply conditions where reactants are components of two or more phases, such as solid and gas, solid and liquid, two immiscible liquids, or in which one or more reactants undergo chemical change at an interface, on the surface of a solid catalyst, in which ions are reduced to zero valence at a solid metal surface, such as, Cu ions on Fe particle surface; and, where iron oxidizes and copper is reduced, such as copper being relatively higher on a galvanic series, similar to Li versus C.

Molten metals including Li metal can be managed for welding such that any one or more of the mentioned techniques can be functionally integrated with and/or used to produce carbon-based particle 100A to enhance Li ion or Li S battery performance. Such ancillary processes and/or techniques include: management of reactive metals via welding; classic metal inert gas (MIG), gas tungsten arc welding (GTAW) also referred to as tungsten inert gas (TIG) and submerged arc welding (SAW) to utilize inert shielding gas to join reactive metals, such as Ti and Al, through a liquid metal process, such as by welding. Examples include using inert shielding gas to form liquid pools of reactive metal without oxidation, where delta Gf of oxides, such as $TiO_2$, $Al_2O_3$, is on par with that of $Li_2O$. Through controlled use of inert shielding gas around reactive metals, oxygen and moisture may effectively be managed in the presence of reactive liquid metals. In such environments and conditions, liquid Li can be infiltrated into the carbon-based structures of carbon-based particle 100A through controlled shielding gas configuration and operation.

Figure 21:
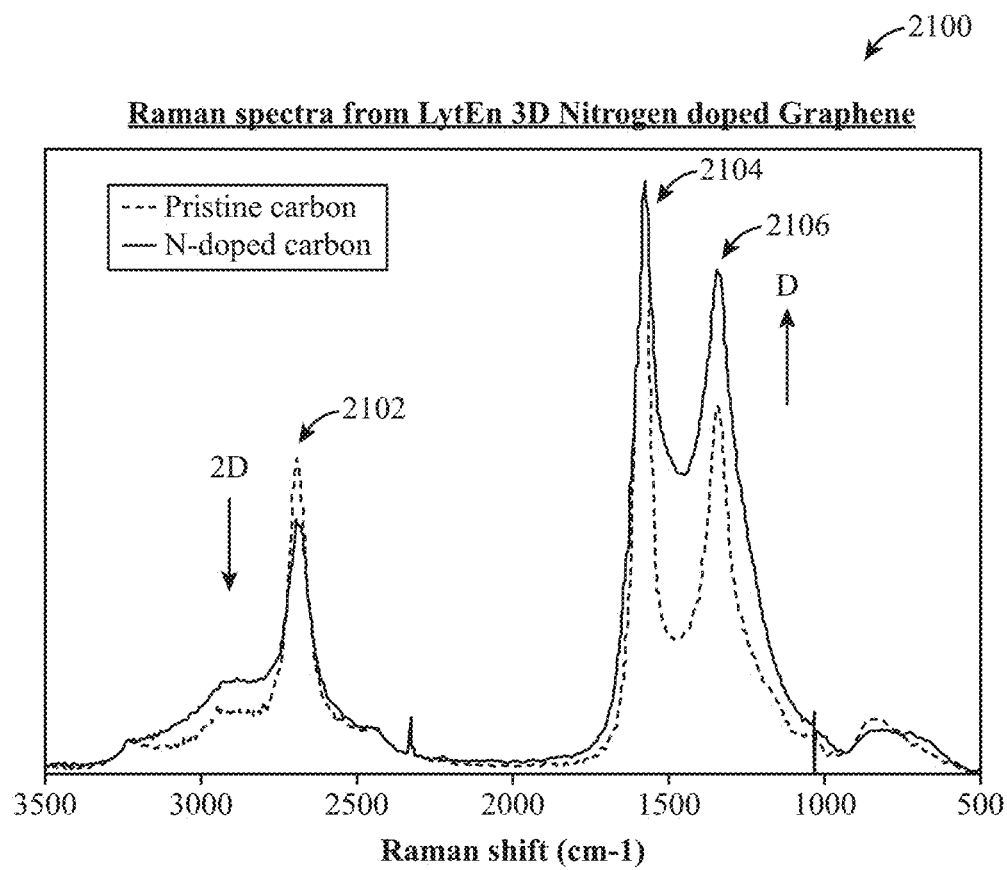
FIG. 21 shows Raman spectra for 3D N-doped FL graphene.

FIG. 21 shows Raman spectra for 3D N-doped FL graphene including charting for both pristine carbon and N-dope carbon. In the example of FIG. 21, Raman spectra for 3D N-doped FL graphene 2100 includes 2D peak 2102 at approximately 2730 cm-1 and D peaks 2104, 2106 at approximately 1600 $cm^{-1}$ and 1400 $cm^{-1}$, respectively.

Figure 22:
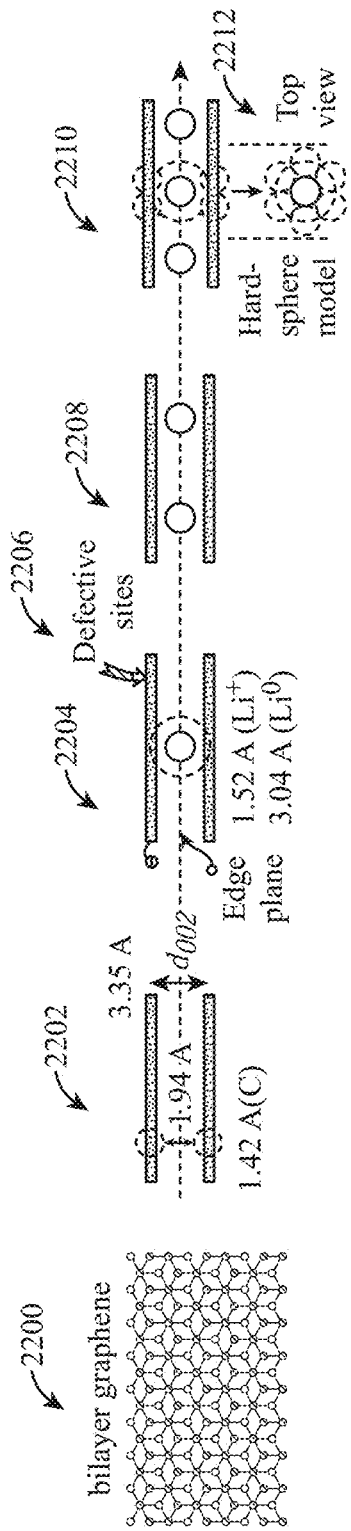
FIG. 22 shows schematic diagrams of bilayer graphene.

FIG. 22 shows various properties associated with bilayer graphene 2200. In the example of FIG. 22, a sample bilayer graphene infrastructure 2200 is shown with two layers of graphene oriented in the position shown, understood as devices which contained just one, two, or three atomic layers. Schematic 2202 shows approximate spacing measurements of 1.42 Å, 1.94 Å and/or 3.35 Å between individual graphene sheets. Schematic 2204 shows various example defective sites 2206 and/or 2208 what may occur within a defined vicinity of an edge plane and/or assist with the creation of carbon-based particle structures including one or more graphene sheets. Schematic 2210 shows various model diagrams 2212 of a top view of a hard-sphere carbon-particle model.

In some implementations, reactor tuning can be performed to, for example, any one or more of: increase FL graphene spacing, reduce Van der Waal forces; control doping; promote carbon vacancy formation; and, decreases Li adsorption energy and/or increase Li capacity. Li ion intercalation may, for example, shift graphene sheet stacks from an A-B configuration to A with intercalation accommodated by increased spacing, where, for example, in graphite, A-A may shift back to A-B with de-intercalation; and, in FL graphene, in FL graphene, AA stacking remains with de-intercalation, such as by maintaining increased spacing. Such stacking configurations may be associated with the carbon-based particle 100A shown in FIG. 1A through FIG. 1E.

Figure 23:
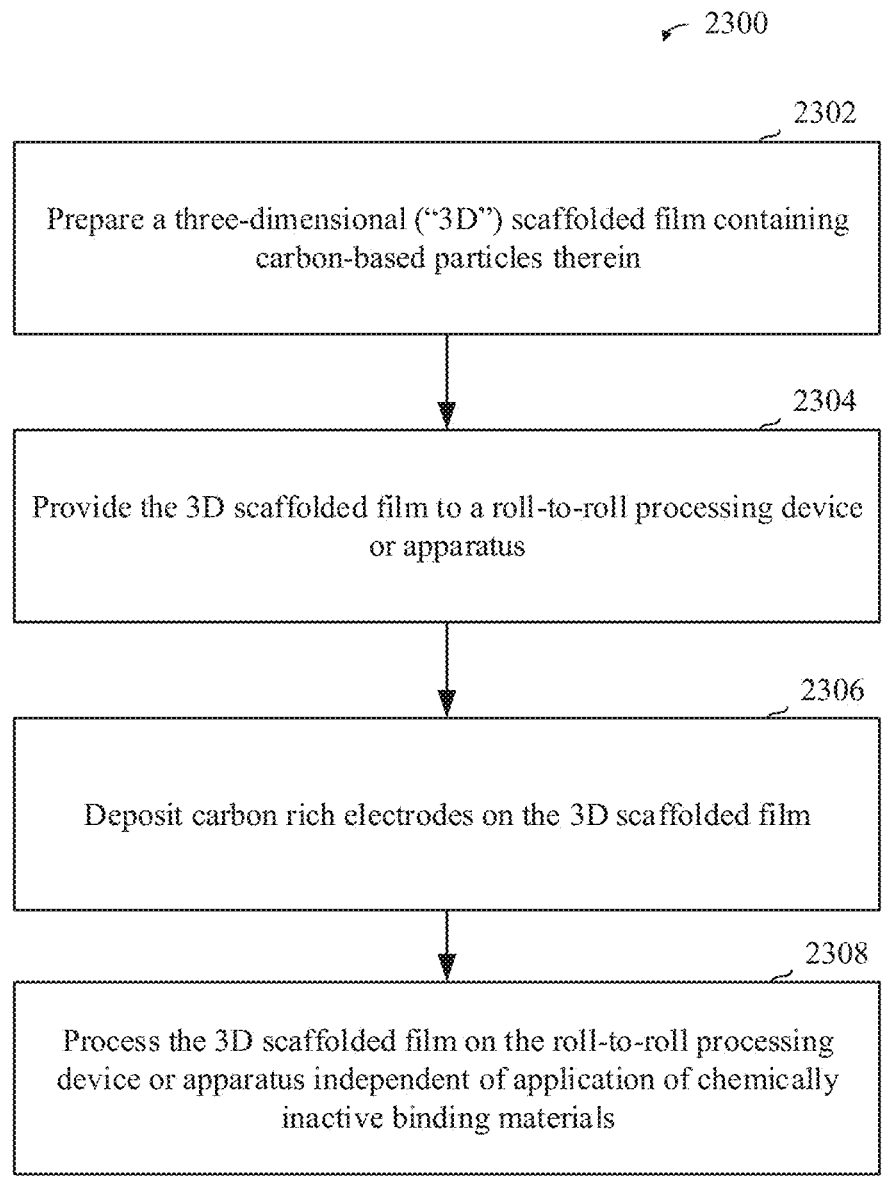
FIG. 23 shows a method for preparing a 3D scaffolded film.

FIG. 23 shows an illustrative flowchart for depicting an example operation 2300 for preparing a 3D scaffolded film containing carbon-based particles. In the example of FIG. 23, method 3300 includes preparing a 3D scaffolded film containing carbon-based particles therein at operation 2304 by providing the 3D scaffolded film to a roll-to-roll processing device or apparatus at operation 2306. Carbon rich electrodes may be deposited on the 3D scaffolded film at operation 2308; and, processing the 3D scaffolded film on the roll-to-roll processing device or apparatus independent of application of chemically inactive binding materials may occur at operation 2310 prior to conclusion of the method 2300 at operation 2312.

In the foregoing specification, the disclosure has been described with reference to specific examples. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method of manufacturing a lithiated carbon-based scaffolded anode, the method comprising:
   forming a film on a substrate by nucleating a plurality of carbon particles at a certain concentration level, each of the plurality of carbon particles comprising a plurality of aggregates formed of few layer graphene (FLG) joined together to define a porous structure configured for lithiation;
   infusing a molten lithium (Li) metal into the porous structure;
   evaporating the molten Li metal onto a metal foil,
   rolling the molten Li metal from the metal foil into the porous structure; and
   removing the substrate from the scaffolded anode.

2. The method of claim 1, wherein the first film has an average thickness in a range between approximately 10 μm and approximately 200 μm.

3. The method of claim 1, further comprising growing carbon particles on a roll-to-roll processing apparatus.

4. The method claim 1, further comprising preparing the lithiated carbon-based scaffolded anode to participate in a reversible migration of Li ions with a cathode prepared by any one or more of chemical functionalization or sulfidation.

5. The method claim 1, further comprising densifying a plurality of graphene platelets on the porous structure.

6. A method of manufacturing a lithiated carbon-based scaffolded anode, the method comprising:
   forming a film on a substrate by nucleating a plurality of carbon particles at a certain concentration level, each of the plurality of carbon particles comprising a plurality of aggregates formed of few layer graphene (FLG) joined together to define a porous structure configured for lithiation,
   forming a plurality of interconnected porous channels in the porous structure defined by the joined FLG;
   infusing a molten lithium (Li) metal into the porous structure; and
   removing the substrate from the scaffolded anode.

7. The method of claim 6, wherein the first film has an average thickness in a range between approximately 10 μm and approximately 200 μm.

8. The method of claim 6, further comprising growing carbon particles on a roll-to-roll processing apparatus.

9. The method claim 6, further comprising preparing the lithiated carbon-based scaffolded anode to participate in a reversible migration of Li ions with a cathode prepared by any one or more of chemical functionalization or sulfidation.

10. The method claim 6, further comprising densifying a plurality of graphene platelets on the porous structure.

11. A method of manufacturing a lithiated carbon-based scaffolded anode, the method comprising:
    forming a first film on a substrate by nucleating one or more first carbon particles at a first concentration level, each of the one or more first carbon particles comprising a first plurality of aggregates formed of few layer graphene (FLG) joined together;
    forming a second film on the substrate by nucleating one or more second carbon particles at a second concentration level, each of the one or more second carbon particles comprising a second plurality of aggregates formed of FLGs joined together, wherein the first film and the second film collectively define a plurality of interconnected porous channels between adjacent aggregates of the first and second pluralities of aggregates;
    infusing a molten lithium (Li) metal into the plurality of interconnected porous channels; and
    removing the substrate from the scaffolded anode.

12. The method of claim 11, wherein the first film is configured to provide a first electrical conductivity and the second film is configured to provide a second electrical conductivity different than the first electrical conductivity.

13. The method of claim 12, wherein second electrical conductivity is lower than the first electrical conductivity.

14. The method of claim 11, wherein the first film has an average thickness in a range between approximately 10 μm and approximately 200 μm.

15. The method of claim 11, further comprising growing carbon particles on a roll-to-roll processing apparatus.

16. The method claim 11, further comprising preparing the lithiated carbon-based scaffolded anode to participate in a reversible migration of Li ions with a cathode prepared by any one or more of chemical functionalization or sulfidation.

17. The method claim 11, further comprising densifying a plurality of graphene platelets on the porous structure.

* * * * *